(12) United States Patent
Sinclair et al.

(10) Patent No.: US 10,389,514 B2
(45) Date of Patent: Aug. 20, 2019

(54) OPTICAL TIME DISTRIBUTOR AND PROCESS FOR OPTICAL TWO-WAY TIME-FREQUENCY TRANSFER

(71) Applicant: Government of the United States of America, as represented by the Secretary of Commerce, Gaithersburg, MD (US)

(72) Inventors: Laura C. Sinclair, Boulder, CO (US); Nathan R. Newbury, Boulder, CO (US); William C. Swann, Boulder, CO (US); Hugo Bergeron, Quebec (CA); Jean-Daniel Deschenes, Quebec (CA)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 41 days.

(21) Appl. No.: 15/827,482

(22) Filed: Nov. 30, 2017

(65) Prior Publication Data
US 2018/0294946 A1 Oct. 11, 2018

Related U.S. Application Data

(60) Provisional application No. 62/482,436, filed on Apr. 6, 2017.

(51) Int. Cl.
*H04B 10/11* (2013.01)
*H04J 3/00* (2006.01)
(Continued)

(52) U.S. Cl.
CPC .......... *H04L 7/0075* (2013.01); *H04B 10/112* (2013.01); *H04B 10/1125* (2013.01);
(Continued)

(58) Field of Classification Search
CPC ....... H04L 7/0075; H04L 7/0008; H04L 7/00; H04B 10/112; H04B 10/1125;
(Continued)

(56) References Cited

U.S. PATENT DOCUMENTS 7,447,444 B2 * 11/2008 Igarashi ................ G02F 1/3513
398/183
8,554,085 B1 * 10/2013 Yap .......................... G02F 2/02
398/183

(Continued)

OTHER PUBLICATIONS

Jean-Daniel Deschenes, et al., "Synchronization of Distant Optical Clocks at the Femtosecond Level", Physical Review X, 2016, 6021016, vol. 6.

(Continued)

*Primary Examiner* — Abbas H Alagheband
(74) *Attorney, Agent, or Firm* — Office of Chief Counsel for National Institute of Standards and Technology

(57) ABSTRACT

An optical time distributor includes: a master clock including: a master comb; a transfer comb; and a free-space optical terminal; and a remote clock in optical communication with the master clock via a free space link and including: a remote comb that produces: a remote clock coherent optical pulse train output; a remote coherent optical pulse train; a free-space optical terminal in optical communication: with the remote comb; and with the free-space optical terminal of the master clock via the free space link, and that: receives the remote coherent optical pulse train from the remote comb; receives the master optical signal from the free-space optical terminal of the master clock; produces the remote optical signal in response to receipt of the remote coherent optical pulse train; and communicates the remote optical signal to the free-space optical terminal of the master clock.

19 Claims, 38 Drawing Sheets

(51) Int. Cl.
*H04L 7/00* (2006.01)
*H04B 10/40* (2013.01)
*H04B 10/61* (2013.01)
*H04B 10/112* (2013.01)
*H04B 10/548* (2013.01)

(52) U.S. Cl.
CPC ............ *H04B 10/40* (2013.01); *H04B 10/61* (2013.01); *H04J 3/00* (2013.01); *H04L 7/0008* (2013.01); *H04B 10/11* (2013.01); *H04B 10/548* (2013.01)

(58) Field of Classification Search
CPC . H04B 10/40; H04B 10/61; H04J 3/00; H01S 3/13; H01S 3/10; H01S 3/10092; H01S 3/098; H01S 5/022; H01S 3/0606; H01S 3/0627; H01S 3/102; H01S 3/109; H01S 3/1115; H01S 3/113
USPC .......................................... 398/118, 183, 154
See application file for complete search history.

(56) References Cited

U.S. PATENT DOCUMENTS

| | | | | |
|---|---|---|---|---|
| 8,565,609 B2* | 10/2013 | Wilkinson | ................. | G04F 5/14 398/154 |
| 9,106,340 B2* | 8/2015 | Siepmann | ............. | H04L 7/0075 |
| 9,252,795 B2* | 2/2016 | Wilkinson | ................. | G04F 5/14 |
| 9,356,703 B2* | 5/2016 | Wilkinson | ........... | H04B 10/548 |
| 9,673,901 B2* | 6/2017 | Chaffee | ................. | H04B 10/11 |
| 2008/0043784 A1* | 2/2008 | Wilcox | ................. | H01S 3/1394 372/18 |
| 2008/0089369 A1* | 4/2008 | Luo | ..................... | H01S 3/10092 372/28 |
| 2013/0315271 A1* | 11/2013 | Goodno | ................ | H01S 3/1307 372/31 |
| 2018/0167130 A1* | 6/2018 | Vannucci | ........... | H04B 7/15507 |

OTHER PUBLICATIONS

Laura C. Sinclair, et al., "Optical system design for femtosecond-level synchronization of clocks", Proc. of SPIE, 2016, 976308, vol. 9763.

Fabrizio R. Gioretta, et al., "Optical two-way time and frequency transfer over free-space", Nature Photonics, 2013, p. 434-438, vol. 7.

Laura C. Sinclair, et al., "Syncronization of clocks through 12km of strongly turbulent air over a city", Applied Physics Letters, Oct. 11, 2016, p. 151104-1-1151104-4, vol. 109.

Hugo Bergeron, et al., "Tight real-time synchronization of a microwave clock to an optical clock across a turbulent air path", Optica, Apr. 15, 2016, p. 441-447, vol. 3 No. 4.

Hugo Bergeron, et al., "Improved algorithms to synchronize frequenct combs across a free-space link", URSI GASS, 2017.

* cited by examiner

US 10,389,514 B2

OPTICAL TIME DISTRIBUTOR AND PROCESS FOR OPTICAL TWO-WAY TIME-FREQUENCY TRANSFER

STATEMENT REGARDING FEDERALLY SPONSORED RESEARCH

This invention was made with U.S. Government support from the National Institute of Standards and Technology (NIST), an agency of the United States Department of Commerce, and under Agreement Nos. HR001133679, HR0011518121, HR0011620341, and HR0011727192 awarded by the Defense Advanced Research Projects Agency, and Agreement No. HR0011518541 awarded by the Defense Advanced Research Projects Agency. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 17-019US1.

BRIEF DESCRIPTION

Disclosed is an optical time distributor for optical two-way time-frequency transfer (O-TWTFT), the optical time distributor comprising: a master clock comprising: a master comb that produces a master clock coherent optical pulse train output; a transfer comb that produces a transfer coherent optical pulse train; and a free-space optical terminal in optical communication with the transfer comb and a free space link and that: receives the transfer coherent optical pulse train from transfer comb; produces a master optical signal in response to receipt of the transfer coherent optical pulse train; communicates the master optical signal from the master clock to a remote clock via a free space link; and receives a remote optical signal from the remote clock the master clock producing a pulse label; and the remote clock in optical communication with the master clock via the free space link and comprising: a remote comb that produces: a remote clock coherent optical pulse train output; a remote coherent optical pulse train; a free-space optical terminal in optical communication: with the remote comb; and with the free-space optical terminal of the master clock via the free space link, and that: receives the remote coherent optical pulse train from the remote comb; receives the master optical signal from the free-space optical terminal of the master clock; produces the modulated cw laser signal in response to receipt of the remote coherent optical pulse train; and communicates the modulated cw laser signal to the free-space optical terminal of the master clock, the remote clock producing a pulse label.

Also disclosed is an optical time distributor for O-TWTFT, the optical time distributor comprising: a master clock comprising: a master comb that receives a reference oscillator signal from a first oscillator and produces: a local master clock signal; a master clock coherent optical pulse train output; a master frequency output; a master pulse-per-second output; and a master coherent optical pulse train in response to receipt of the reference oscillator signal; a transfer comb that receives a reference oscillator signal from the first oscillator and produces, in response to receipt of the reference oscillator signal, a transfer coherent optical pulse train; a master-transfer optical transceiver that: receives the master coherent optical pulse train from the master comb; receives the transfer coherent optical pulse train from the transfer comb; and produces a RF master-transfer interferogram (radiofrequency, RF) in response to receipt of the master coherent optical pulse train and the transfer coherent optical pulse train; a remote-transfer optical transceiver that: receives the transfer coherent optical pulse train from the transfer comb; receives a remote coherent optical pulse train from a remote comb; and produces a RF remote-transfer interferogram in response to receipt of a remote optical signal and the transfer coherent optical pulse train; a digital signal controller in electrical communication with the master comb, the master-transfer optical transceiver, the remote-transfer optical transceiver, and a coarse timing and communications module and that: receives the local master clock signal, the RF master-transfer interferogram, and the RF remote-transfer interferogram; receives a cw laser heterodyne signal; produces a cw laser modulation and a pulse label in response to receipt of the local master clock signal, the RF master-transfer interferogram, the RF remote-transfer interferogram, and the continuous wave (cw) laser heterodyne signal; produces the master pulse-per-second output via a pulse selector; and produces the pulse label; the coarse timing and communications module in electrical communication with the digital signal controller and that: generates the cw laser heterodyne signal in response to receipt of a modulated cw laser signal; and receives the cw laser modulation from the digital signal controller; and produces an outgoing modulated cw laser signal in response to receipt of the cw laser modulation; a free-space optical terminal in optical communication with the coarse timing and communications module, the transfer comb, and a free space link and that: transfers the modulated cw laser signal and the transfer coherent optical pulse train from the master clock to the free space link; transfers the remote optical signal from the free space link to the master clock; and produces a master optical signal in response to receipt of the modulated cw laser signal and the transfer coherent optical pulse train, the master optical signal comprising: a transfer coherent optical pulse train; and a modulated cw laser signal; a remote clock in optical communication with the master clock via the free space link and comprising: the remote comb that receives a reference oscillator signal from a second oscillator and produces: a local remote clock signal; a remote clock coherent optical pulse train output; a remote frequency output; a remote pulse-per-second output; and the remote coherent optical pulse train in response to receipt of the reference oscillator signal; a free-space optical terminal in optical communication: with the remote comb; and with the master clock via the free space link, and that receives: the remote coherent optical pulse train from the remote comb; and the master optical signal from the free-space optical terminal of the master clock, and that communicates: the modulated cw laser signal to the free-space optical terminal of the master clock, the modulated cw laser signal comprising: the remote coherent optical pulse train; and a modulated cw laser signal; a transfer-remote optical transceiver that: receives the remote coherent optical pulse train from the remote comb; receives the transfer coherent optical pulse train; and produces a RF transfer-remote interferogram in response to receipt of the remote coherent optical pulse train and the transfer coherent optical pulse train; a coarse timing and communications module in electrical communication with a digital signal controller and in optical communication with the free-space optical terminal; the digital signal controller in electrical communication with the remote comb, the transfer-remote optical transceiver, and the coarse timing and communications module and that: receives the local remote clock signal, and the RF transfer-remote interferogram from the transfer-remote optical transceiver; receives a cw laser heterodyne signal; produces a cw laser modulation and a pulse label; produces a remote pulse-per-second output via a pulse selector; produces the pulse label pulse label; and produces a clock feedback signal in response to receipt of the RF transfer-remote interferogram; the coarse timing and communications module in electrical communication with the digital signal controller and that: generates the cw laser heterodyne signal in response to receipt of the incoming modulated cw laser signal; receives the cw laser modulation from the digital signal controller; and produces an outgoing modulated cw laser signal in response to receipt of the cw laser modulation.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

Advantageously and unexpectedly, it has been discovered that atmospheric turbulence does not degrade performance of an optical time distributor. Moreover, an optical time distributor herein provides O-TWTFT for high-performance clocks connected by free-space optical links. Moreover, the optical time distributor provides two-way exchange of frequency comb pulses and phase-modulated laser light over a single-mode free-space optical link and supports frequency comparison, time comparisons, or the full synchronization between distant clocks at sub-femtosecond levels. Beneficially, the optical time distributor overcomes problems with conventional time distribution such as operation between moving platforms, operation at very high-precision by the use of the comb pulse carrier phase, and generation of coherent microwaves at remote sites.

Figure 1:
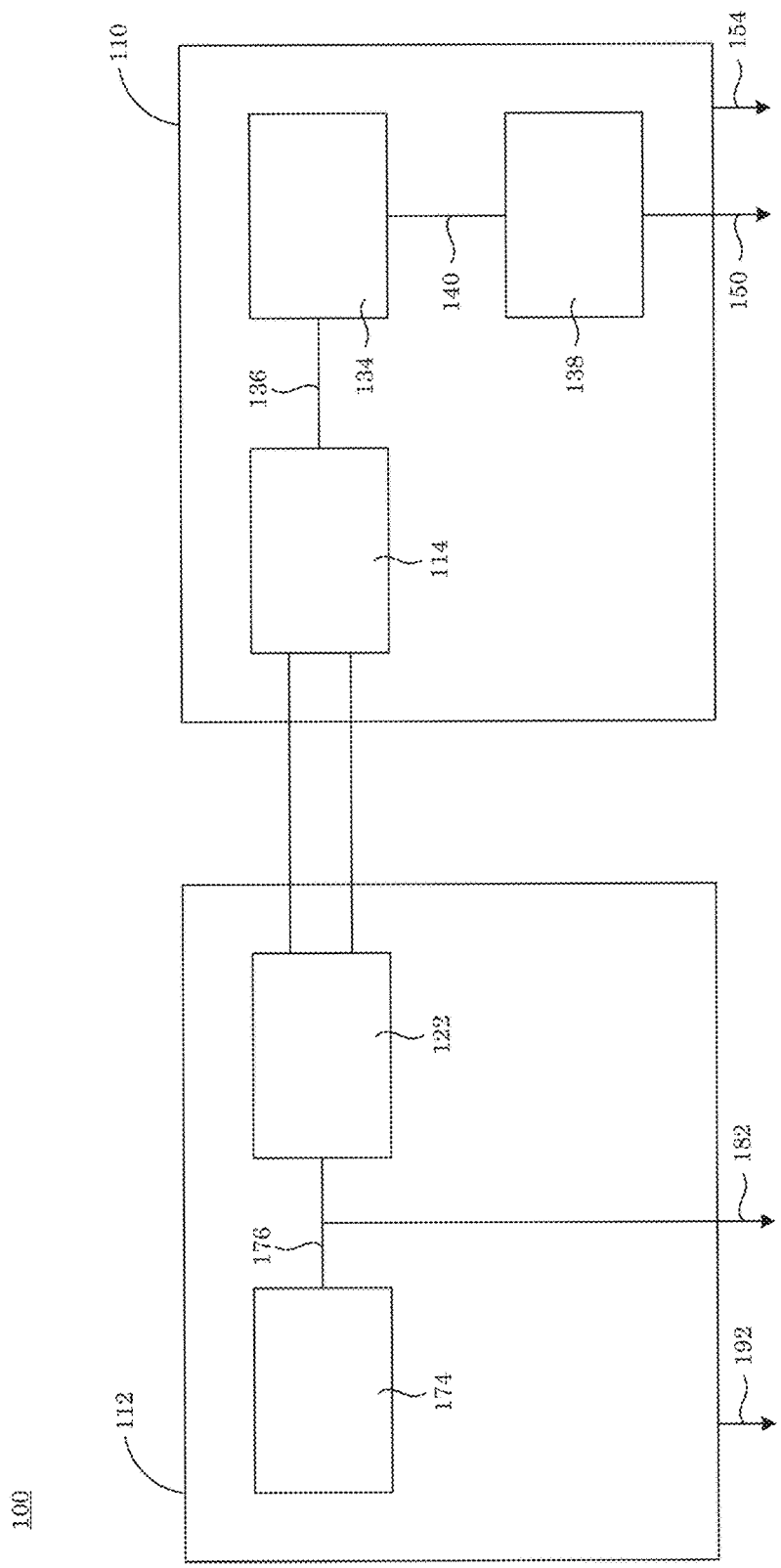
FIG. 1 shows an optical time distributor.

In an embodiment, with reference to FIG. 1, optical time distributor 100 for O-TWTFT includes master clock 110 and remote clock 112. Master clock 110 includes master comb 138 that produces master clock coherent optical pulse train output 150; transfer comb 134 that produces transfer coherent optical pulse train 136; and free-space optical terminal 114 in optical communication with transfer comb 134 and free space link 400. Here, free-space optical terminal 114 receives the transfer coherent optical pulse train 136 from transfer comb 134; produces a master optical signal 116 in response to receipt of the transfer coherent optical pulse train 136; communicates the master optical signal 116 from the master clock 110 to a remote clock 112 via a free space link 400; and receives a remote optical signalremote optical signalremote optical signalremote optical signalremote optical signalremote optical signal remote optical signalremote optical signalremote optical signalremote optical signalremote optical signalremote optical signalfrom a remote optical signal 124 from the remote clock 112, the master clock 110 producing a pulse label 154. Also, remote clock 112 is in optical communication with master clock 110 via free space link 400 and includes remote comb 174. Remote comb 174 produces remote clock coherent optical pulse train output 182 and remote coherent optical pulse train 176. Further, remote clock 112 includes free-space optical terminal 122 in optical communication with remote comb 174 and with free-space optical terminal 114 of master clock 110 via free space link 400. Free-space optical terminal 122 receives remote coherent optical pulse train 176 from remote comb 174 and master optical signal 116 from free-space optical terminal 114 of master clock 110. Moreover, free-space optical terminal 122 produces modulated cw laser signal 124 in response to receipt of remote coherent optical pulse train 176 and communicates modulated cw laser signal 124 to free-space optical terminal 114 of master clock 110, wherein remote clock 112 produces pulse label 192.

Figure 2:
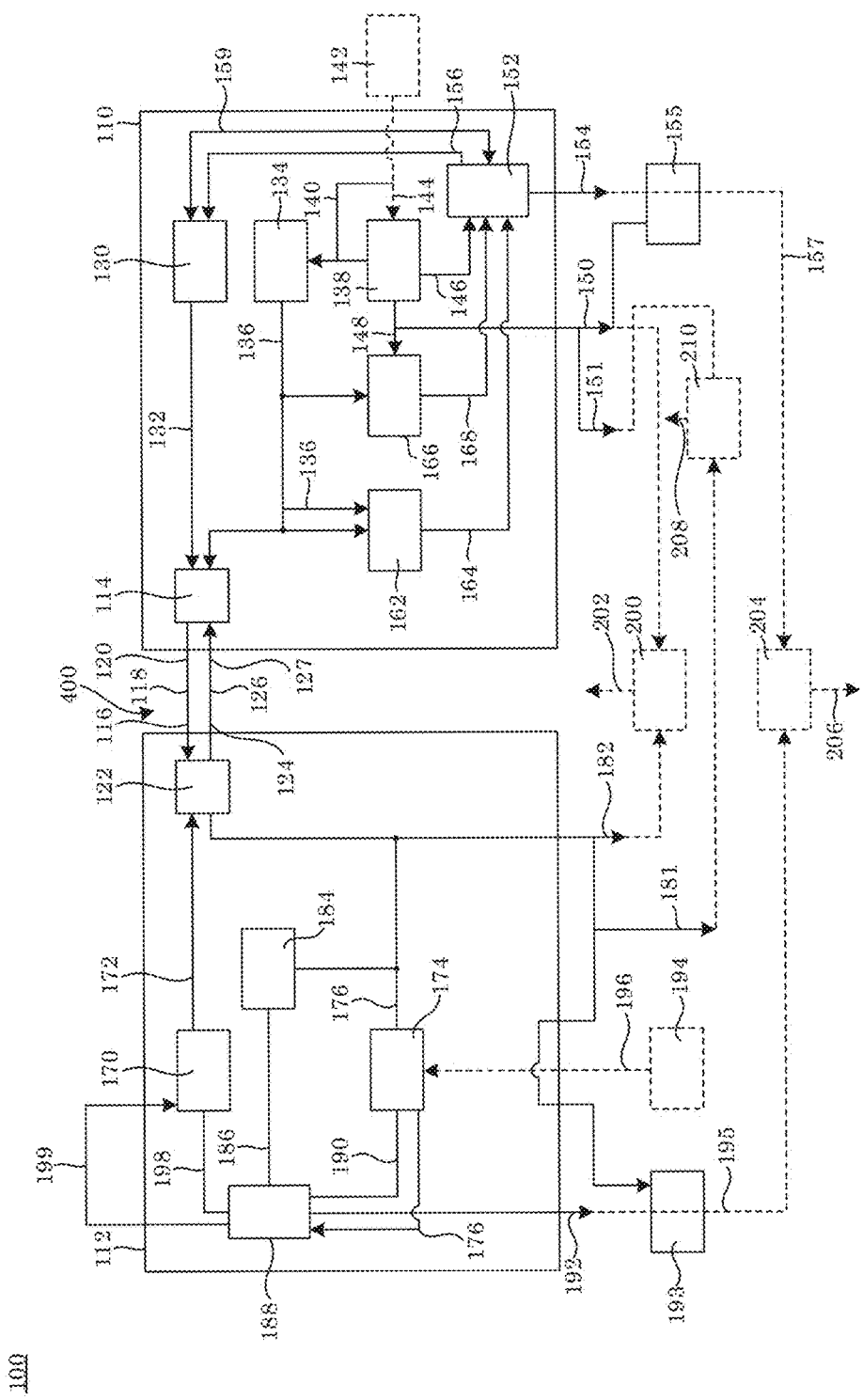
FIG. 2 shows an optical time distributor.

According to an embodiment, with reference to FIG. 2, optical time distributor 100 for O-TWTFT includes master clock 110. Master clock 110 includes: master comb 138 that receives reference oscillator signal 144 from first oscillator 142 and produces: local master clock signal 146; master clock coherent optical pulse train output 150; master frequency output 151; master pulse-per-second output 157; and master coherent optical pulse train 148 in response to receipt of reference oscillator signal 144. Master clock 110 also includes transfer comb 134 that receives reference oscillator signal 140 from first oscillator 142 and produces, in response to receipt of reference oscillator signal 140, transfer coherent optical pulse train 136; master-transfer optical transceiver 166 that: receives master coherent optical pulse train 148 from the master comb 138; receives the transfer coherent optical pulse train 136 from transfer comb 134; and produces RF master-transfer interferogram 168 in response to receipt of master coherent optical pulse train 148 and transfer coherent optical pulse train 136. Master clock 110 further includes remote-transfer optical transceiver 162 that: receives transfer coherent optical pulse train 136 from transfer comb 134; receives remote coherent optical pulse train 176 from remote comb 174; and produces RF remote-transfer interferogram 164 in response to receipt of remote optical signal 124 and transfer coherent optical pulse train 136. Digital signal controller 152 is in electrical communication with master comb 138, master-transfer optical transceiver 166, remote-transfer optical transceiver 162, and coarse timing and communications module 130, wherein digital signal controller 152 receives local master clock signal 146, RF master-transfer interferogram 168, and RF remote-transfer interferogram 164; receives cw laser heterodyne signal 159; produces cw laser modulation 156 and pulse label 154 in response to receipt of local master clock signal 146, RF master-transfer interferogram 168, RF remote-transfer interferogram 164, and cw laser heterodyne signal 159; produces master pulse-per-second output 157 via pulse selector 155; and produces pulse label 154. Additionally, master clock 110 includes coarse timing and communications module 130 in electrical communication with digital signal controller 152 and that: generates cw laser heterodyne signal 159 in response to receipt of modulated cw laser signal 132; receives cw laser modulation 156 from digital signal controller 152; and produces an outgoing modulated cw laser signal 132 in response to receipt of cw laser modulation 156. Master clock 110 includes free-space optical terminal 114 in optical communication with coarse timing and communications module 130, transfer comb 134, and free space link 400 and that: transfers modulated cw laser signal 132 and transfer coherent optical pulse train 136 from master clock 110 to free space link 400; transfers remote optical signal 124 from free space link 400 to master clock 110; and produces master optical signal 116 in response to receipt of modulated cw laser signal 132 and transfer coherent optical pulse train 136, master optical signal 116 comprising: transfer coherent optical pulse train 118; and modulated cw laser signal 120.

Optical time distributor 100 also includes remote clock 112 in optical communication with master clock 110 via free space link 400. remote clock includes: remote comb 174 that receives reference oscillator signal 196 from second oscillator 194 and produces: local remote clock signal 177; remote clock coherent optical pulse train output 182; remote frequency output 181; remote pulse-per-second output 195; and remote coherent optical pulse train 176 in response to receipt of reference oscillator signal 196. remote clock 112 also includes free-space optical terminal 122 in optical communication with remote comb 174 and with master clock 110 via free space link 400, and that receives: remote coherent optical pulse train 176 from remote comb 174; and master optical signal 116 from free-space optical terminal 114 of master clock 110, and that communicates: modulated cw laser signal 124 to free-space optical terminal 114 of master clock 110, modulated cw laser signal 124 including: remote coherent optical pulse train 126; and modulated cw laser signal 127. remote clock further includes transfer-remote optical transceiver 184 that: receives remote coherent optical pulse train 176 from remote comb 174; receives transfer coherent optical pulse train 118; and produces RF transfer-remote interferogram 186 in response to receipt of remote coherent optical pulse train 176 and transfer coherent optical pulse train 118. Further, remote clock 112 includes: coarse timing and communications module 170 in electrical communication with digital signal controller 188 and in optical communication with free-space optical terminal 122; digital signal controller 188 in electrical communication with remote comb 174, transfer-remote optical transceiver 184, and coarse timing and communications module 170 and that: receives local remote clock signal 177, and RF transfer-remote interferogram 186 from transfer-remote optical transceiver 184; receives cw laser heterodyne signal 198;

produces cw laser modulation 199 and pulse label 192; produces remote pulse-per-second output 195 via pulse selector 193; produces pulse label pulse label 192; and produces clock feedback signal 190 in response to receipt of RF transfer-remote interferogram 186. coarse timing and communications module 170 is in electrical communication with digital signal controller 188 and: generates cw laser heterodyne signal 198 in response to receipt of incoming modulated cw laser signal 172; receives cw laser modulation 199 from digital signal controller 188; and produces outgoing modulated cw laser signal 172 in response to receipt of cw laser modulation 199.

In an embodiment, optical time distributor 100 includes: optical synchronization verification 200 in optical communication with master clock 110 and remote clock 112 such that optical time distributor 100 receives master clock coherent optical pulse train output 150 from master clock 110; receives remote clock coherent optical pulse train output 182 from remote clock 112; and produces out-of-loop verification 202 in response to receipt of master clock coherent optical pulse train output 150 and remote clock coherent optical pulse train output 182.

In an embodiment, optical time distributor 100 includes: pulse-per-second verification 204 in optical communication with master clock 110 and remote clock 112, wherein optical time distributor 100 receives master pulse-per-second output 157 from master clock 110; receives remote pulse-per-second output 195 from remote clock 112; and produces optical interference 206 in response to receipt of master pulse-per-second output 157 and remote pulse-per-second output 195.

In an embodiment, optical time distributor 100 includes frequency verification 208 in electrical communication with master clock 110 and remote clock 112, wherein optical time distributor 100 receives master frequency output 151 from master clock 110; receives remote frequency output 181 from remote clock 112; and produces relative phase difference 210 in response to receipt of master frequency output 151 and remote frequency output 181.

In some embodiments, optical time distributor 100 includes first oscillator 142. In certain embodiments, optical time distributor 100 includes second oscillator 194.

In optical time distributor 100, master clock 110 provides a master time, a master frequency output, or a combination of thereof. Additionally, master clock 110 can produce a coherent optical pulse train at the master comb repetition frequency. Similarly, remote clock 112 provides remote time, remote frequency output, or a combination thereof. Additionally, remote clock 112 can produce a coherent optical pulse train at the remote comb repetition frequency and can be synchronized to master clock 110.

master clock 110 includes a number of elements such as free-space optical terminal 114 provides the coupling between the single spatial mode of the fiber optics of master clock 110 and the free-space link 400. Exemplary components of free-space optical terminal 114 include a bidirectional beam path that includes refractive optics for transmitting and receiving the timing and communications signals, a separate beam path for detection of alignment errors due to atmospheric turbulence, a fast-steering mirror for tip or tilt correction, a visible wavelength camera for alignment, and a gimbal mount for coarse pointing. Free-space optical terminal 114 also includes a field-programmable-gate-array (FPGA) controller running a proportional-integral (PI) loop for each error signal detected. In an embodiment, free-space optical terminal 114 includes a fiber collimator, a x-y galvo mirror with a 1.2 kHz servo bandwidth, and a 14:1 Keplerian beam expander leading a 20 mm radius beam with 1.5 dB insertion loss in the bidirectional path. Additionally, free-space optical terminal 114 includes additional fiber collimators, lenses, polarization optics, and quadrant photodetectors for the detection of atmospheric-turbulence-induced pointing errors.

It is contemplated that master optical signal 116 includes optical signals transmitted across the free-space link 400 from master clock 110 to remote clock 112. Exemplary components of master optical signal 116 include the transfer coherent optical pulse train 118 and the modulated cw laser signal 120 generated from master clock 110. In an embodiment, master optical signal 116 includes the transfer coherent optical pulse train 118 at a 200-MHz repetition rate and modulated cw laser signal 120 containing a pseudo-random binary sequence (PRBS) and 10 Megabit per second (Mbps) communications signal.

It is contemplated that transfer coherent optical pulse train 118 include phase coherent optical pulse train generated by the transfer comb 134. Exemplary components of the transfer coherent optical pulse train 118 include phase coherent optical pulses. In an embodiment, transfer coherent optical pulse train 118 includes optical pulses in the near-infrared centered at 1560-nm wavelength with an optical bandwidth of 12 nm and with pulse-to-pulse timing jitter below 5 fs.

It is contemplated that modulated cw laser signal 120 includes a phase-modulated optical output of a cw laser. Exemplary components of the phase-modulated cw laser signal include modulation for coarse timing determination and a communication signal generated by the digital signal controller 152 inside the master clock 110. In an embodiment, the modulated cw laser signal includes a Manchester-encoded PRBS with a 100-ns chip length and a 10 Mbps binary phase-shift keying (BPSK) communications signal.

It is contemplated that free-space optical terminal 122 provides the coupling between the single spatial mode of the fiber optics of remote clock 112 and the free-space link 400. Exemplary components of free-space optical terminal 122 include a bidirectional beam path using refractive optics for transmitting and receiving the timing and communications signals, a separate beam path for detection of alignment errors due to atmospheric turbulence, a fast-steering mirror for tip/tilt correction, a visible wavelength camera for alignment, and a gimbal mount for coarse pointing. Free-space optical terminal 114 also includes a FPGA controller running a PI loop for each error signal detected. In an embodiment, free-space optical terminal 122 includes a fiber collimator, a x-y galvo mirror with a 1.2 kHz servo bandwidth, and a 14:1 Keplerian beam expander leading a 20 mm radius beam with 1.5 dB insertion loss in the bidirectional path. Additionally, free-space optical terminal 122 includes additional fiber collimators, lenses, polarization optics, and quadrant photodetectors for the detection of atmospheric-turbulence-induced pointing errors.

It is contemplated that remote optical signal 124 includes optical signals transmitted across the free-space link 400 from remote clock 112 to master clock 110. Exemplary components of remote optical signal 124 include the remote coherent optical pulse train 126 and the modulated cw laser signal 127 generated from remote clock 112. In an embodiment, remote optical signal 124 includes the remote coherent optical pulse train 126 at a 200-MHz repetition rate and modulated cw laser signal 127 containing a PRBS and 10 Mbps communications signal.

It is contemplated that remote coherent optical pulse train 126 includes the phase coherent optical pulse train generated by the remote comb 174. Exemplary components of the remote coherent optical pulse train 126 include phase coherent optical pulses. In an embodiment, remote coherent optical pulse train 126 includes optical pulses in the near-infrared centered at 1560-nm wavelength with an optical bandwidth of 12 nm and with pulse-to-pulse timing jitter below 5 fs.

It is contemplated that modulated cw laser signal 127 includes a phase-modulated optical output of a cw laser. Exemplary components of the phase-modulated cw laser signal include modulation for coarse timing determination and a communication signal generated by the digital signal controller 188 inside the master clock 112. In an embodiment, the modulated cw laser signal includes a Manchester-encoded PRBS with a 100-ns chip length and a 10 Mbps binary phase-shift keying (BPSK) communications signal.

It is contemplated that coarse timing and communications module 130 and 170 generate the outgoing modulated cw laser signal based on signals received from the digital signal controller and measure the optical heterodyne signal between a local cw laser and the in-coming modulated cw laser signal. This It is contemplated that can independently be the coarse timing and communications module inside remote clock 112 or inside master clock 110. Exemplary components of the coarse timing and communications module 130 include a cw laser, a phase modulator, a fiber combiner, and a photodetector. In an embodiment, this It is contemplated that includes a distributed feedback (DFB) laser offset in frequency from the carrier of the received modulated cw laser by 250 MHz, a phase modulator, 50:50 fiber splitters, and a balanced photodetector.

It is contemplated that modulated cw laser signal 132 and 172 includes a phase-modulated optical output of a cw laser inside a single-mode fiber. This It is contemplated that can independently be the modulated cw laser signal inside remote clock 112 or the modulated cw laser signal inside master clock 110. Exemplary components of this It is contemplated that include modulation for coarse timing determination and a communications signal. This It is contemplated that is time multiplexed to be either the received modulated cw laser signal from the free-space link or the outgoing signal generated locally via the coarse timing and communications module. In an embodiment, the modulated cw laser signal includes a Manchester-encoded PRBS with a 100-ns chip length and a 10 Mbps binary phase-shift keying (BPSK) communications signal.

It is contemplated that transfer comb 134 includes a fully self-referenced frequency comb operated at a repetition frequency equal to the master comb repetition frequency plus an offset frequency, $\Delta fr$. Exemplary components of the transfer comb include an octave-spanning frequency comb, actuators to allow for full stabilization including either phase-locking to an optical or microwave reference signal, multiple optical outputs, and a FPGA-based digital controller for comb stabilization. In an embodiment, the transfer comb is a near-infrared all-polarization-maintaining self-referenced frequency comb with a repetition rate of 200 MHz+$\Delta fr$, where $\Delta fr \sim 2.4$ kHz.

It is contemplated that transfer coherent optical pulse train 136 includes the phase coherent optical pulse train generated by the transfer comb 134. Exemplary components of the transfer coherent optical pulse train 136 include phase coherent optical pulses. In an embodiment, transfer coherent optical pulse train 136 includes optical pulses in the near-infrared with pulse-to-pulse timing jitter below 5 fs.

It is contemplated that master comb 138 includes a fully self-referenced frequency comb operated at a repetition frequency, fr. Exemplary components of the master comb 138 include an octave-spanning frequency comb, actuators to allow for full stabilization including either phase-locking to an optical or microwave reference signal, multiple optical outputs, and a FPGA-based digital controller for full stabilization. In an embodiment, the master comb is a near-infrared all-polarization-maintaining self-referenced frequency comb with a repetition rate of 200 MHz.

It is contemplated that reference oscillator signal 140 and 144 includes the single frequency output of the first oscillator 142. This It is contemplated that can independently be the reference oscillator signal used for phase-locking the transfer comb 134 or the reference oscillator signal used for phase-locking the master comb 138. Exemplary components of the reference oscillator include the single frequency output of an oscillator. In an embodiment, the reference oscillator signal includes a 192-THz signal. In another embodiment, the reference oscillator signal includes a 10-GHz signal.

It is contemplated that first oscillator 142 is the frequency reference for master clock 110. Exemplary components of the first oscillator 142 include a frequency reference. In an embodiment, the frequency reference includes a cavity-stabilized 192-THz cw laser. In another embodiment, the frequency reference includes a 10-GHz dielectric resonator oscillator (DRO) plus a quartz oscillator.

It is contemplated that local master clock signal 146 includes the RF local clock signal supplied to the digital signal controller 152. Exemplary components of the local master clock signal 146 include a photodetector for the conversion of the optical pulse train to an RF signal, RF bandpass filters, and the RF frequency used to clock the digital signal controller. In an embodiment, the local master clock signal includes a 200-MHz signal.

It is contemplated that master coherent optical pulse train 148 includes the phase coherent optical pulse train generated by the master comb 138. Exemplary components of the master coherent optical pulse train 148 include phase coherent optical pulses. In an embodiment, master coherent optical pulse train includes optical pulses in the near-infrared with pulse-to-pulse timing jitter below 5 fs.

It is contemplated that master clock coherent optical pulse train output 150 includes the phase coherent train of optical pulses at the master comb repetition frequency output from master clock 110. Exemplary components of master clock optical pulse train output include a phase coherent train of optical pulses at the master comb repetition frequency. In an embodiment, master clock coherent optical pulse train output includes optical pulses in the near-infrared at a 200-MHz repetition frequency with pulse-to-pulse timing jitter below 5 fs.

It is contemplated that master frequency output 151 includes a single RF frequency output corresponding to a harmonic of the master comb repetition frequency. Exemplary components of the master frequency output 151 include a fast photodetector to convert a harmonic of the repetition frequency of the optical pulse train to an RF signal, RF bandpass filters, and the single RF frequency output. In an embodiment, the master frequency output includes a 10-GHz frequency output.

It is contemplated that digital signal controller 152 and 188 receive and process RF signals within the clock, controls the clock outputs, and can provide synchronization feedback. This It is contemplated that can independently be an It is contemplated that to process signals within the master clock, to process signals within the remote clock, control outputs from the master clock, to control outputs from the remote clock, and to provide the synchronization feedback to the remote comb. Exemplary components include a FPGA, a digital-signal-processor (DSP), analog-to-digital converters (ADCs), direct digital synthesizers (DDS), and a graphical user interface (GUI). In an embodiment, the digital signal controller includes an FPGA clocked at 200 Ms/s; a 12-bit ADC; a commercially available DSP; a DDS capable of a 40 MHz output; and a GUI that includes inputs for calibration, system initialization, and optional synchronization feedback.

It is contemplated that pulse label 154 and 192 include the output of the digital signal controller indicating the integer associated with a specific pulse of the coherent pulse train output of the clock. This It is contemplated that can independently be the label of a pulse of the master clock coherent pulse train output or the remote clock coherent pulse train output. Exemplary components include the integer label associated with each pulse. In an embodiment, this label is recorded in the digital signal processor and output to a pulse selector.

It is contemplated that pulse selector 155 and 193 include a device to permit only some pulses from the coherent pulse train output of the clock to pass through to generate a train of pulses that occur at a lower repetition frequency. Exemplary components include a pulse picker and an input for the pulse label emitted by the digital signal controller. In an embodiment, the pulse picker includes a Mach-Zehnder modulator controlled by the digital signal controller to emit a pulse-per-second optical output.

It is contemplated that cw laser modulation 156 and 199 include an RF signal emitted from the digital signal controller which contains the encoded information applied to the cw laser output in the coarse timing and communications module to generate the modulated cw laser signal. This It is contemplated that can independently be either the RF signal emitted from the digital signal controller inside the master clock or the remote clock. Exemplary components include an RF signal. In an embodiment, the cw laser modulation includes the Manchester-encoded packets which contain both the coarse timing and communications signals along with a preamble and error correction signals.

It is contemplated that master pulse-per-second output 157 includes an optical one pulse-per-second output. Exemplary components include a single optical pulse or a burst of pulses emitted every second selected from the master clock coherent optical pulse train output. In an embodiment, one out of every 200 million 150-fs-duration pulses from a 200-MHz repetition frequency optical pulse train is selected.

It is contemplated that cw laser heterodyne signal 159 and 198 include the RF signal generated from the optical detection of the modulated cw laser signal in the coarse timing and communications module. This It is contemplated that can independently be the cw laser heterodyne signal detected inside the master clock or the cw laser heterodyne signal detected inside the remote clock. Exemplary components include a modulated RF signal which arises from the optical heterodyne measurement of the local un-modulated cw laser and the received modulated cw laser signal. In an embodiment, the cw laser heterodyne signal has a carrier frequency of 250 MHz.

It is contemplated that remote-transfer optical transceiver 162 includes the fiber optic components necessary for the optical cross-correlation of the received remote coherent optical pulse train and the local transfer coherent optical pulse train. Exemplary components include fiber optic splitters and combiners to ensure the overlap of the electric fields of the two pulse trains, fiber optic attenuators to balance optical powers, fiber optic bandpass filters to select an appropriate section of the frequency comb spectrum, and photodetectors for the conversion of the optical cross-correlation to an RF signal. In an embodiment, 50:50 fiber splitters and 12-nm bandpass filters centered at 1560 nm are used to generate the optical cross-correlation.

It is contemplated that RF remote-transfer interferogram 164 includes the RF signal generated from the optical cross-correlation of the received remote pulse train and the local transfer pulse train. Exemplary components of the RF remote-transfer interferogram include a train of RF pulses which arrive approximately at the difference in repetition frequencies, i.e. $\Delta fr$, whose peak arrival time contains information about the arrival time of the underlying pulses. In an embodiment, a RF remote-transfer interferogram peak arrives approximately every 400 us and is used to compute the difference in time between the master and remote clocks.

It is contemplated that master-transfer optical transceiver 166 includes the fiber optic components necessary for the optical cross-correlation of the master coherent optical pulse train and the transfer coherent optical pulse train. Exemplary components include fiber optic splitters and combiners to ensure the overlap of the electric fields of the two pulse trains, fiber optic attenuators to balance optical powers, fiber optic bandpass filters to select an appropriate section of the frequency comb spectrum, and photodetectors for the conversion of the optical cross-correlation to an RF signal. In an embodiment, 50:50 fiber splitters are used to generate the optical cross-correlation.

RF master-transfer interferogram 168 includes the RF signal generated from the optical cross-correlation of the master pulse train and the transfer pulse train. Exemplary components of the RF master-transfer interferogram include a train of RF pulses which arrive approximately at the difference in repetition frequencies, i.e. $\Delta fr$, whose peak arrival time contains information about the arrival time of the underlying pulses. In an embodiment, a RF master-transfer interferogram peak arrives approximately every 400 us and is used to compute the difference in time between the master and remote clocks.

It is contemplated that remote comb 174 includes a fully self-referenced frequency comb operated at a repetition frequency, fr. Exemplary components of the remote comb 174 include an octave-spanning frequency comb, actuators to allow for full stabilization including either phase-locking to an optical or microwave reference signal, multiple optical outputs, and a FPGA-based digital controller for full stabilization. In an embodiment, the remote comb is a near-infrared all-polarization-maintaining self-referenced frequency comb with a repetition rate of 200 MHz.

It is contemplated that remote coherent optical pulse train 176 includes the phase coherent optical pulse train generated by the remote comb 174. Exemplary components of the remote coherent optical pulse train 176 include phase coherent optical pulses. In an embodiment, remote coherent optical pulse train 176 includes optical pulses in the near-infrared with pulse-to-pulse timing jitter below 5 fs.

It is contemplated that local remote clock signal 177 includes the RF local clock signal supplied to the digital signal controller 188. Exemplary components of the local remote clock signal 177 include a photodetector for the conversion of the optical pulse train to an RF signal, RF bandpass filters, and the RF frequency used to clock the digital signal controller. In an embodiment, the local remote clock signal includes a 200-MHz signal.

It is contemplated that remote frequency output 181 includes a single RF frequency output corresponding to a harmonic of the master comb repetition frequency. Exemplary components of the remote frequency output 181 include a fast photodetector to convert a harmonic of the repetition frequency of the optical pulse train to an RF signal, RF bandpass filters, and the single RF frequency output. In an embodiment, the remote frequency output includes a 10-GHz frequency output.

It is contemplated that remote clock coherent optical pulse train output 182 includes the phase coherent train of optical pulses at the master comb repetition frequency output from remote clock 112. Exemplary components of remote clock optical pulse train output include a phase coherent train of optical pulses at the remote comb repetition frequency. In an embodiment, remote clock coherent optical pulse train output includes optical pulses in the near-infrared at a 200-MHz repetition frequency with pulse-to-pulse timing jitter below 5 fs.

It is contemplated that transfer-remote optical transceiver 184 includes fiber optic components for the optical cross-correlation of the received transfer coherent optical pulse train and the local remote coherent optical pulse train. Exemplary components include fiber optic splitters and combiners to ensure the overlap of the electric fields of the two pulse trains, fiber optic attenuators to balance optical powers, fiber optic bandpass filters to select an appropriate section of the frequency comb spectrum, and photodetectors for the conversion of the optical cross-correlation to an RF signal. In an embodiment, 50:50 fiber splitters and 12-nm bandpass filters centered at 1560 nm are used to generate the optical cross-correlation.

RF transfer-remote interferogram 186 includes the RF signal generated from the optical cross-correlation of the received transfer pulse train and the local remote pulse train. Exemplary components of the RF transfer-remote interferogram include a train of RF pulses which arrive approximately at the difference in repetition frequencies, i.e. $\Delta fr$, whose peak arrival time contains information about the arrival time of the underlying pulses. In an embodiment, a RF transfer-remote interferogram peak arrives approximately every 400 us and is used to compute the difference in time between the master and remote clocks.

It is contemplated that clock feedback signal 190 includes the output from the digital signal controller 188 which adjusts the repetition frequency of the remote comb so that the outputs of the remote clock 112 are synchronized to the outputs of the master clock 110.

It is contemplated that remote pulse-per-second output 195 includes an optical one pulse-per-second output. Exemplary components include a single optical pulse or a burst of pulses emitted every second selected from the remote clock coherent optical pulse train output. In an embodiment, one out of every 200 million 150-fs-duration pulses from a 200-MHz repetition frequency optical pulse train is selected.

It is contemplated that second oscillator 194 is the frequency reference for remote clock 112. Exemplary components of the second oscillator 194 include a frequency reference. In an embodiment, the frequency reference includes a cavity-stabilized 192-THz cw laser. In another embodiment, the frequency reference includes a 10-GHz dielectric resonator oscillator (DRO) plus a quartz oscillator.

It is contemplated that reference oscillator signal 196 includes the single frequency output of the second oscillator 194 used for phase-locking of the remote comb 174. Exemplary components of the reference oscillator include the single frequency output of an oscillator. In an embodiment, the reference oscillator signal includes a 192-THz signal. In another embodiment, the reference oscillator signal includes a 10-GHz signal.

It is contemplated that optical synchronization verification 200 includes an out-of-loop heterodyne detection between the two-clock coherent optical pulse train outputs. The amplitude of the heterodyne signal depends on the time offset between the two clock outputs. Exemplary components of the optical synchronization verification include a deliberate offset of the remote comb carrier envelope frequency, fiber optic splitters and combiners, fiber optic bandpass filters and a photodetector. In an embodiment, the carrier envelope offset frequency is offset by 1 MHz, ~30 nm of optical bandwidth of the coherent optical pulse train output in the near-infrared is utilized, a balanced photodetector is used, and the range over which clock excursions can be tracked is ~300 fs.

It is contemplated that out-of-loop verification 202 includes the demodulated amplitude from the out-of-loop heterodyne detection signal produced by the optical synchronization verification 200. Exemplary components of the out-of-loop verification include a time series of the demodulated amplitude and the conversion between amplitude and time-offset.

It is contemplated that pulse-per-second verification 204 includes the overlap the electric fields of the remote and master optical pulse-per-second signals to generate an optical fringe pattern at a reference plane when the remote clock is synchronized to the master clock. Exemplary components of the pulse-per-second verification include optics to create a tilt interference pattern and a focal plane array. In an embodiment, the pulse-per-second verification includes an InGaAs focal plane array.

It is contemplated that optical interference 206 includes the optical interference pattern generated from the pulse-per-second verification which has a clear fringe pattern when the pulse-per-second signals are aligned to within the optical pulse width. Exemplary components of the optical interference include the focal plane array image output and the presence or absence of a clear fringe pattern in the output. In an embodiment, appearance of a strong interference pattern indicates that the pulses arrive within their correlation time of ~300 fs.

It is contemplated that frequency verification 208 includes the output of the relative phase difference measurement. Exemplary components of the frequency verification include a time series of the relative phase difference between the frequency output of the remote clock and the master clock.

It is contemplated that relative phase difference 210 includes a device to measure the relative phase difference between the frequency output of the remote clock and the master clock. Exemplary components of the relative phase difference include a phase noise test set, a common oscillator for the down conversion of the frequency outputs to frequencies accepted by the phase noise test set, RF mixers, RF bandpass filters, and RF amplifiers. In an embodiment, the relative phase difference includes frequency outputs from the remote and master clocks at 10.037 GHz, a 10 GHz common oscillator, RF mixers for 10 GHz signals, RF amplifiers, and a phase noise test set comparing two 37 MHz input signals.

It is contemplated that free space link 400 includes the turbulent air path traversed by the master optical signal and remote optical signal. Exemplary components of the free space link include turbulent air located between the master clock and the remote clock. In an embodiment, the free space link includes 0, 2, and 4 km of turbulent air close to the ground. In another embodiment, the free space link includes 12 km of turbulent air within 100 m of the ground.

In an embodiment, a process for making optical time distributor 100 includes constructing three frequency combs, the master comb 138, the remote comb 174, and the transfer comb 138 with repetition frequencies of fr, fr and fr+Δfr respectively; constructing the master-transfer optical transceiver 166, the remote-transfer optical transceiver 162, and the transfer-remote optical transceiver 184; constructing the two free-space optical terminals 114 and 122; constructing two digital signal controllers 152 and 188; constructing two coarse timing and communications modules 130 and 170; assembling master clock 110 and remote clock 112 from their respective subsystems; and programming digital signal controllers 152 and 188 with the signal processing algorithms.

According to an embodiment, a process for transferring time or frequency includes using an optical oscillator as the first oscillator 142 and the second oscillator 194; phase-locking the master comb 134 and the transfer comb 138 to the first oscillator optical frequency; phase-locking the remote comb 174 to the second oscillator optical frequency; establishing the bi-directional single-mode free-space link 400; calibrating the system delays; initializing of the time transfer protocols; recording of interferogram and cw laser heterodyne signals by the digital signal controllers; calculating the time offset between remote clock 112 and master clock 110 in digital signal controller 188; and applying feedback to remote comb 174 to synchronize remote clock 112 to master clock 110.

According to an embodiment, a process for transferring time or frequency includes using an optical oscillator as the first oscillator 142 and the second oscillator 194; phase-locking the master comb 134 and the transfer comb 138 to the first oscillator optical frequency; phase-locking the remote comb 174 to the second oscillator optical frequency; establishing the bi-directional single-mode free-space link 400; calibrating the system delays; initializing of the time transfer protocols; recording of interferogram and cw laser heterodyne signals by the digital signal controllers; and calculating the time offset between remote clock 112 and master clock 110 in digital signal controller 188.

According to an embodiment, a process for transferring time or frequency includes using an optical oscillator as the first oscillator 142 and a microwave oscillator as the second oscillator 194; phase-locking the master comb 134 and the transfer comb 138 to the first oscillator optical frequency; phase-locking the remote comb 174 to the second oscillator microwave frequency; establishing the bi-directional single-mode free-space link 400; calibrating the system delays; initializing of the time transfer protocols; recording of interferogram and cw laser heterodyne signals by the digital signal controllers; and calculating the time offset between remote clock 112 and master clock 110 in digital signal controller 188.

According to an embodiment, a process for transferring time or frequency includes using microwave oscillators for both the first oscillator 142 and the second oscillator 194; phase-locking the master comb 134 and the transfer comb 138 to the first oscillator microwave frequency; phase-locking the remote comb 174 to the second oscillator microwave frequency; establishing the bi-directional single-mode free-space link 400; calibrating the system delays; initializing of the time transfer protocols; recording of interferogram and cw laser heterodyne signals by the digital signal controllers; and calculating the time offset between remote clock 112 and master clock 110 in digital signal controller 188.

According to an embodiment, a process for transferring frequency includes using the transfer comb 138 only within master clock 110; phase-locking transfer comb 138 to the first oscillator 142; phase-locking remote comb 174 to the second oscillator 194; generating local master clock signal 146 from transfer comb 138; and computing the frequency difference between the first oscillator and the second oscillator from the RF remote-transfer interferogram and the RF transfer-remote interferogram.

Optical time distributor 100 and processes herein have numerous advantageous and unexpected properties. Unexpectedly, optical time distributor 100 can compute the clock offset between remote clock 112 and master clock 110 to within femtoseconds despite significant Doppler shifts; can compute the clock offset between remote clock 112 and master clock 110 despite turbulence-induced fades; can compute the clock offset between remote clock 112 and master clock 110 despite turbulence-induced phase noise; can compute the clock offset between remote clock 112 and master clock 110 over a single-mode optical link capable of supporting high-speed optical communication signals; can compute the difference in underlying carrier phase between remote clock 112 and master clock 110; can compute the clock offset between remote clock 112 and master clock 110 in real time to support synchronization bandwidths of 100 Hz or lower; can correct for errors induced by motion to properly synchronize moving remote clock 112 to master clock 110; can synchronize a remote clock 112 with a microwave-based reference oscillator signal to a master clock 110 with an optically-based reference optical signal bridging 6 orders of magnitude in frequency with femtosecond precision; and can compute the frequency difference between the first oscillator 142 and the second oscillator 194 to a fractional precision of $1\times10^{-20}$ even in the presence of strong random frequency walk noise between the two oscillators.

The articles and processes herein are illustrated further by the following Examples, which are non-limiting.

EXAMPLE

Example 1

Synchronization of distant optical clocks at the femtosecond level

The use of optical clocks/oscillators in future ultra-precise navigation, gravitational sensing, coherent arrays, and relativity experiments will require time comparison and synchronization over terrestrial or satellite free-space links. Here, we demonstrate full unambiguous synchronization of two optical timescales across a free-space link. The time deviation between synchronized timescales is below 1 fs over durations from 0.1 s to 6500 s, despite atmospheric turbulence and kilometer-scale path length variations. Over two days, the time wander is 40 fs peak-to-peak. Our approach relies on the two-way reciprocity of a single-spatial-mode optical link, valid to below 225 attoseconds across a turbulent 4 km path. This femtosecond level of time-frequency transfer should enable optical networks using state-of-the-art optical clocks/oscillators.

Optical clocks reach absolute accuracies approaching $10^{-18}$ and optical oscillators (e.g. cavity-stabilized lasers) can provide sub-femtosecond timing stability over seconds. A physical network of optical timescales, derived from these clocks, could enable dramatic improvements in precision navigation and timing, phased sensor arrays, tests of special and general relativity, clock-based geodesy, and even future searches for dark matter. In these applications, the local optical timescale would either be compared against or synchronized to a distant timescale via terrestrial or satellite free-space links. Existing rf-based techniques can support time transfer over free-space links but are limited to 10 ps to 100 ps accuracy and ~1 ps stability, a hundred to a thousand times worse than optical oscillators. The highest performance rf system to date is planned for the ACES mission and will support 300 fs timing stability at 300 s integration and <6 ps timing stability over days from ground to space. Optical clocks/oscillators with femtosecond precision will eventually require analogous optical, rather than rf, time-frequency transfer techniques to realize their full potential. Indeed, optical time-frequency transfer over fiber optics can achieve frequency transfer at $10^{-18}$ fractional stability over 1840 km, time transfer at sub-picosecond stability over up to a thousand kilometers, and sub-femtosecond stability over several kilometers. These fiber links are appropriate for connecting national laboratories but to support the broader applications of clock networks that include mobile or temporary stations, free-space optical timing-links of interest.

The challenge with comparing and synchronizing the time between distant clocks arises from the finite speed-of-light. A direct comparison of their time inevitably includes an unknown and variable path delay in transmitting one clock signal to the other. In two-way RF comparisons, this problem is overcome by transmitting the time signals between clocks in each direction. Subtraction of the measured arrival times then yields the clock time-offsets independent of the path delay provided the path is reciprocal with equal delay in both directions. An analogous two-way time-frequency transfer approach in the optical domain can be based on frequency combs to enable frequency comparisons between remote oscillators after post-processing with a common optical oscillator. Here, we pursue the problem of two-way time comparison between two distant optical timescales and, with active real-time feedback, their time synchronization. The ability to not just compare but to synchronize two distant clocks at the femtosecond level over the air can be a powerful tool but has significant complexity as it requires real-time measurements of the absolute time offset between clocks, real-time communication between sites, and real-time adjustment of the synchronized clock, all with femtosecond-level precision. Moreover, to achieve femtosecond time-synchronization, this two-way approach must cancel variations in the path length between the distant sites to below 300 nm despite kilometer or longer paths through turbulent air.

Here, we show that optical two-way time transfer can indeed compare and synchronize two optical timescales to the femtosecond level and at an update rate of 2 kHz. The basic setup is sketched in FIG. 3a. In this work, we construct two optical timescales based on independent cavity-stabilized lasers (i.e. optical oscillators). We show that these two timescales can be time synchronized with sub-femtosecond stability from 0.1 s to 6500 s (see FIG. 3b), dropping as low as 225 attoseconds at 10 seconds averaging. Over two days, the long-term wander of the time offset is 40 fs peak-to-peak which is attributed to temperature induced variations in the non-reciprocal fiber paths associated with the out-of-loop time verification and the coherent transceivers. This femtosecond-level performance is reached despite strong turbulence-induced fading and piston noise, variations of hundreds of picoseconds in the path delay from turbulence and weather, temporary misalignments of the link, and intentional variations of the path length from 1 m to 4 km. At these levels, a network of optical clocks/oscillators will have a sensitivity a thousand times superior to analogous rf-based systems for timing, navigation and sensing.

With respect to synchronization between two distant optical timescales using two-way time transfer, a first aspect is to create an optical timescale at each site. Atomic optical clocks are operated as frequency standards; they output an optical frequency from a laser stabilized to an optical cavity and atomic transition. Therefore, atomic optical clocks are compared by their frequency ratios, typically via a frequency comb. To create a timescale instead, we phase lock a self-referenced frequency comb to the cavity-stabilized laser. The optical pulses output by the frequency comb are analogous to the "ticks" of a conventional clock. To generate a local time, we label the comb's optical pulses according to their arrival at a defined reference plane. Our goal is to synchronize the two clocks so that their pulses with the same time label arrive at their respective reference planes simultaneously.

We first discuss two-way time transfer, before discussing the modified optical two-way time transfer demonstrated here. Consider two clocks at separate sites A and B. Suppose Site A transmits a pulse at its zero time to Site B. Its measured arrival time according to Site B's clock is $\Delta\tau_{A \to B} = T_{link} + \Delta T_{AB}$ where $T_{link}$ is the path delay and $\Delta T_{AB}$ is the time offset between the clocks. Simultaneously, Site B transmits a pulse at its assumed zero time in the opposite direction to Site A, where its arrival time is $\Delta\tau_{B \to A} = T_{link} - \Delta T_{AB}$. Subtraction of these two arrival times yields the clock time offset, $\Delta T_{AB} = \frac{1}{2}(\Delta\tau_{A \to B} - \Delta\tau_{B \to A})$, that must be adjusted by a calibration constant, $\tau_{cal}$, to account for time delays in the transceiver to a defined reference plane. Summation of the two arrival times provides $T_{link}$.

For our optical timescale, we cannot implement the simple two-way protocol discussed above with direct two-way exchange of the optical-clock pulse-trains because photodetection of the incoming pulses immediately introduces picosecond-level uncertainty, far in excess of the femtosecond timing jitter on the actual optical-clock pulses. Instead, we implement linear optical sampling of the optical pulse trains. Linear optical sampling requires the introduction of a third "transfer" comb that operates at an optical pulse repetition frequency offset by $\Delta f_r$ from both clocks' pulse train repetition frequency, $f_r$. Heterodyne detection between this transfer comb and either clock comb yields an interferogram, or cross-correlation. From the peak location of the cross-correlation, we can infer the relative timing between pulse trains. Since the transfer comb's repetition frequency is offset by $\Delta f_r$, the cross-correlation repeats at this rate, yielding a relative timing measurement at an update rate of $\Delta f_r$.

To combine this linear-optical-sampling-approach with two-way transfer, we locate the transfer comb at Site A. We then measure the two-way timing information across the link between the transfer comb and the clock comb at Site B, as well as the local timing information between the transfer comb and the clock comb at Site A. Specifically, we use linear optical sampling to retrieve three quantities: (i) the time offset between the transmitted clock comb pulses from Site B and the transfer comb pulses at Site A, $\Delta\tau_{B \to X}$, (ii) their analogous time offset at Site B, $\Delta\tau_{X \to B}$, and (iii) the time offset between the transfer pulses and the comb pulses at Site A, $\Delta\tau_{X \to A}$. (Note the subscript "X" denotes the transfer comb.). We can derive a master synchronization equation for the time offset between Site A and Site B as $$\Delta T_{AB} = \qquad (1)$$
$$\frac{1}{2}(\Delta \tau_{B \to X} - \Delta \tau_{X \to B}) - \Delta \tau_{A \to X} + \tau_{cal} - \left(\frac{\Delta f_r}{2f_r}\right)(T_{link} + \Delta t_{ADC}) + \frac{\Delta n}{2f_r},$$

where $T_{link}$ is the time-of-flight across the link, $\Delta t_{ADC}$ is the time offset between the analog-to-digital converters (ADCs) at the two sites, $\Delta n$ is an integer related to the pulse labelling, and $\tau_{cal}$ is a calibration offset that sets the location of the reference planes.

The first three terms of Eq. (1) comprise a generalized two-way time transfer expression. There are the two additional terms, one proportional to $\Delta f_r$ and one proportional to $\bar{n}$. The latter simply accounts for the $1/(2f_r)$ ambiguity in the pulse labeling. The former is a small correction accounting for the mismatch in repetition rates between the transfer comb and clock combs. This mismatch is necessary for the linear optical sampling, but leads to an incomplete cancellation in the two-way comparison of both the path delay, $T_{link}$, and the relative timing of the analog-to-digital converters used in the linear optical sampling, $\Delta t_{ADC}$. The term is small since it is proportional to $\Delta f_r/(2f_r) \sim 1/200,000$ but its inclusion is needed for correct time comparison and synchronization.

The frequency-comb-based measurements cannot provide a value for these last two terms. Instead, we require a "coarse" two-way time transfer measurement that measures $\Delta t_{ADC}$ and $T_{link}$ without ambiguity. To achieve 1 fs uncertainty in $\Delta T_{AB}$, the uncertainty on these measurements must be below $2f_r/\Delta f_r \times 1$ fs, and must be below $1/(2f_r)$ to resolve the integer $\Delta n$. In our system, the uncertainty of this "coarse" two-way time transfer needs to be below 200 ps.

Finally, calculation of Eq. (1) requires combining the two-way timing information measured at each site, which in turn requires rapid, real-time communication between them. Optical communication across a free-space link has dropouts due to turbulence. Here, however, that problem is moot, as the optical communication channel uses the same single-mode spatial link as the comb light. Any turbulence-induced dropouts are correlated and therefore communication is available whenever the timing information is available. Once $\Delta T_{AB}$ is calculated, its value can be used in a feedback loop to synchronize the clock at Site B.

Figure 4:
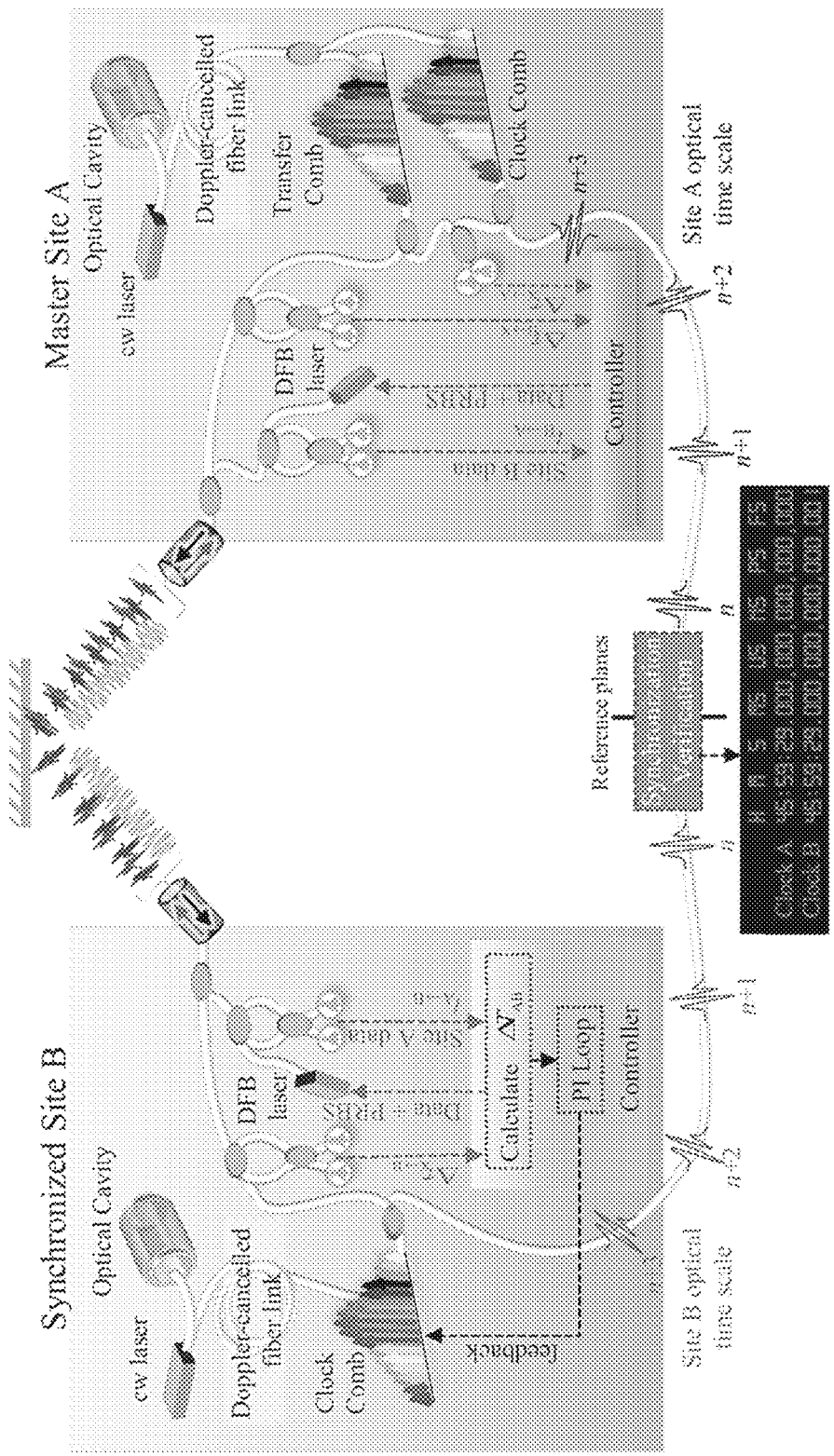
FIG. 4 shows generation and synchronization of two optical time scales, one located at site A and one at site B, via O-TWTFT over a turbulent air path.

FIG. 4 shows a high-level view of the physical system. Sites A and B are connected via a free-space single-spatial-mode optical link covering up to 4 km. This link is folded by use of plane mirrors so that Sites A and B are physically adjacent, enabling synchronization verification via an out-of-loop measurement of the time offset, $\Delta T$, independent of the "in-loop" calculated time offset $\Delta T_{AB}$. Here, the optical time scale from each site is defined by the arrival of pulses from the clock comb at a specified reference plane. For example, the nth pulse from each site arrives at the reference plane at the time shown in the lower display, while the (n+1)st pulse arrives at a time 1/fr later. In the setup here, the two co-located clocks have a common reference plane to allow for out-of-loop synchronization verification. The timing and data exchange between the two sites occurs only over the free-space path shown in the upper part of the figure, and mimics a point-to-point link. In the figure, DFB laser is a distributed feedback laser and phase modulator; PI Loop, proportional-integral loop; symbols.

The optical timescale at each site is based on a cavity-stabilized laser, which acts as an optical oscillator. The cavity-stabilized lasers for both sites are located in an environmentally stable laboratory that is ~350 m from the main transceivers. A commercial cw fiber laser is locked to an optical cavity with a ~1 Hz linewidth and a typical environmentally-induced frequency drift ranging from 0 Hz/s to 10 Hz/s. The frequency of the cavity-stabilized laser is 195.297,562 THz for Site A and 195.297,364 THz for Site B. Two separate Doppler-cancelled fiber links transport these frequencies to Sites A and B, located in a rooftop laboratory. To generate a timescale, at each site we phase lock a self-referenced "clock" frequency comb to the cavity-stabilized laser to produce a 200.733,423-MHz pulse train at Site A and similar pulse train at Site B. The detected pulses are used to clock a field programmable gate array (FPGA) controller that counts and labels each pulse with its arrival time at the selected reference plane, based on a given start time and known pulse repetition period. This conversion from an input optical frequency to a time requires that no phase slips occur in the conversion of the cavity-stabilized laser to the clock comb output; this is verified through monitoring of the phase locks of the cavity-stabilized lasers, frequency combs, and Doppler cancelled links during synchronization. (Although, when synchronized any phase slips in the clock at site B are automatically compensated.) More generally, the cavity-stabilized laser could be steered to an atomic transition to provide an absolute timescale at a single master site, or at both sites, for example in performing relativity experiments.

As described in the previous section, a third transfer comb is needed at the master Site A. It is phase-locked to Site A's cavity-stabilized laser but with a pulse repetition rate that differs by $\Delta f_r$=2.27 kHz from the Site A clock comb. The relative timing between the three comb pulse trains is then measured via linear optical sampling at three balanced detectors at an update rate of $\Delta f_r$=2.27 kHz. From Nyquist sampling considerations, $\Delta f_r$ also sets a maximum transmitted comb optical bandwidth of 8 THz. Here, we filter the transmitted comb bandwidth to 16 nm (2 THz), centered at 1555 nm. The comb power at the transmit aperture is 2.5 mW.

We implement the "coarse" two-way time transfer to establish the rightmost terms in Eq. (1) with the timing signal is carried by rf phase modulation of a cw distributed feedback (DFB) laser with a pseudorandom binary sequence (PRBS). The PRBS-modulated DFB laser light and comb light are combined within the same single-mode fiber and launched via the same free-space optical terminals with tip/tilt control to compensate for turbulence-induced beam wander. The PRBS-modulated light traverses the same single-mode spatial optical link as the two-way comb light and therefore measures the same path delay over the air. The detected signals measure the time difference between the ADC clock of Site A at Site B, $t_{A \to B}$, and the reciprocal quantity, $t_{B \to A}$. The sum and difference of these quantities yield unambiguous values of $T_{link}$ and $\Delta t_{ADC}$ with a statistical uncertainty of 57 ps. This coarse two-way time transfer does see a different path delay than the comb light because of non-common mode fiber optic paths in the transceivers, but these differences are included in the calibration and their variations are suppressed by $\Delta f_r/(2f_r) \approx 1/200,000$ in Eq. (1).

The real-time optical communication is implemented across the free-space link using the same hardware as the coarse two-way time transfer, i.e., the phase modulation of the DFB laser light. The data communication is interposed between the two-way transmission of the PRBS signals so that they both occur within a single $1/\Delta f_r$ interval. The controller at Site B combines its local measurements with data from Site A to calculate an in-loop time offset $\Delta T_{AB}$ from Eq. (1), updated at $1/\Delta f_r = 0.5$ ms intervals. For real-time synchronization, $\Delta T_{AB}$ is fed back via a proportional-integral loop filter to adjust the rf offset between the Site B clock comb and its cavity stabilized laser. Effectively, this feedback speeds up or slows down clock B to force $\Delta T_{AB}$ to zero, thereby synchronizing the clocks. For loop stability considerations, the bandwidth of this feedback should be below $\sim\Delta f_r/4 = 500$ Hz. Here, however, based on the free-running noise of the cavity-stabilized laser and measurement noise level on $\Delta T_{AB}$, a 10 Hz feedback bandwidth minimizes the residual timing jitter.

The system was calibrated, which amounted to cross-calibrating the coarse two-way transfer with the comb-based measurement and selecting the phase delays of the remote clock so its reference plane coincided with the master clock. With this common reference plane, we can verify that pulses with the same time label do indeed arrive simultaneously. In an application, the sites would not be co-located and a common reference plane would be neither possible nor sensible. In that case, the remote transceiver would first need calibration against the master transceiver and then to be moved, or alternatively a third portable system could be used to cross-calibrate the remote and master transceivers, depending on the requirements of the application.

Figure 3:
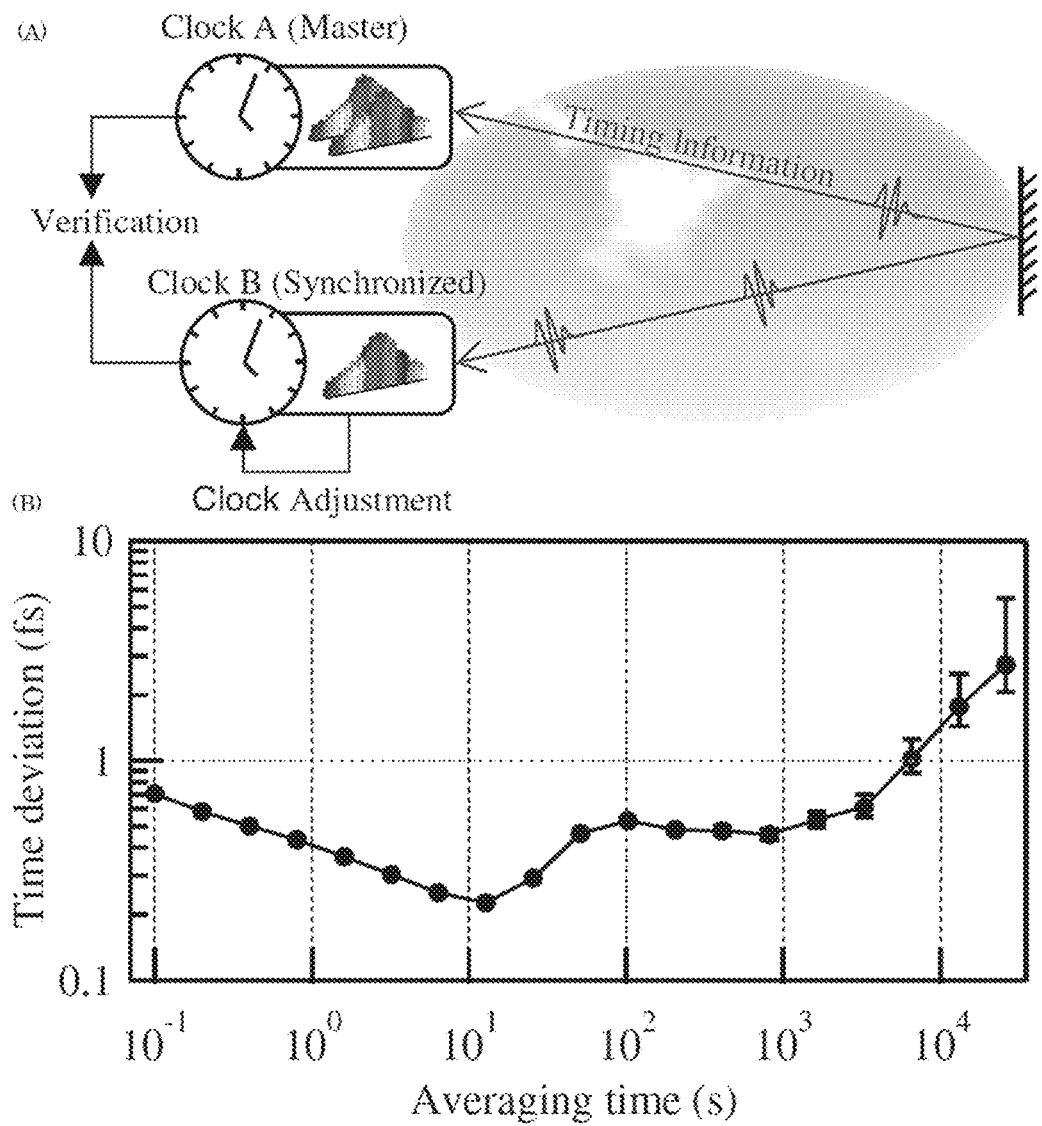
FIG. 3 shows (a) synchronization in which time information is transmitted between sites across a turbulent air path. Real-time feedback is applied to the clock at site B to synchronize it with the clock at site A. A folded optical path allows for verification of the synchronization by a direct "out-of-loop" measurement. (b) Measured time deviation, or precision, between the time outputs while synchronized across a 4-km link, based on data acquired over 2 days.

As shown in FIG. 3, we verify the time synchronization by direct "out-of-loop" measurements of the time offset, $\Delta T$, that are completely independent of the calculated "in-loop" value, $\Delta T_{AB}$.

The most sensitive measurement of $\Delta T$ is achieved by heterodyne detection between the two optical timescale outputs—i.e. the 200 MHz pulse trains from the combs—at the common reference plane. To do this, the carrier-envelope offset frequency of the frequency comb at Site B is purposefully offset relative to the comb at Site A by 1 MHz. In this case, the heterodyne signal of comb pulses overlapping in time at the reference plane appears at 1 MHz with an amplitude that depends on their time offset, as illustrated in FIG. 5a. In the calibration of the remote transceiver, the common reference plane is set such that the response falls in the linear region, i.e. the blue dot in FIG. 5a, and the amplitude gives a direct measure of the variation in the time offset. FIG. 5b shows an example of the measured out-of-loop time offset over the 4-km link. Over the one hour interval, the full standard deviation is 2.4 femtoseconds. The next section provides similar data over a longer time period and for varying path lengths.

Figure 6:
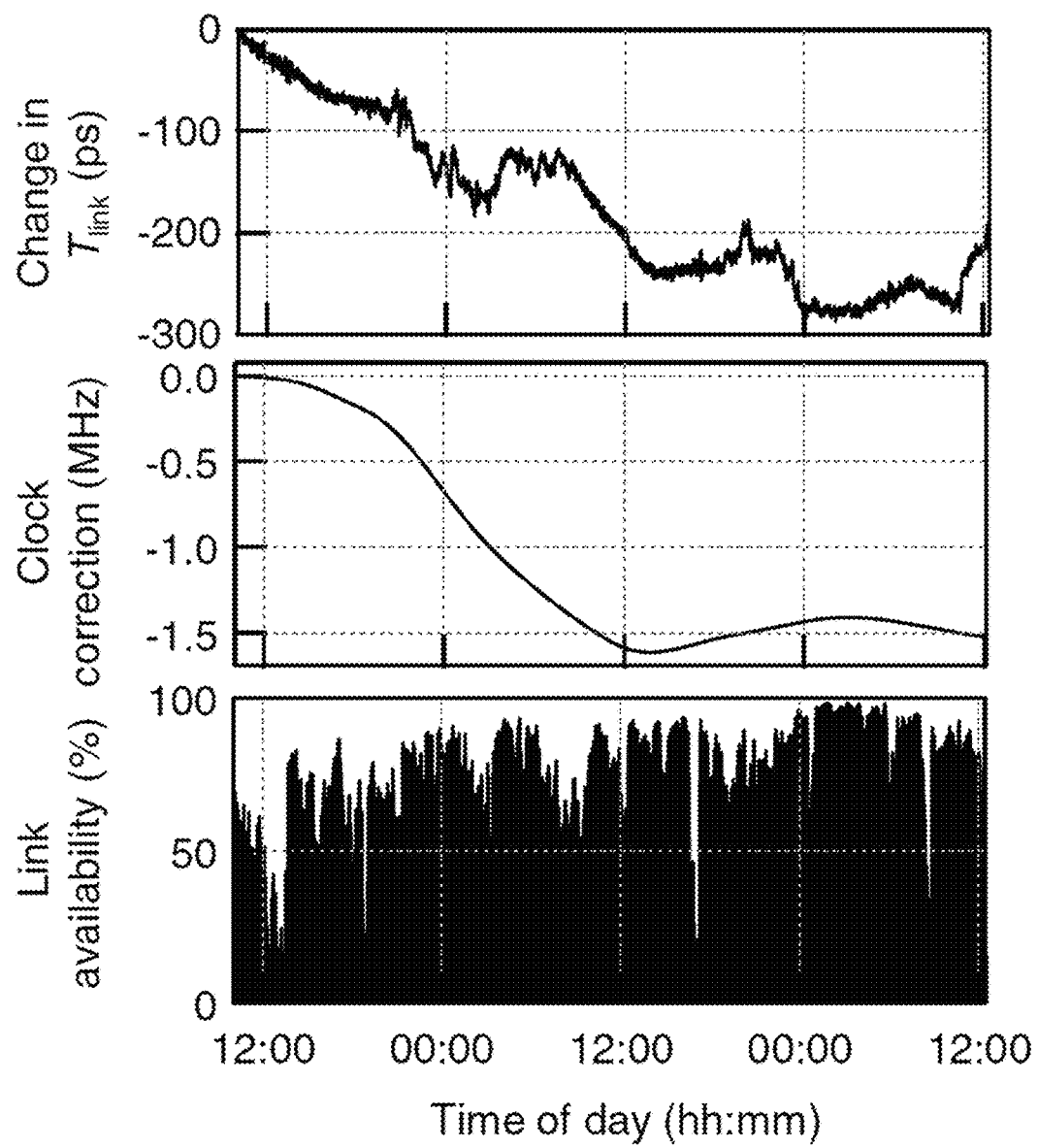
FIG. 6 shows synchronization data across 4-km air path over a 50-h time period including, from top to bottom, the measured time offsets for both the out-of-loop $\Delta T$ (black trace) and the in-loop $\Delta T_{AB}$ (blue trace), the change in time of flight Tlink, the frequency correction applied to the time scale at site B to maintain synchronization, and the link availability. All data are filtered and down-sampled from the 0.5-ms measurement period to 60 s.

With regard to synchronization over multiple days, FIG. 6 summarizes an experiment where Sites A and B were synchronized for over 50 hours across a 4-km free-space link. The system ran without user intervention despite 4° C. rooftop laboratory temperature changes and ended with the arrival of a large snowstorm. The system is able to operate through light snow and rain but not under heavy precipitation.

Figure 5:
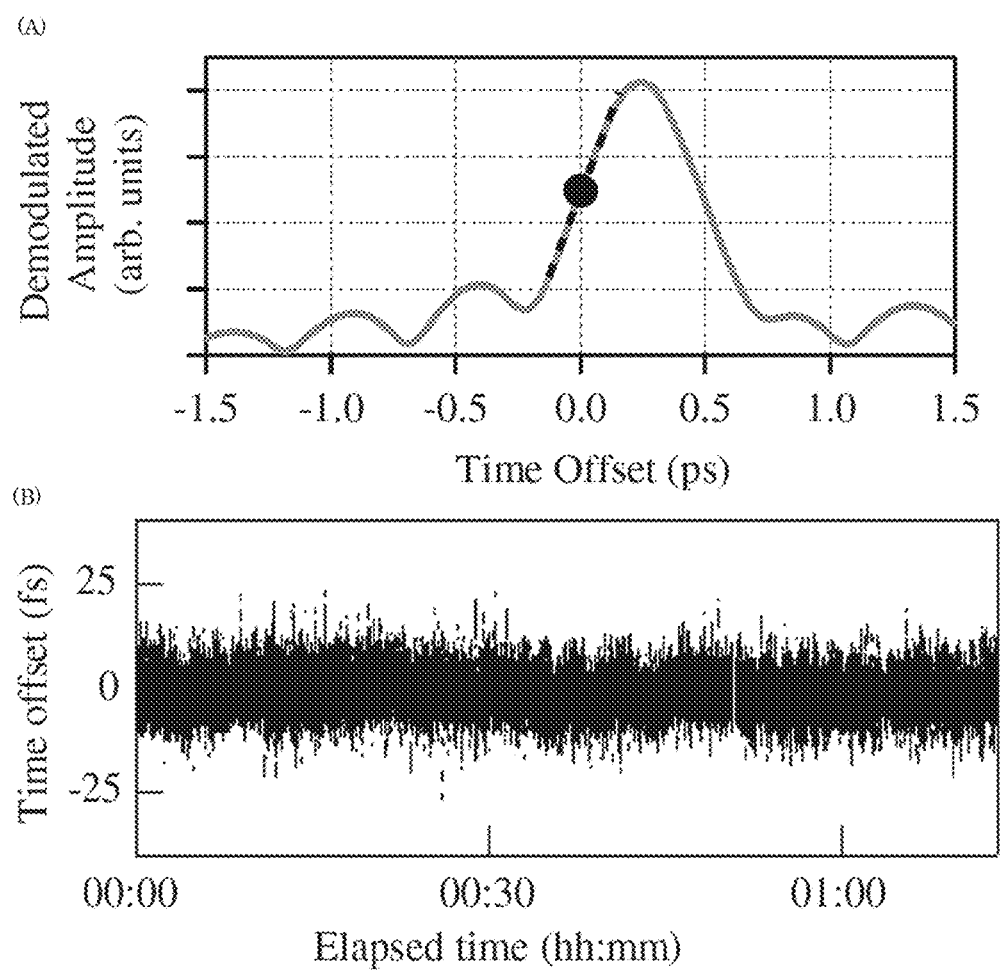
FIG. 5 shows (a) a heterodyne cross-correlation amplitude between the two clock pulse trains versus their time offset. The blue dashed line indicates the linear range of response. (b) Typical measured out-of-loop time offset $\Delta T$ over a 4-km air path based on the heterodyne amplitude. While synchronized, the standard deviation is 2.4 fs.

The top panel plots the out-of-loop time offset as measured using the technique outlined in FIG. 5. These data are smoothed to 60 seconds. An expanded view of the unsmoothed performance over short time periods is given in FIG. 5b. The time-dependent offset is best analyzed by the timing deviation of these data, plotted in FIG. 3b, which is the statistical uncertainty in the time offset as a function of averaging time. From FIG. 3b, this uncertainty is below 1 fs out to 6500 s (1.8 hours), reaching a minimum of 225 attoseconds for a 10-s average. Therefore, we infer that the single spatial-mode link reciprocity over the 4-km air path is verified to below 70 nm at 10 s averaging and below 300 nm out to 6500 s. FIG. 6 shows that over the full 50-hour measurement, the time offset exhibits a larger 40-fs peak-to-peak wander. This time wander does not reflect a breakdown in reciprocity over the free-space link since a shorted link exhibits the same behavior. Instead, it reflects a weak temperature dependence of the system to the 4° C. laboratory temperature variations. Specifically, we attribute most of this wander to temperature-driven path length variations in the ~2 m of fiber that connect the two sites to the common reference plane and within the transceivers.

The second panel of FIG. 6 plots the change in $T_{link}$ over the measurement period. Its average value was ~13 µs, corresponding to the 3,942-m path distance. This time-of-flight variation corresponds to an 8.7-cm variation in optical path. The variation is driven by turbulence and building motion on short periods and by atmospheric temperature changes on longer periods.

Figure 7:
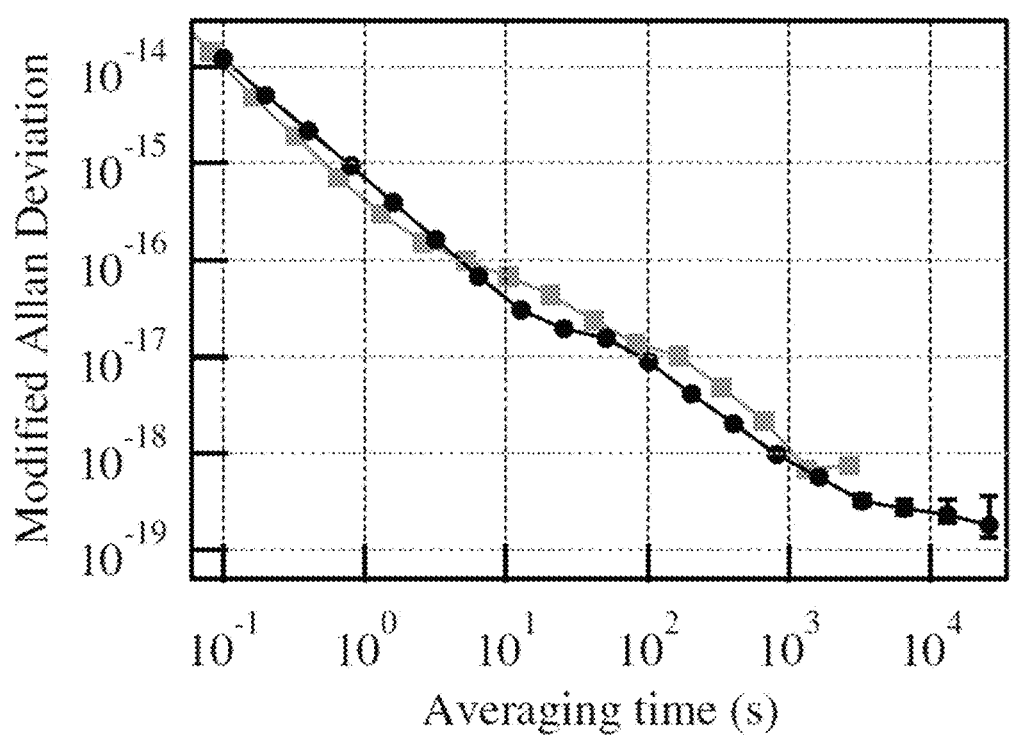
FIG. 7 shows a modified Allan deviation for the corresponding frequency transfer from site A to site B (black trace). The fractional frequency uncertainty reaches $2 \times 10^{-19}$.

The third panel of FIG. 6 plots the frequency correction that is applied to the 195.3-THz optical signal underlying the Site B timescale. The effective time correction is given by the integral of this curve normalized by the optical oscillator frequency of 195.3 THz and reaches 0.98 ms over the 50 hours, reflecting the time wander between the two free-running cavity-stabilized lasers. One of the implicit byproducts of full synchronization is full syntonization, or "frequency lock". The residual frequency uncertainty between the sites is given by the modified Allan deviation, which is simply the timing deviation of FIG. 3b multiplied by $\sqrt{3}/t_{avg}$, where $t_{avg}$ is the averaging time. As shown in FIG. 7, this Allan deviation is included in the earlier 2 km measurements despite the additional complexity of full time synchronization and longer distance. Moreover, it extends to longer averaging times reaching as low as $2 \times 10^{-19}$ beyond 10,000 s.

Figure 8:
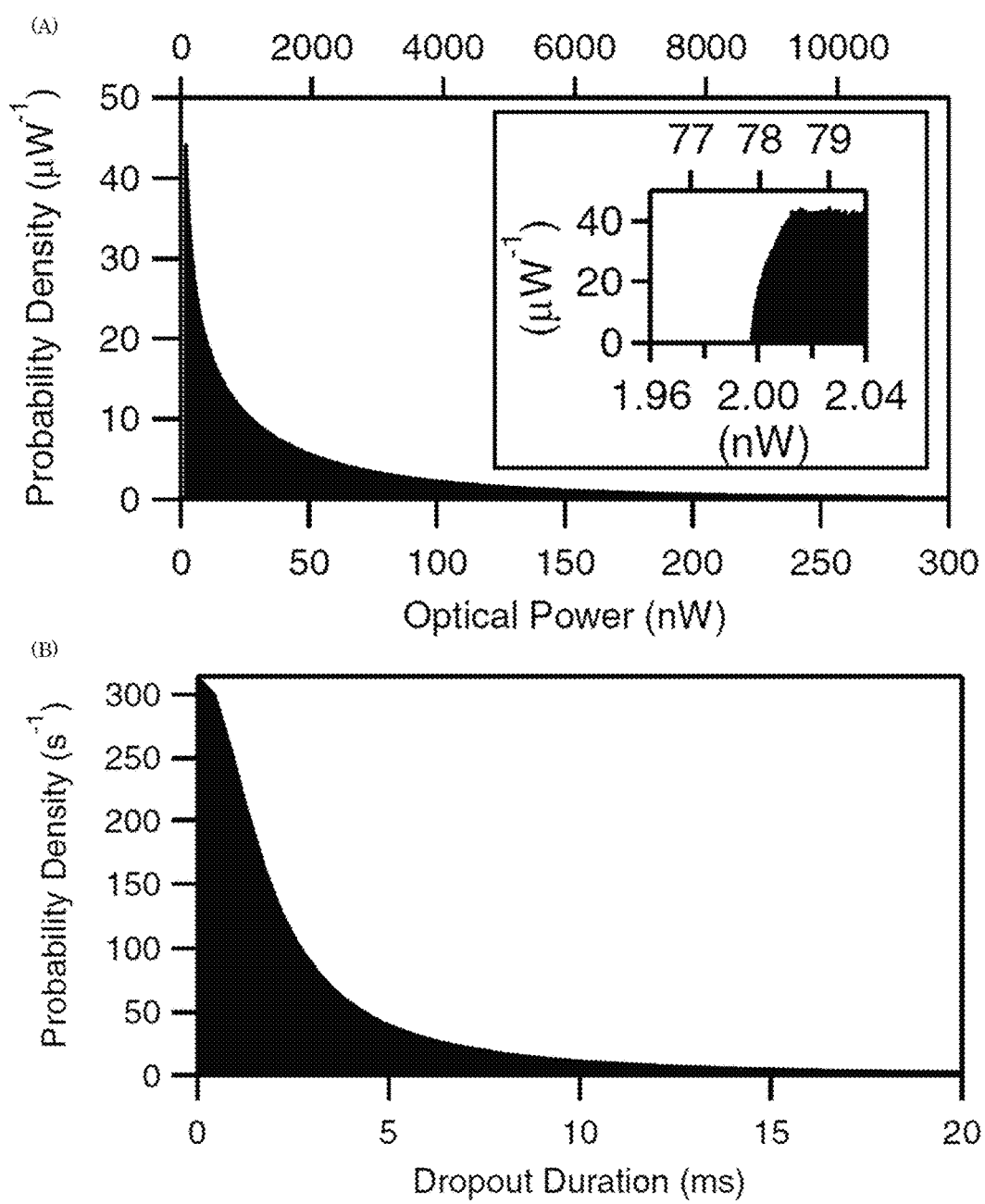
FIG. 8 shows turbulence-induced power fluctuations and dropouts. (a) Probability density of received optical comb power. Inset shows the ~2-nW threshold. (b) Probability density of dropouts versus duration. 90% of the dropouts are below 10 ms. Longer durations are typically due to a disruption of the beam from physical objects, realignment, or heavy precipitation, rather than turbulence. The typical turbulence structure constant is $C_n^2 \approx 10^{-14}$ m$^{-2/3}$ over the link.

Atmospheric turbulence causes fluctuations in the received power. When it falls below the detection threshold, the link is unavailable and there is a "dropout". The bottom panel of FIG. 6 shows the percent of time per minute that the link is available. FIG. 8a shows the distribution of received comb power given the 2.5-mW launched power (well below the eye safe limit.) It varies from 0 nW to ~200 nW, with a median value of 33 nW, compared to the detection threshold of 2 nW, or ~78 photons per pulse. When dropouts do occur, the synchronization is inactive and therefore these periods are excluded from the time offset data. However, these dropouts are typically below 10 ms in duration, as shown in FIG. 8b, and the cavity-stabilized lasers are well behaved so that the time offset at re-acquisition is typically below 6 fs. For systems that require a continuous output, a Kalman filter could be implemented. This is especially critical for less well-behaved oscillators and long dropout durations.

Figure 9:
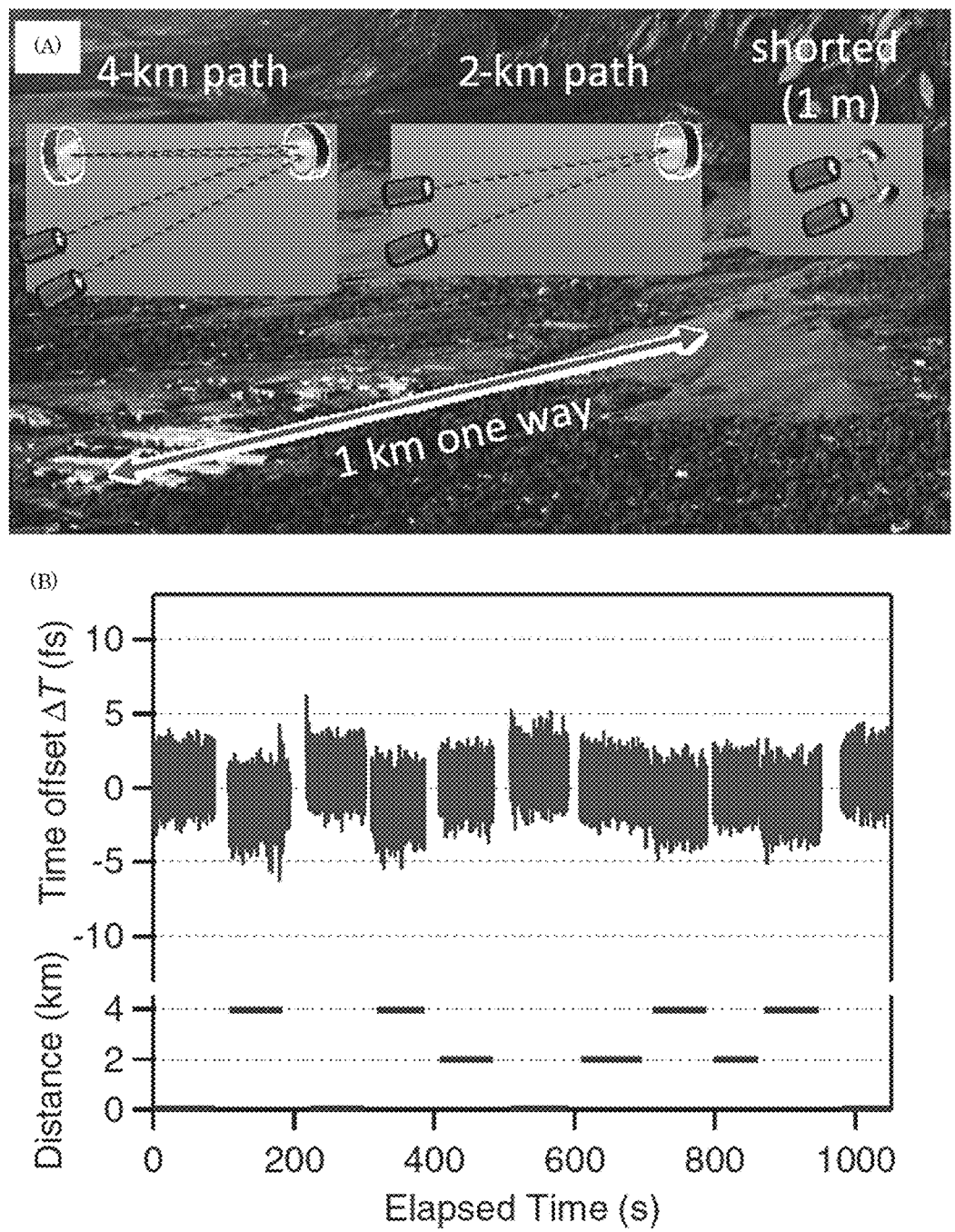
FIG. 9 shows (a) a free space link that traverses the National Institute of Standards and Technology (NIST) campus over 1-m, 2-km, and 4-km distances with the latter achieved by a double pass between two flat mirrors. (b) The out-of-loop time offset $\Delta T$ (blue) as the link distance (green) is changed in real time.

With regard to synchronization maintained despite kilometer-scale length changes, the synchronization is robust against large changes in link distance. In FIG. 9, the out-of-loop time offset, $\Delta T$, is measured while the link distance is alternated between 1 m, 2 km and 4 km by manually adjusting the folding mirrors, as indicated in FIG. 9a. Each adjustment requires about 30 s. The system ran continuously during the link realignment, successfully re-synchronizing within tens of milliseconds of reacquisition of the light across the link. The overall time offset shows less than 2-fs systematic shift with distance, which is attributed to higher-order effects of atmospheric dispersion and link-dependent spectral filtering of the chirped comb pulses. Separate tests found negligible (<1 fs) systematic shifts with received power.

With regard to optical pulse-per-second (PPS), we demonstrate femtosecond-level, unambiguous synchronization by generating analogous optical PPS signals. These optical PPS signals are easily generated by gating out a single pulse from the 200 MHz optical pulse train. At each site, the optical pulse train is fiber coupled to a Mach-Zehnder amplitude modulator (MZM) that is driven from a gate pulse generated by the local FPGA. Since this FPGA tracks the time associated with each optical pulse, it can gate every 200 millionth pulse (where we define our timescales such that the comb repetition rates are exactly 200 MHz). These pulses still carry the precision and accuracy of the synchronized timescales as they still include 150 fs long optical pulses. To verify unambiguous timing, each gated pulse is photo detected and then their arrival is compared on a high bandwidth oscilloscope. To verify synchronicity, the common reference plane was shifted by adjusting $\tau_{cal}$ from that of FIG. 6 to compensate for relative delays between photodetection and the oscilloscopes. FIG. 10a shows an example of synchronization of 1 PPS signals to below ~100 ps, limited by the detector bandwidth. As with FIG. 9, synchronization is preserved across large path-length variations.

These data illustrate that the timing is unambiguous, but the uncertainty is limited by the rf bandwidths. As a more sensitive demonstration, we can spatially interfere the optical PPS from the two timescales. To do this, we construct a spatial interference fringe pattern by coupling the two optical outputs into free space and combining them at a slight angle onto an InGaAs focal plane array. A single PPS pair provides insufficient photons across the focal plane array so we increase the gate time to the MZM for a burst of pulses. Spatial interference fringes will be visible only when those bursts occur at the same time and only when the pulses within the burst overlap in time to well within their ~150 fs duration. The presence of the high-contrast spatial interference pattern indicates unambiguous, femtosecond-level synchronization between sites. FIG. 10b shows such an interference pattern.

The reciprocity of single-spatial mode optical links is sufficient to support femtosecond synchronization of distant optical timescales. Moreover, it is possible to achieve this synchronization in a complex, but robust implementation that can operate for days, over turbulent paths, and over paths of very different lengths.

In the system here, the two timescales are synchronized relative to each other to below 1 femtosecond for up to 1.8 hours. They are not stabilized to an absolute established timescale, although the master Site A could be in principle. This low residual timing is nevertheless useful for a distributed passive or active sensing system or for navigation. In particular, synchronization of distant optical timescales could enable future high-precision navigation/timing networks, e.g. an optically-based GNSS, by synchronizing compact optical oscillators to a few, more complex and larger master optical atomic clocks. The increased accuracy and precision can then yield improved location information, although any rf-based space-to-ground timing distribution would still be limited by atmospheric effects. Some other applications can include an atomic clock at the master site A. For clock-based geodesy or relativity experiments, full atomic clocks are needed at each site for time comparisons. In that case, the residual timing noise associated with any comparison (or synchronization) between sites will be well below the absolute noise of the timescales.

Systematic time offsets with distance were below a few fs at 4 km, and no systematics were observed with variations in received optical power. There are however two important systematics. First, there will be temperature-induced path length changes in non-reciprocal optical paths within either the transceivers or in the verification. These effects can be suppressed by appropriate experimental design and by temperature control, down to tens of femtoseconds as shown here. Second, the width of the optical pulses is 100 fs to 1 ps long; the exact definition of the time associated with these pulses depends on how the end user "reads out" the arrival time of the pulse center at the reference plane, which will necessarily depend on the application. Again, this systematic will be on the order of tens of femtoseconds.

Here, our 4-km path is horizontal and includes turbulence to a longer vertical ground-to-satellite path, but longer distance operation will have higher transmission loss and path delay, $T_{link}$. The higher transmission loss will need to be offset by a reduced detection threshold, higher transmit powers, and improved free-space terminals, possibly including adaptive optics. The longer path delay can potentially cause a breakdown in the reciprocity condition, which assumes a "fixed" turbulence over the two-way measurement time of $1/\Delta f_r$. For $T_{link} \gg 1/\Delta f_r$, the short-term turbulence-induced piston noise may not be negligible, but long-term piston noise should be cancelled via the two-way approach.

Moving platforms present at least two additional problems: point ahead issues and Doppler shifts. For transverse motion between platforms, the "point ahead" effect causes the two signals to traverse slightly different optical paths and therefore will cause a breakdown in reciprocity. As with the impact of a longer path delay, this effect will be strongest in a ground-to-space scenario. The two-way method is valid even with the effects of Doppler shifts. However, the exact implementation here is not Doppler insensitive because of dispersion within the transceivers.

Accordingly, real-time time transfer and synchronization between remote optical timescales includes two-way exchange of optical pulses over a reciprocal free-space link. Sub-femtosecond time synchronization out to 1.8 hours was discussed. The long-term wander over two days is 40-fs peak-to-peak, dominated by measurement uncertainty in the out-of-loop verification. The system was operated over a turbulent 4-km free-space without limitations associated with distance. The single-mode free-space path is fully reciprocal to within our measurement uncertainty which reaches 70 nm at 10 second averaging. This approach can be scalable to much longer paths. The performance is a thousand times superior to rf based methods and should enable future networks of optical clocks/oscillators that are synchronized in real-time with sub-femtosecond stability.

Figure 10:
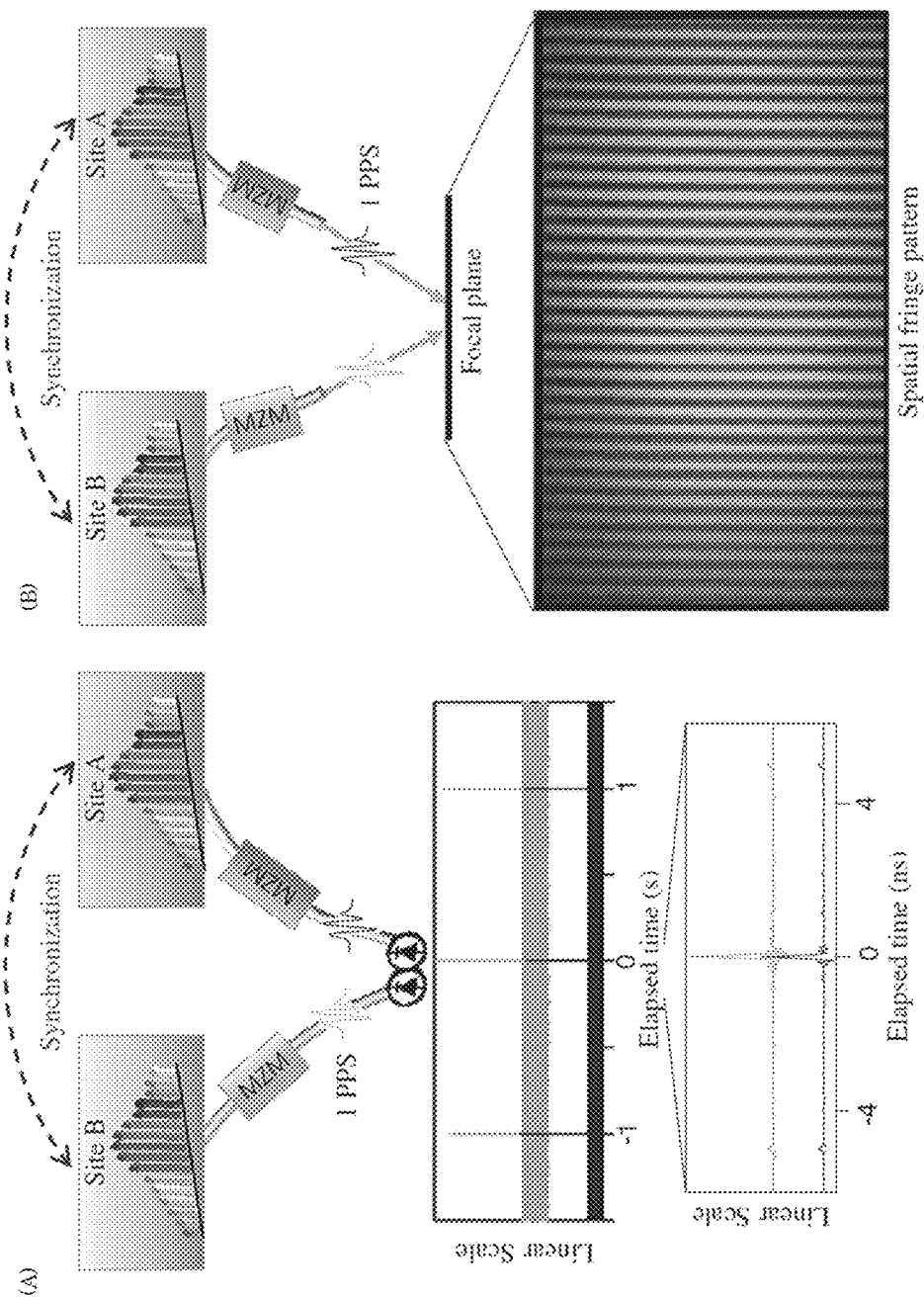
FIG. 10 shows synchronous optical pulse-per-second (PPS) outputs. (a) Synchronous optical PPS photodetection at 8-GHz bandwidth. (b) Optical interference between selected pulse bursts measured through the tilt interference pattern on a focal plane array. The strong interference demonstrates that the pulses arrive well within their correlation time of ~300 fs. MZM, Mach-Zehnder modulator.
Figure 11:
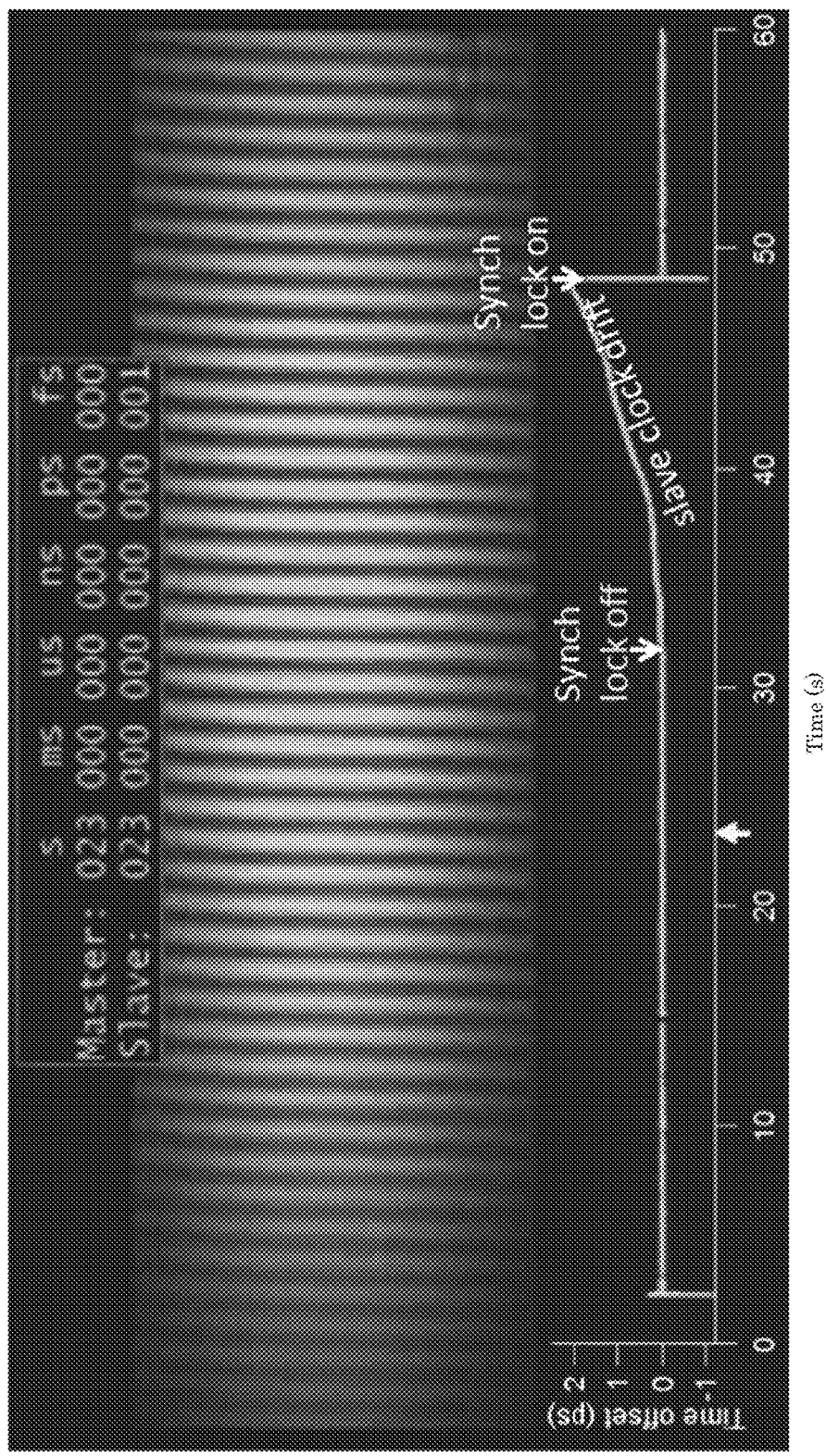
FIG. 11 shows a still shot from a video of a synchronous optical pulse-per-second (PPS) output, wherein optical interference shows synchronization during active synchronization and wherein the remote clock wanders when synchronization is turned off.

Spatial intensity of the overlapping PPS pulses from Sites A and B, recorded with an InGaAs focal plane array is shown in FIG. 10 during operation over a 4-km link. Spatial fringes appear and disappear as the synchronization is activated, de-activated, and re-activated.

With regard to derivation of the master synchronization equation, a derivation of the master synchronization equation includes the time output of a clock versus time. We use the "x" variable for the clock time to write x(t) or view the clock output as a phase. The phase description is a useful one for this system as well. The time marker from the nth comb pulse is $T(n) \equiv nf_r^{-1} + \tau(t)$ in terms of its repetition rate $f_r$ and slowly varying time offset r, as a function of some "absolute" time, t (which will not appear in the final synchronization equation). Second, there are multiple ambiguities that appear as "modulo" operations versus the comb pulse period, $1/f_r$, and the interferogram repetition period, $1/\Delta f_r$. These ambiguities must be appropriately handled for any absolute time comparisons between clocks.

The comb at site A produces a pulse train that is coherent with its cavity-stabilized cw laser, $$E_A(t)=e^{i\phi_A}\Sigma_{n_A}e^{-in_A\theta_0}A_A(t-n_A f_{r,A}^{-1}-\tau_A), \quad (2)$$

where $\phi_A$ is an arbitrary phase, $\theta_0$ is the carrier-envelope offset phase, $n_A$ is a comb pulse index, $f_{r,A}$ is the repetition rate, $\tau_A$ is the time offset. In this form, it is clear the comb outputs pulses whose arrival time provides the time markers $T_A(n_A) \equiv n_A f_{r,A}^{-1} + \tau_A(t)$. Alternatively, the comb can be written as $$E_A(t)=e^{i\phi_A}\Sigma_{k_A}\tilde{A}_{k,A}e^{-i2\pi(k_A f_{r,A}+f_{0,A})(t-\tau_A)}, \quad (3)$$

where $k_A$ is the index of the comb tooth with complex amplitude $A\tilde{A}_{k,A}$ at frequency $k_A f_{r,A}+f_{0,A}$, where the carrier-envelope offset frequency $f_{0,A} \equiv (2\pi)^{-1}\theta_0 f_{r,A}$. This second, equivalent form is useful in deriving the interferogram produced by the product of two combs below.

The other two combs have the same form with variable subscripts "B" and "X" instead of "A". We will assume that the repetition rates are perfect, i.e. we attribute all of the time-varying clock error to $\tau$, which becomes a slowly varying function of time, $\tau(t)$. (In this case, slowly varying means slow on the time scale of $1/\Delta f_r$). We then denote the repetition rates as $f_{r,A}=f_{r,B}\equiv f_r$ and the difference in repetition rate between the site A comb and transfer combs as $\Delta f_r \equiv f_{r,X}-f_{r,A}$.

Linear optical sampling provides femtosecond-level precision by recording the heterodyne signal between the pulse train from a remote comb and local oscillator comb, i.e., their cross-correlation appears as an interferogram. Interferograms are detected in three locations (given by the balanced detectors in FIG. 4). These interferograms repeat with a period $1/\Delta f_r$ as the comb pulses walk through each other. The interferogram voltages are digitized by the local analog-to-digital converter (ADC), which is clocked at the local (Site A or B) comb repetition rate. The interferograms digitized at Site A have ADC sample times of $t_A=n_A f_r^{-1}+t_{0,A}$, where $t_{0,A}$ includes the time delay in detecting the comb pulse and any delays within the ADC itself. The interferogram digitized at the Site B has sample time of $t_B=n_B f_r^{-1}+t_{0,B}$. From the product of the comb electric fields (Eq. (3)) and including a low-pass filter, the digitized interferograms are the series $$V_{A \to X}(t_A) \propto \quad (4)$$

$$\sum_p I_{A \to X}\left(t_A + p\Delta f_r^{-1} + \frac{1}{\Delta f_r}[f_r(\tau_A + \delta\tau_A) - (f_r + \Delta f_r)(\tau_X + \delta\tau_X)]\right)$$

$$V_{B \to X}(t_A) \propto \sum_q I_{B \to X}\left(t_A + p\Delta f_r^{-1} + \frac{1}{\Delta f_r}\left[\begin{array}{c}f_r(\tau_B + \delta\tau_B + T_{Link}) - \\ (f_r + \Delta f_r)(\tau_X + \delta\tau'_X)\end{array}\right]\right)$$

$$V_{X \to B}(t_B) \propto$$

$$\sum_s I_{X \to B}\left(t_B - s\Delta f_r^{-1} - \frac{1}{\Delta f_r}\left[\begin{array}{c}f_r(\tau_B + \delta\tau'_B) - \\ (f_r + \Delta f_r)(\tau_X + \delta\tau''_X + T_{Link})\end{array}\right]\right)$$

after dropping any phase terms, where p, q, and s are integers that essentially label consecutive interferograms of length $1/\Delta f_r$. $I_{A \to X}$ is the cross-correlation of the subscripted pulse envelopes again with an analogous definition for the two other series. For the first two interferograms, the transfer comb (comb X) serves as the local oscillator, while for the third term, comb B does, which causes the sign difference in the envelope terms. The $\delta\tau$ values represent the extra time delay in the transceivers associated with the comb reaching the relevant balanced detector. $T_{Link}$ is the time delay over the reciprocal single-mode path.

We extract the peak location of each interferogram after matched-filter processing to improve the signal to noise ratio. We then scale these peak locations by $\Delta f_r/f_r$ to find:

$$\Delta\tau_{A \to X}(p) = -pf_r^{-1} - (\tau_A + \delta\tau_A) + \frac{(f_r + \Delta f_r)}{f_r}(\tau_X + \delta\tau_X) \quad (5)$$

$$\Delta\tau_{B \to X}(q) = -qf_r^{-1} - (\tau_B + \delta\tau_B + T_{Link}) + \frac{(f_r + \Delta f_r)}{f_r}(\tau_X + \delta\tau'_X)$$

$$\Delta\tau_{X \to B}(s) =$$

$$sf_r^{-1} + (\tau_B + \delta\tau'_B) - \frac{(f_r + \Delta f_r)}{f_r}(\tau_X + \delta\tau''_X + T_{Link}) - \frac{\Delta f_r}{f_r}\Delta t_{ADC},$$

where the $\Delta\tau_{X \to B}$ includes the time offset between the two sites' ADCs as $\Delta t_{ADC} \equiv t_A - t_B = \Delta n f_r^{-1} + t_{0,A} - t_{0,B}$, where $\Delta n \equiv n_A - n_B$. Based on the coarse two-way time transfer, we align the p, q, and s integers to compare the IGMs that are closest in time (to within $1/\Delta f_r$). The linear combination $$\frac{1}{2}[\Delta\tau_{B \to X}(p) - \Delta\tau_{X \to B}(p) - 2\Delta\tau_{A \to X}(p)] = \quad (6)$$

$$(\tau_A - \tau_B) + \left(\frac{\Delta f_r}{2f_r}\right)(T_{link} + \Delta t_{ADC}) + \delta\tau'$$

yields the slowly varying time offset between the sites (the first term) with additional contributions from the imperfect cancellation of the slowly varying link delay and ADC time offsets. The last term is the appropriate linear combination of the various $\delta\tau$ terms in Eq. (5), which are assumed constant. We are interested in the time offset at the reference plane, which is defined as $\Delta T_{AB} \equiv (\tau_A + \delta\tau_{ref,A}) - (\tau_B + \delta\tau_{ref,B})$, where $\delta\tau_{ref,A}$ is the fixed delay of the site A pulses to the site A reference plane and $\delta\tau_{ref,B}$ is similarly defined. (Here the two have the same reference plane so that we can verify synchronization.) We therefore rearrange (6) to find $$\Delta T_{AB}(p) = \frac{1}{2}(\Delta\tau_{B \to X}(p) - \Delta\tau_{X \to B}(p)) - \quad (7)$$

$$\Delta\tau_{A \to X}(p) + \tau_{cal} - \left(\frac{\Delta f_r}{2f_r}\right)(T_{link} + \Delta t_{ADC}) + \frac{\Delta n}{2f_r}$$

or Eq. (1) in the main text where $\tau_{cal} \equiv \delta\tau_{ref,A} - \delta\tau_{rer,B} - \delta\tau'$. $\tau_{cal}$ was measured via a calibration step. Variations in $\delta\tau$ can lead to systematic time wander, as observed over the two-day measurement. In this equation, we also explicitly add a term proportional to $\Delta n = n_A - n_B$ associated with the index of the pulses.

With regard to frequency combs, self-referenced frequency combs included the 972,920[th] mode of Comb A that was phase locked to the Site A optical cavity, while the 972,909[th] mode of the transfer comb, Comb X, was phase locked to the same cavity. This led to a value of $f_r$=200.733, 423 MHz and $\Delta f_r$=2.27 kHz. The 972,919[th] mode of Comb B is phase locked to the Site B optical cavity so that its repetition frequency is close to $f_r$ before the synchronization loop is closed. The combs, as well as the other fiber optics associated with the linear optical sampling and communication/PRBS system, are enclosed in small temperature controlled aluminum boxes within a larger transceiver box, which is loosely temperature controlled.

With regard to coarse two-way time transfer, the coarse two-way time transfer is accomplished via a phase modulated cw DFB laser at 1536.2 nm. At each site, the local FPGA applies a phase modulation to a local DFB laser via an external phase modulator. To enable coherent detection, the two DFBs lasers are frequency locked to an offset of 150 MHz by measurement of the incoming light from Site A at the Site B. At each site, the DFB laser light is combined with the comb light through a wavelength division multiplexer (WDM). To implement the coarse two-way time transfer, Site A first transmits an 80 μs long (~800 chips) Manchester-coded pseudo-random binary sequence (PRBS) phase-modulated laser signal at 100 ns chip length (~10 Mb/s signaling rate). When this is completed, Site B transmits its own PRBS phase-modulated light signal across the link. Both sites use coherent detection to demodulate both the incoming and outgoing PRBS signal and timestamp the departure and arrival of the PRBS signals according to the local ADC time base. (Note that we timestamp the transmission of the PRBS signal with the same ADC used to timestamp the arrival of the PRBS from the opposite terminal to avoid any additional time offsets inherent in the PRBS generation.) From the appropriate linear combination of the four timestamps, we obtain $\Delta t'_{ADC}$ and $T'_{link}$, where the prime indicates these values are associated with coarse two-way transfer link delay and its ADC. Because of this exchange of unique timestamps (64-bits), this measurement has for all practical matters infinite ambiguity range ($5$ ns$\times 2^{64}$).

With regard to communication link, for real-time communication between the sites, the same hardware is used as the coarse two-way time transfer. The coherent phase-modulated light operates in half-duplex mode using Manchester encoded binary phase shift keying (BPSK) at 10 Mbps and a protocol tolerant to link dropouts with low (10 μs) latency. Data integrity is ensured by a simple 10-bit cyclic redundancy error-detection code in each packet. The full bi-directional data and coarse two-way time transfer requires 350 μs.

With regard to calibration, the clock output is the master or remote comb and not the local cavity-stabilized laser. Therefore, the calibration included a continuous phase-coherent connection between the clock comb and local cavity-stabilized laser. As with rf-based two-way time transfer, calibration corrects for time delays within the transceiver, specifically here the differential delays between the comb pulse arrival time at the reference plane and at the linear optical sampling plane. In addition, a calibration step was involved needed to connect the coarse two-way time transfer measurements with the quantities needed for the master synchronization equation.

The master and remote sites can be located remotely from one another (i.e., not co-located) and either the remote transceiver can be pre-calibrated against the master or a third "transfer" transceiver can be included. Here, since they are co-located, we directly calibrate the remote to the master transceiver, but the basic prescription would be the same if the remote transceiver were to be subsequently moved. A "master" clock reference plane is included, and the remote clock is calibrated such that its reference plane coincides (so that we can verify synchronization during the actual measurements). The addition of $\Delta t_{ADC}$ in equation (5) calibrates out any differential time offset in the remote ADC with respect to the master ADC. Second, the addition of $\tau_{cal}$ n Eq. (7) calibrates out any differential path delay to the reference plane for the remote clock with respect to the master clock. Any time varying behavior of these calibration parameters is not tracked by the time transfer and directly shows up in our out-of-loop measurements, reflecting a fair assessment of achieved performance.

Physically, we implement this calibration step using the same hardware as for the heterodyne synchronization verification measurement. Post-calibration, the two sites could be physically separated and the synchronization remains. Again, more generally, any given application might have a different calibration procedure to find $\tau_{cal}$ for example, including initial calibration between a portable remote transceiver with the master transceiver and then subsequent on-site calibration of the remote transceiver with a local optical clock.

Figure 12:
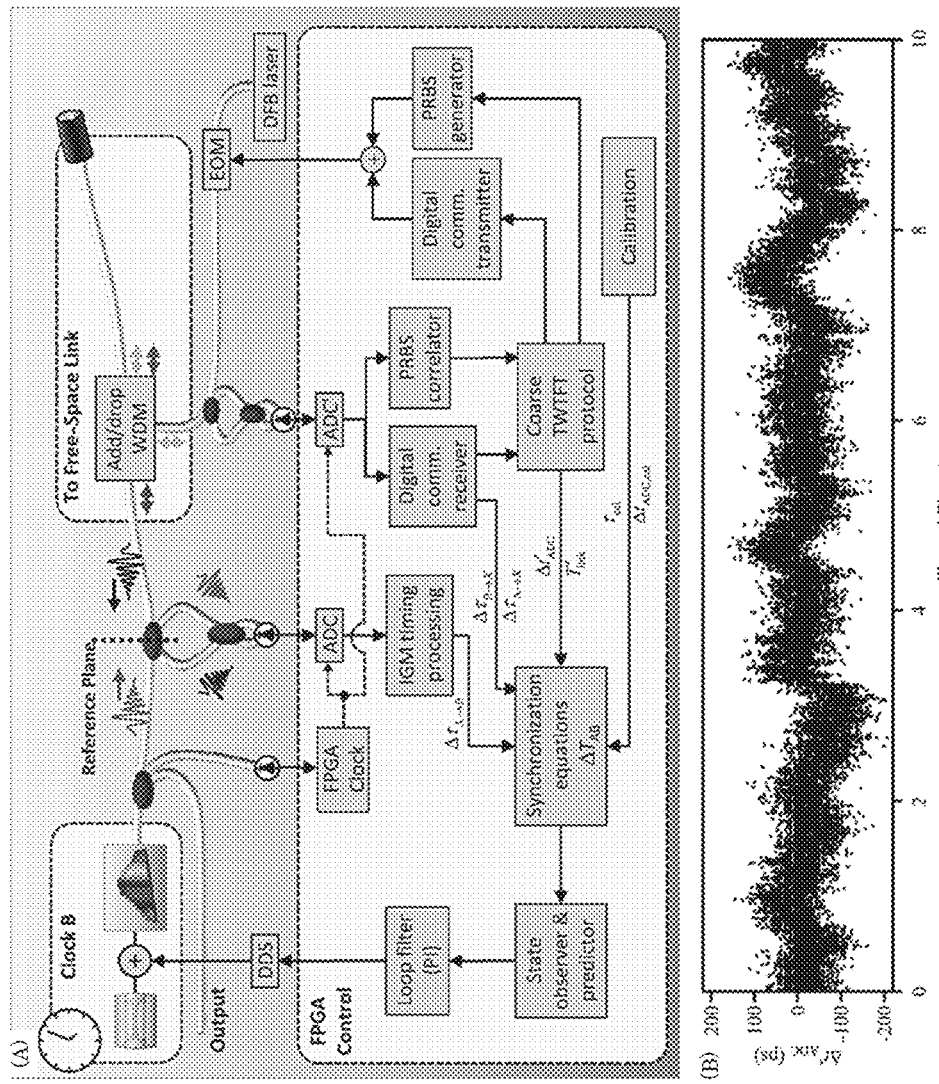
FIG. 12 shows (a) a system on site B that includes quantities for calibration and to the calculation of the master synchronization equation. DDS, direct digital synthesizer; PRBS, pseudorandom binary sequence; ADC, analog-to-digital converter for the linear optical sampling between comb pulse trains; ADC', analog-to-digital converter for the coarse two-way time transfer via the PRBS signals; DFB, distributed feedback laser; EOM, Electro-optic phase modulator; PI, proportional-integral loop filter; WDM, wavelength division multiplexer; IGM, interferograms. TWTFT, two-way time-frequency transfer. (b) Time synchronization between the ADC clocks of the remote and master sites with a standard deviation of below 57 ps.

The calibration step proceeds as follows. We first cross-calibrate the coarse two-way time transfer against the comb-based two-way transfer. This step is independent of the reference plane. It is required for two reasons. First, the coarse two-way time transfer measures the time offset, $\Delta t'_{ADC}$, between the analog-to-digital converter labelled ADC' in FIG. 12 and its counterpart at the master site. But, we need the time offset, $\Delta t_{ADC}$, between the analog digital converter labelled ADC in FIG. 12 and its counterpart; the two are not equal due to clock distribution within the ADC board. We measure $\Delta t_{ADC,Cal} = \Delta t'_{ADC} - \Delta t_{ADC}$ by recording the value $\Delta t'_{ADC}$ when $\Delta T$ crosses zero for an unsynchronized system. Once calibrated, $\Delta t_{ADC} = \Delta t'_{ADC} - \Delta t_{ADC,Cal}$ must remain constant to within ~200 ps for sub-femtosecond uncertainty in the master synchronization equation (because of the factor of $\Delta f_r/f_r$ in Eq (1)). FIG. 12b shows values for $\Delta t_{ADC}$ with a standard deviation of 57 ps. Second, the coarse two-way time transfer measures its path delay $T'_{link}$, but we need the path delay for the comb pulses, $T_{link}$; the two are not equal due to differing lengths of fiber before the wavelength multiplexing in FIG. 12. (The free-space portion of the path is identical.) The fiber path lengths differ by at most a few meters and their variation is well within a ps given the <1° C. temperature stability of the transceiver. We could remove the path delay offset similarly to $\Delta t_{ADC}$ but for simplicity, it is lumped into $\tau_{cal}$, which is discussed next.

Once the offset between the ADC clocks is calibrated, the remote clock is synchronized and the value of $\tau_{cal}$ adjusted until $\Delta T=0$. In actuality, there are multiple delays in the system (see Appendix A), but these are treated as one single effective delay. At this point, the two sites are fully synchronized, i.e. not only do the two clocks "tick" at the same rate, they read the same time at the reference plane. Once calibrated, the link can be interrupted by a long dropout, by manual un-locking, by breaking the phase-lock of the transfer comb or remote comb, by breaking the phase-lock of the DFB lasers etc. and the full synchronization is always regained using the same calibration values. It is important to note that $\tau_{cal}$ is a "number" within the FPGA that can be adjusted at will by the user to shift the reference plane using stored calibration values, for example between that needed for FIG. 6 and FIG. 10. (This occurs by changing the setpoint of the loop filter of FIG. 10a.)

With regard to the free-space link, the combined comb and communication/PRBS light is launched across the 4-km path from single-mode fiber at the input of a free-space terminal. The free-space optical terminals use tip/tilt control to compensate for beam wander due to turbulence and building sway. A 5-mW beacon laser at either 1532.7 nm or 1542.9 nm, well separated from the other wavelengths, is polarization multiplexed with the comb and communication/PRBS light. The combined beams are then expanded in an off-axis, reflective parabolic telescope and launched over free space. At the receiver, the beam is collected by an identical terminal, and a dichroic then directs the beacon laser light to a quadrant detector, while the comb and communication/PRBS light are coupled into single-mode, polarization maintaining fiber which is then connected to the comb-based transceiver. The signals from the quadrant detector on each side are fed into an analog feedback system that controls the tip/tilt through an x-y galvanometric mirror pair, thereby centering the beacon laser and maximizing the comb and communication/PRBS light coupled into the single mode fiber.

Example 2

Tight real-time synchronization of a microwave clock to an optical clock across a turbulent air path.

In this example, numbering of equations begins again with Equation 1.

The ability to distribute the precise time and frequency from an optical clock to remote platforms could enable future precise navigation and sensing systems. Here we demonstrate tight, real-time synchronization of a remote microwave clock to a master optical clock over a turbulent 4-km open air path via O-TWTFT. Once synchronized, the 10-GHz frequency signals generated at each site agree to $10^{-14}$ at one second and below $10^{-17}$ at 1000 seconds. In addition, the two clock times are synchronized to ±13 fs over an 8-hour period. The ability to phase-synchronize 10-GHz signals across platforms supports future distributed coherent sensing, while the ability to time-synchronize multiple microwave-based clocks to a high-performance master optical clock supports future precision navigation/timing systems.

It is contemplated that distribution of time and frequency across a network enables applications such as navigation, coherent multi-static radar, communications and very-long-baseline interferometry. In the past, these applications have relied on microwave-based time-frequency transfer between microwave-based clocks. However, optically-based time-frequency transfer over fiber and free-space has the potential for over a thousand times higher performance. Recently, we demonstrated optically-based two-way time-frequency transfer (O-TWTFT) for comparison between the times of two distant optical clocks over turbulent free-space paths. Moreover, because of the very high bandwidth and precision of O-TWTFT, it was possible to tightly synchronize the two optical clocks to identical times to better than a femtosecond over hours and better than 20 femtoseconds over days.

Figure 13:
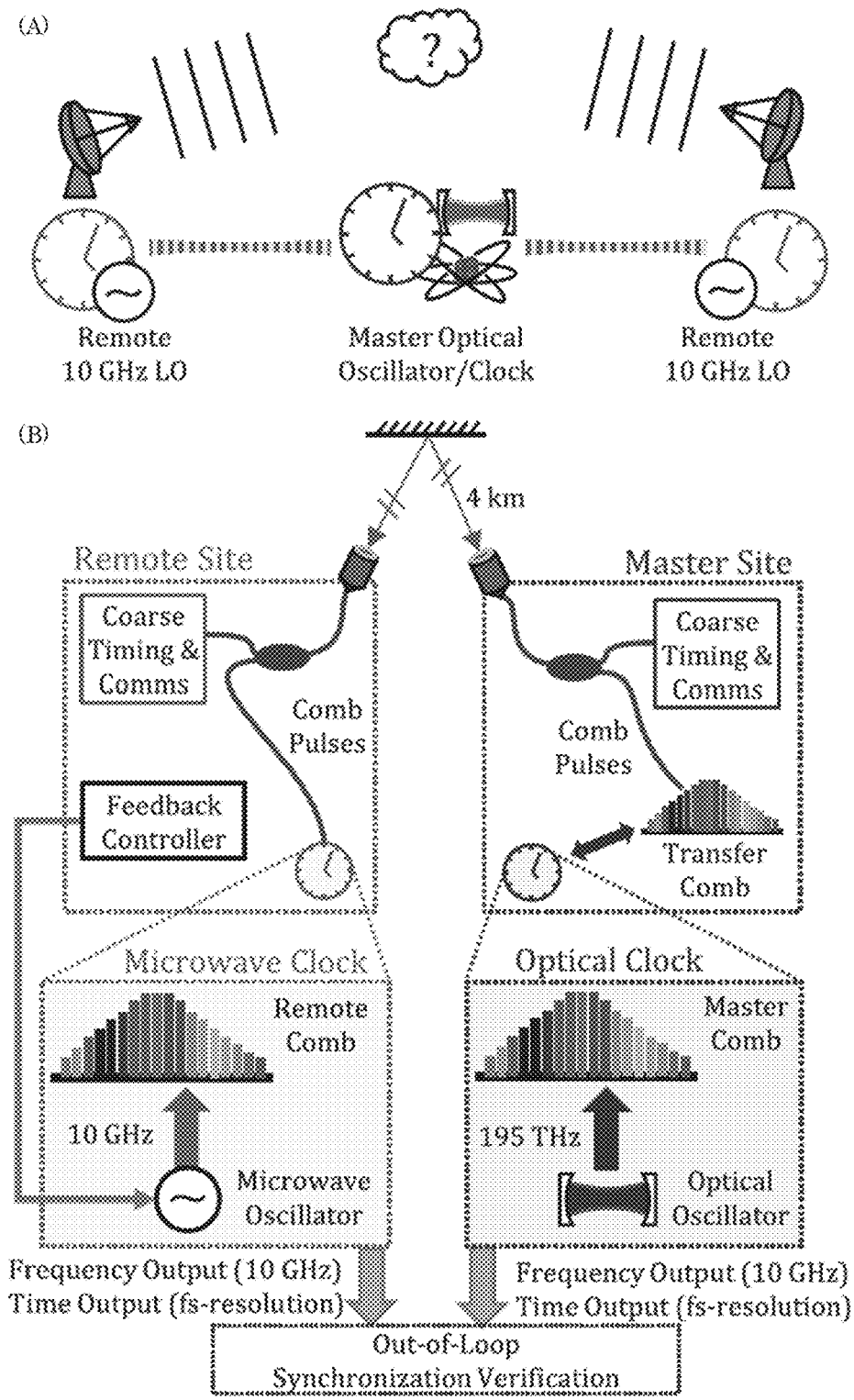
FIG. 13 shows (a) a multistatic synthetic aperture radar, wherein an array of microwave oscillators is synchronized to a single master optical oscillator; LO, local oscillator. (b) The master site's clock is based on a laser stabilized to an optical cavity (optical oscillator). The remote site's clock is based on a combined quartz oscillator and DRO. This remote microwave clock is tightly synchronized to the optical clock over a folded 4 km long air path via O-TWTFT. The time and the frequency outputs from each clock are compared in a separate measurement to verify femtosecond time offsets and high phase coherence of the synchronized signals.

Here, synchronization is described between an optical clock and a remote microwave clock that includes O-TWTFT to support optical-to-microwave synchronization. Microwave oscillators (e.g. quartz and dielectric resonator oscillators) have lower precision than optical oscillators (e.g. cavity-stabilized lasers) and are less expensive, smaller, more robust, and have lower power requirements by orders of magnitude. Further, time-sensitive applications use microwave signal, for example in the X-band at 10 GHz. A microwave clock at the remote sites can supply this required signal directly, efficiently, and at high signal power. In future time networks, optical-to-microwave synchronization would enable fieldable master optical atomic clocks to distribute time across a network of much simpler microwave-based clocks while maintaining the absolute accuracy of the master. As shown in FIG. 13a, applications to other distributed coherent systems include multi-static synthetic aperture radar, precise time-resolved synchrotron measurements, very-long-baseline interferometry and radio-astronomy, pulse-position-modulation communication, or distribution of time to mobile platforms in a GPS-denied situation. Tight synchronization of a microwave clock includes greater timing noise than an optical clock. In GPS-disciplined oscillators, this timing noise is suppressed to the nanosecond level. Here, we suppress this noise to the femtosecond level.

As shown in FIG. 13b, we synchronize our microwave clock to the optical clock over a folded 4 km long turbulent air path. Each clock outputs both a time signal via labelled optical pulses from a local frequency comb and a separate rf frequency signal at 10 GHz. Here, "clock" refers to generation of a local time base rather than an absolute international timescale. It refers to the combination of frequency comb, oscillator, and controller (FIG. 13b) that produces a phase-coherent output of labelled pulses, i.e. "ticks", to define this local time base; we are concerned with the difference between two such relative timescales. With modifications of the system, the master site could also be disciplined to an absolute timescale.

An "out-of-loop" comparison of the time signals shows a time deviation (tdev) below 10 femtoseconds for integration times ranging from 0.01 seconds to 1000 seconds, reaching values as low as 200 attoseconds. This time deviation increases in the presence of turbulence-induced dropouts because of the random walk of the microwave clock. However, it remains below 10 fs at ~85% link availability. A comparison of the 10-GHz frequency signals shows a similarly high level of coherence; the frequency difference, as measured by the modified Allan deviation, is $10^{-14}$ at 1 s and drops to below $10^{-17}$ at 1000 s. Within the 100-Hz synchronization bandwidth, the differential phase noise between the 10-GHz signals is reduced resulting in a 110-dB suppression at a 1-mHz Fourier frequency. The integrated differential phase noise is 375 µrad from 100 Hz to 100 µHz. This integrated phase noise corresponds to 6 fs of timing jitter, which is $3 \times 10^5$ times lower than the 2-ns jitter of the free-running microwave clock integrated over the same bandwidth. This phase coherence at 10 GHz is maintained despite a free-space link that suffers from turbulence-induced dropouts. To summarize, the demonstrated optical-to-microwave clock synchronization performance is comparable to optical-to-optical clock synchronization, in the limit of no turbulence-induced dropouts. Moreover, it provides highly phase-coherent 10-GHz signals.

Synchronization can include a frequency comb to coherently convert phase between the microwave and optical domains. Here, the system exploits the frequency comb for optical-microwave coherence over a distributed system. Timing information is carried by high-bandwidth optical signals, which provides high precision and rapid feedback required to phase-stabilize a remote microwave clock. The remote microwave clock includes a co-located optical frequency comb. Frequency combs are more compact and robust than optical oscillators such as cavity-stabilized lasers.

Figure 14:
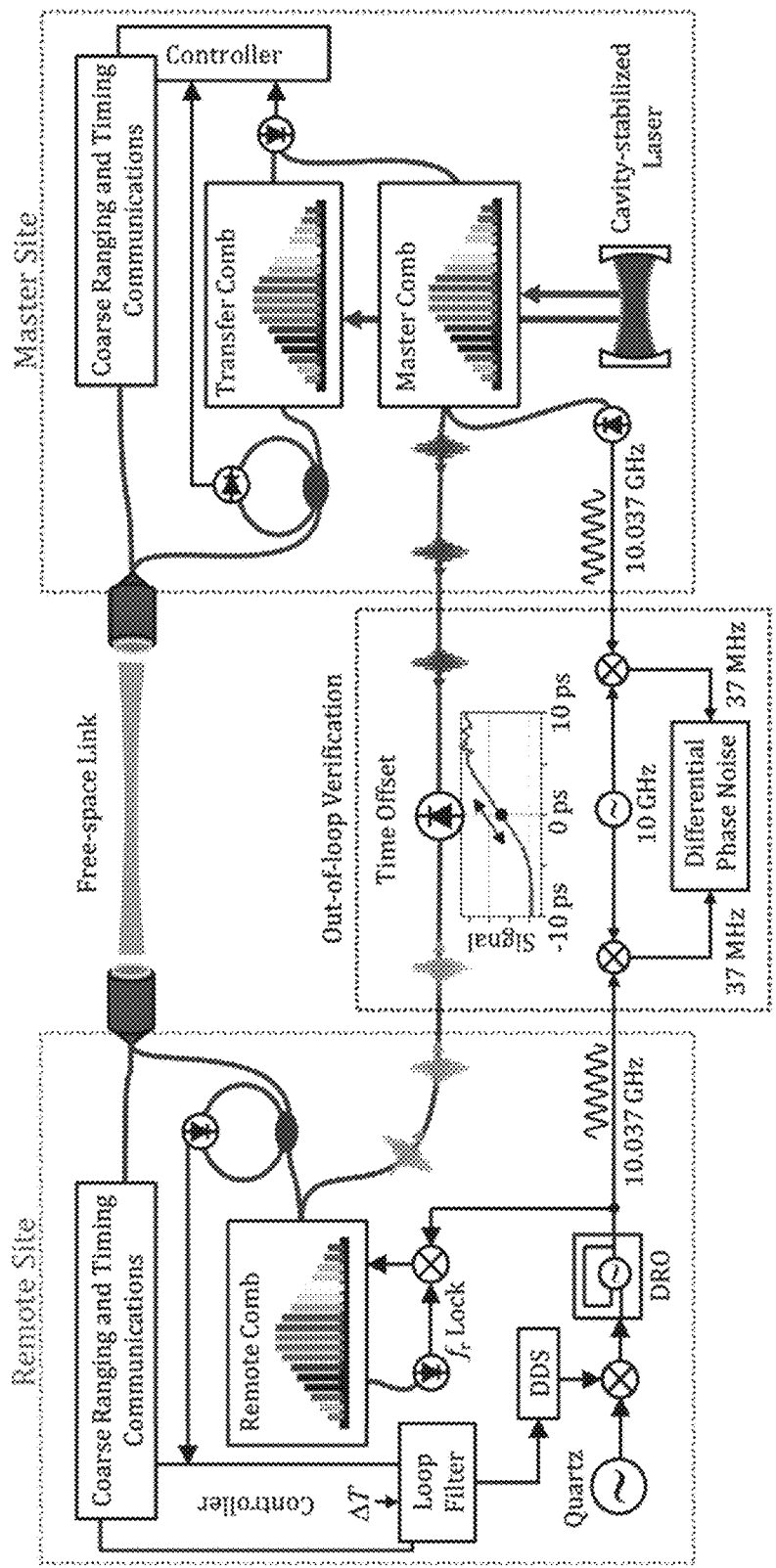
FIG. 14 shows a master optical clock that includes a frequency comb phase-locked to a 195 THz cavity-stabilized laser.

FIG. 14 shows a system in which, at the master site, a compact, self-referenced fiber frequency comb is phase-locked to a cavity-stabilized laser with a residual pulse timing jitter of a few femtoseconds. The frequency comb produces a near-infrared optical pulse train with 200-MHz repetition frequency whose pulses are "labeled" by a local field-programmable gate array (FPGA) controller with respect to their arrival at a calibrated reference plane to define a local time. In addition, the 50th harmonic of the comb repetition frequency is detected to generate a 10-GHz frequency signal. The exact choice of microwave frequency will depend on the application.

At the microwave-clock site, a self-referenced frequency comb is phase-locked to a 10-GHz microwave oscillator via the 50th harmonic of its repetition frequency. (Details on the microwave clock architecture are presented in the supplemental material.) This labelled 200-MHz optical pulse train then provides an optical time output, just as is done at the master site. This clock remains a microwave clock since its timing rests on the underlying compact and inexpensive microwave oscillator rather than a much larger cavity-stabilized laser.

To synchronize the clocks, their time offset must be measured. Although we synchronize a microwave clock, the measurement of the time offset to femtosecond precision is done optically through O-TWTFT. O-TWTFT relies on the reciprocity of a single-transverse-mode spatial link to cancel out turbulence and platform-induced variations in the path length and extracts the underlying clock time offsets. There are three basic subsystems: a comb-based two-way time-frequency transfer, a "coarser" two-way time-frequency transfer via a pseudo-random binary sequence (PRBS) imposed on an optical cw carrier, and a two-way optical communication channel for exchange of timing information. The coarser two-way transfer is necessary to resolve the 5-ns ambiguity of the 200-MHz comb pulses and to provide a coarse path delay measurement. The comb-based time transfer uses a linear optical sampling approach to detect the pulse arrival times with femtosecond-level resolution. This linear optical sampling requires a third "transfer" comb located at the master clock site with a repetition frequency offset by $\Delta f_r$ relative to the master comb.

Optical-to-microwave clock synchronization was performed. First, the microwave clock is constructed to maintain tight phase coherence between the microwave oscillator and local frequency comb used in the time transfer. The timing corrections returned from the O-TWTFT are applied directly to the 10-GHz oscillator so that its output follows the master site at low Fourier frequencies but retains the low phase noise of the dielectric resonator oscillator (DRO) at high Fourier frequencies, which is useful in applications such as synthetic aperture radar and phased-array systems where timing jitter at high offset frequencies degrades performance. Second, the effective overall feedback bandwidth has been increased tenfold to suppress the much higher random walk of the microwave oscillator compared to an optical oscillator. Third, the feedback is applied by a Kalman-filter-based loop filter for optimal hold-over performance during a turbulence-induced dropout.

For the comb-based two-way transfer, the combs are operated at a repetition frequency of $f_r \approx 200$ MHz with the transfer comb's repetition rate offset by $\Delta f_r \approx 2$ kHz. The comb pulses are filtered to a 1.5 THz spectral bandwidth centered at 1560 nm. An average power of 5 mW ($2 \times 10^8$ photons per pulse) is launched across the 4-km folded open-air path from both sites. The folded 4-km path is achieved through use of two 53-cm diameter flat mirrors separated by 1 km. Optical path length variations from mirror motion, just as those from turbulence, are removed by the two-way measurement. 2.5-cm aperture custom low-insertion-loss free-space optical terminals with tip/tilt correction are used to maximize the link availability, i.e. the amount of time the received power is above the detection threshold. The received power varied between 0 nW and 3.8 μW and was below 370 nW for 99% of the time. The detection threshold, the minimum received power for which the in-loop time offset can be computed, was set to 2.5 nW, corresponding to 96 photons per comb pulse. To operate over even longer air paths with similar link availability, a higher launch power will be required to overcome the increased diffraction and integrated turbulence. Also, the increased time-of-flight associated with longer air paths will degrade the two-way reciprocity but it has been shown this effect will have negligible impact on the two-way time-frequency transfer.

The coarser two-way time-frequency transfer and communication link are both implemented by phase modulation of a 5-mW 1536-nm cw laser. This light is then wavelength multiplexed with the comb and co-propagated to the other site where it is heterodyned against the local cw laser and demodulated. For coarse two-way time-frequency transfer, a PRBS modulation is used, while for communication, binary phase-shift keying (BPSK) is used, both operating at 10 Mbps. Communication packets are interposed between adjacent coarse two-way time measurements within a single time interval of length $1/\Delta f_r$.

The communication link transfers the timing data from the master optical-clock site to the remote microwave-clock site. An FPGA-based controller at the microwave-clock site then computes the time offset between the two clocks, $\Delta T$, from the O-TWTFT master synchronization equation every $1/\Delta f_r \approx 0.5$ ms, as long as there is no turbulence-induced dropout. This time offset is input to a Kalman-filter-based loop filter whose output controls the microwave-oscillator frequency via a direct digital synthesizer (DDS). The overall synchronization bandwidth was set at 100 Hz by empirically minimizing the residual timing jitter.

As the overall system is essentially a spatially distributed phase-locked loop, it necessarily drives the measured in-loop time offset, $\Delta T$, to zero. It is therefore critical to verify synchronization through separate out-of-loop measurements, which is possible here through the use of a folded air path (See FIG. 13b). Moreover, the synchronized time outputs and frequency outputs must be separately measured. As shown in FIG. 14, the 10.037-GHz frequency outputs are down-mixed by a common 10-GHz stable oscillator to match the input bandwidth of the phase measurement test system.

The time offsets of the 200-MHz pulse trains are measured through the amplitude variation of their demodulated optical interference. A 1-MHz heterodyne signal from the two pulse trains is obtained by shifting the carrier-envelope-offset frequency of the remote comb. This demodulated signal is shown as the "Time Offset" inset in FIG. 14, where the blue dot indicates "zero" calibrated time offset. Any deviations in amplitude from this zero point reflect time offsets between the clocks. This approach allows for time offset measurements within a range of ±5 ps, based on the choice of optical filters, and femtosecond uncertainty. Direct photodetection of each signal is also possible but will introduce additional time uncertainty. These signals would form the time output of the clock to be used in a real-world application. It is also possible to pulse pick these time signals for a lower rate time signal than 200 MHz, depending on the application.

With regard to synchronization across turbulence-induced dropouts, atmospheric turbulence causes distortions of the beam across the link and thus fluctuations in the received power. Because O-TWTFT includes a single spatial-mode optical link to ensure reciprocity, the fluctuations are relatively strong compared with a multi-mode link. Depending on transmitted power, turbulence strength, and distance, these turbulence-induced fluctuations can sometimes cause the received power to fall below the detection threshold, causing a dropout. The statistics of the dropout frequency and duration will depend on the exact conditions (i.e. turbulence strength, launched power, detection threshold, aperture diameter) and have been analyzed extensively in the context of free-space laser communications. When a dropout occurs, the measured time offset is not updated. Microwave-to-optical synchronization puts greater demands on the system than optical-to-optical synchronization due to the larger excursions of microwave oscillators during these dropouts. The naïve approach of a sample-and-hold leads to runaway behavior. A Kalman-filter-based approach provides close to optimal hold-over behavior.

Figure 15:
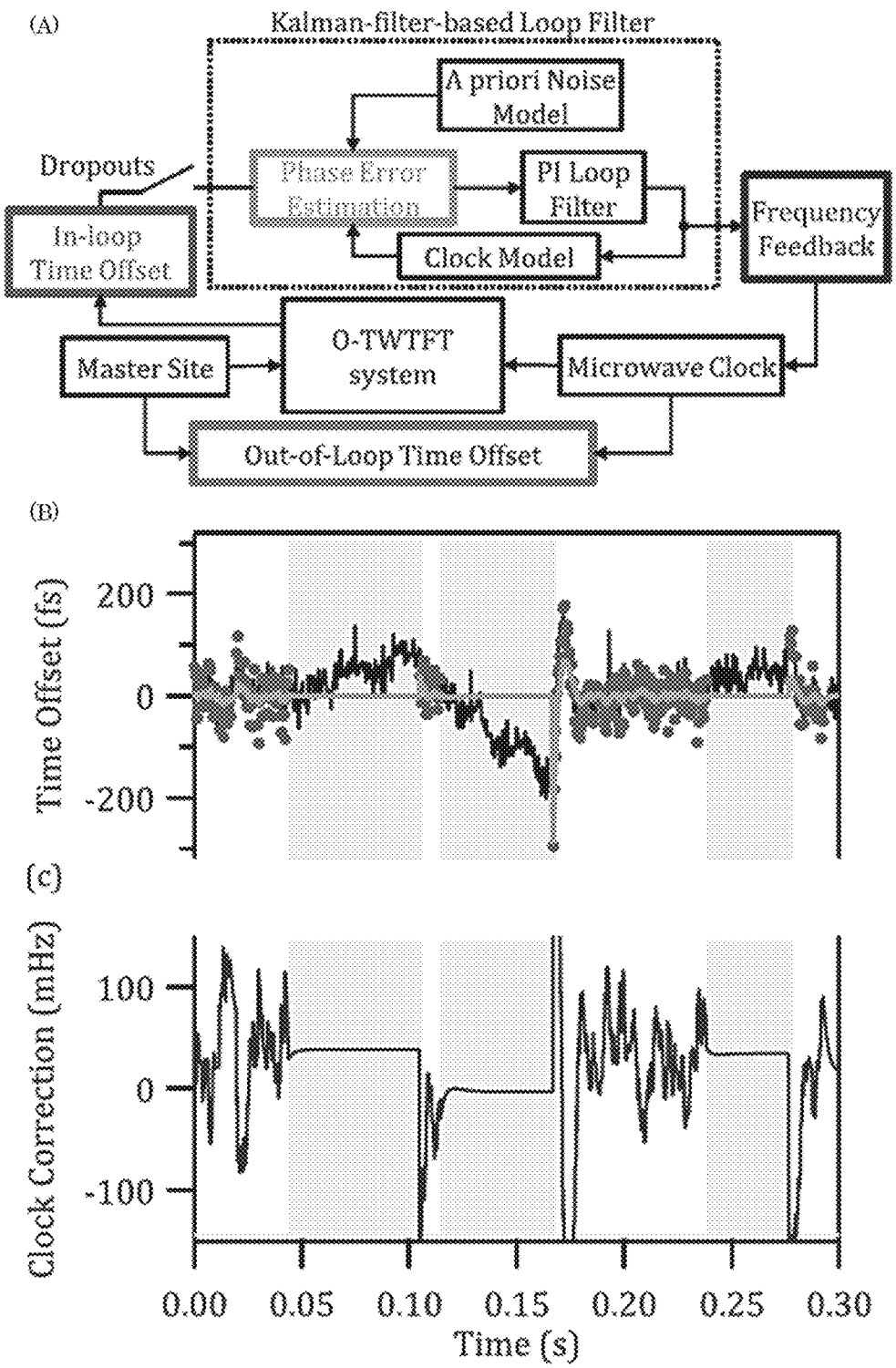
FIG. 15 shows an operation during dropouts. (a) Schematic of the Kalman-filter-based loop filter; PI, proportional and integral. (b) Measured out-of-loop time offset (black trace), in-loop time offset measured via the O-TWTFT system (circles), and predicted in-loop timing offset from the loop filter (orange trace). During the shaded gray regions, the received power over the single-mode link was below threshold, leading to a dropout in the measured in-loop time offset. (c) Correction applied to the frequency of the 10 GHz signal (blue trace)

FIG. 15a shows the implemented loop filter based on a Kalman filter whose state vector contains two variables. The filter performs an estimation of the phase and frequency error between the clocks using intermittent time offset measurements provided by the O-TWTFT system. When a measurement is available, the internal estimate of the timing error is updated using feedback gain factors that depend on the dropout length and an a priori noise model. White ($f^0$) measurement noise and frequency random walk ($f^{-4}$) oscillator phase-noise are assumed here. To ease the implementation of the loop filter on the FPGA, the feedback gain as a function of measurement interval was pre-computed and stored in a look-up table. In FIG. 14, a remote synchronized microwave-based clock includes a frequency comb phase-locked to a 10 GHz oscillator. Each site produces a 10.037 GHz frequency output. At the master optical clock site, this 10 GHz signal corresponds to the 50th harmonic of the 200 MHz repetition rate frequency comb and is generated by optical frequency division. At the microwave clock site, it is the direct output of a quartz/DRO microwave oscillator. At both sites, the time output is defined by the arrival of the labeled optical pulses from the respective frequency combs at a common reference plane. (This step requires a separate calibration with a shorted link.) The two clocks are synchronized by a Kalman-filter-based loop filter that uses the input time offset, as measured through O-TWTFT, to steer the frequency of the DRO. Symbols in the figure include: DDS, direct digital synthesizer; fr, repetition frequency of the frequency comb.

FIG. 15b and FIG. 15c show the performance across relatively long dropouts of 50 ms. (Dropouts due to atmospheric turbulence usually last less than 10 ms under our operating conditions). For most dropouts, the timing error due to the random walk of the microwave clock is below the high-frequency timing-jitter, yet for longer dropouts there can sometimes be a significant excess deviation. The rapid recoveries from the excess deviations will appear in the phase-noise power spectral density (PSD) as an increased white noise floor below the synchronization feedback bandwidth (see FIG. 18). Since the remote controller has knowledge of the dropouts, a distributed system could operate in either "gated operation", only during periods of fully established synchronization, or in continuous mode that includes periods of dropouts. Here, in gated operation, data is masked during the period of a dropout until the in-loop time offset becomes available again and falls below a threshold. The threshold is chosen to be 2σ of the instantaneous in-loop time offset.

Figure 16:
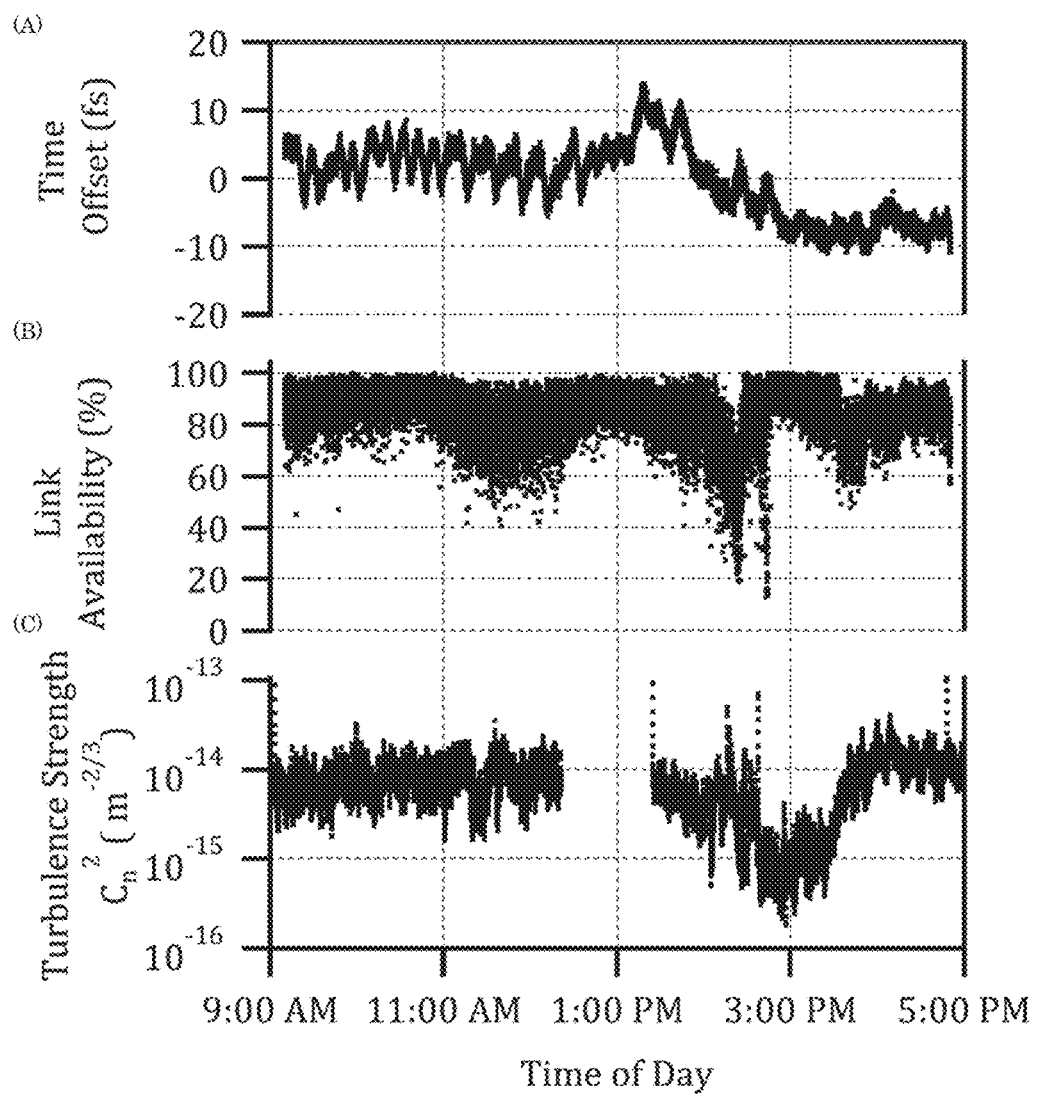
FIG. 16 shows (a) a time offset (gated operation) between optical and microwave clocks. (b) Link availability. (c) Turbulence strength as measured by the turbulence structure function Cn2.

To test the synchronization, the system was operated continuously over an 8-hour period across the 4-km folded link. During this period, the synchronization was verified for both the time and frequency outputs of the clocks. In addition, the link availability, clock correction signals, and turbulence strength were also monitored. The measurement was stopped when shifts in the mirrors used to fold the optical path caused a very long dropout. (The free-space terminals include tip/tilt corrections to correct for temperature and turbulence-induced variations in pointing, but the folding mirrors have no active correction.) FIG. 16 shows a partial data set including the out-of-loop time offset, link availability, and turbulence strength averaged over a 1-second window. The average link availability was 85% but varied significantly over the run depending on turbulence strength and the alignment of the folding mirrors. The time offset is discussed in more detail below.

Figure 17:
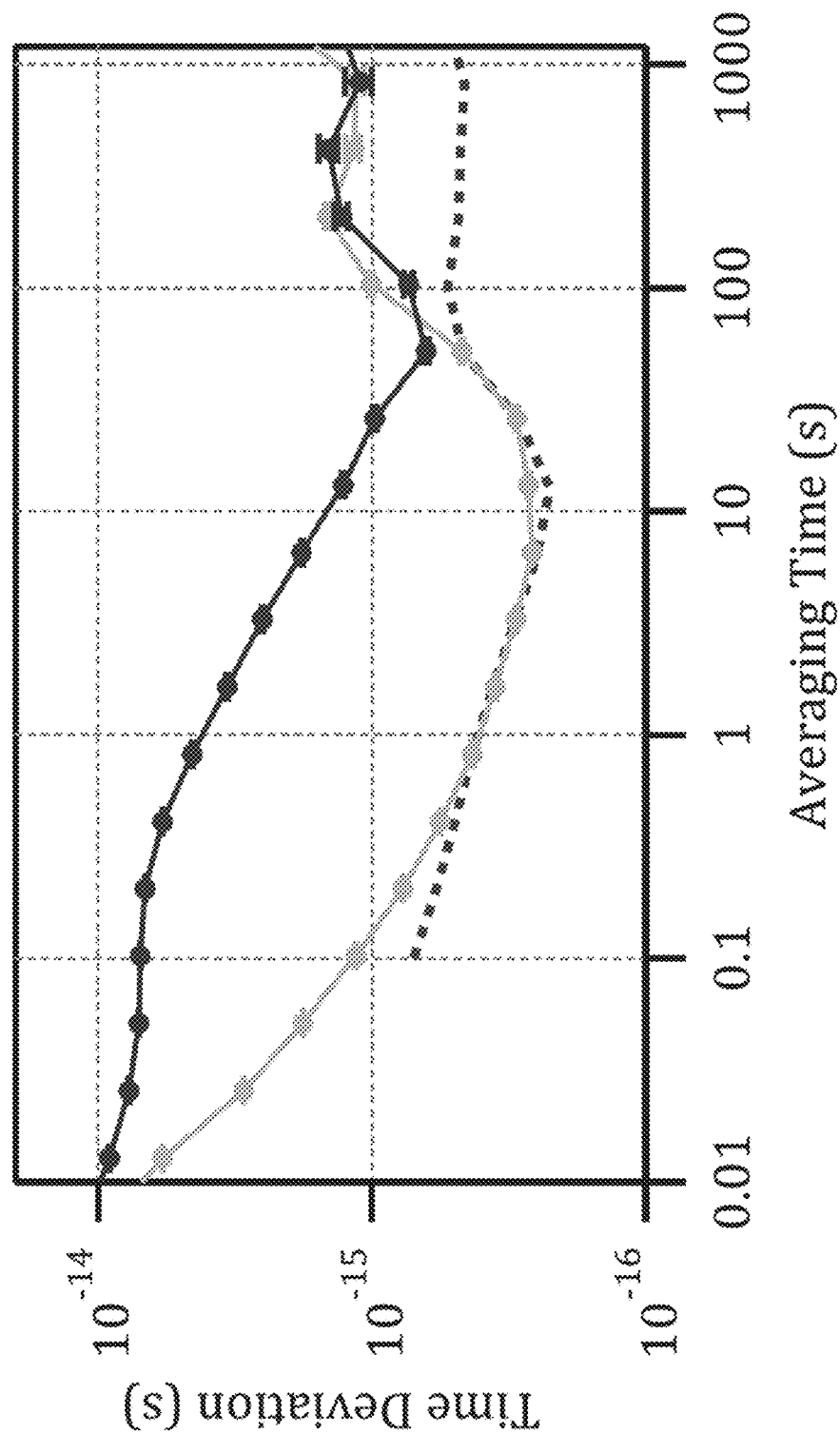
FIG. 17 shows a time deviation calculated from the measured time offset between the microwave and optical clock for gated operation (light curve) and for continuous operation (dark curve). The data for gated operation agrees with previous optical-to-optical synchronization (dashed curve) to 100 s.

With regard to time outputs in femtosecond time synchronization, the time between the two clocks is verified via the arrival of their optical pulses at a common reference plane (FIG. 14). FIG. 16a shows the time offset for gated operation. FIG. 17 shows the time deviation derived from these data for gated operation and also for continuous operation. The time deviation for continuous operation is below 10 fs for time periods ranging from 1000 s down to 0.01 s. The time deviation for gated operation is also below 10 fs reaching a minimum of 200 attoseconds at a 10 second averaging time. Finally, the overall variation in the time offset across 8 hours, shown in FIG. 17, is below ±13 fs. This variation is dominated by laboratory temperature variations that cause path length changes in the ~1 m fiber-optic paths used in the out-of-loop measurements as well as elsewhere in the transceivers. This temperature dependence can be seen in the slow 20-minute oscillations of FIG. 16a, which match the cycling of the room air conditioning.

Both the time offset of FIG. 16a and the time deviation for gated operation of FIG. 17 provide no degradation in the time synchronization associated with the conversion of the remote clock from optical to a microwave oscillator beyond the unavoidable excess time wander that occurs during dropouts.

With regard to frequency outputs with synchronized 10 GHz signals, the 10-GHz microwave frequency signals are also compared during the 8-hour run by measuring their phase difference, as shown in FIG. 14. In this case, the phase measurement test system provides continuous comparison of 10-GHz signals rather than gated operation. These phase-difference data yield a phase-noise PSD that quantifies the relative phase coherence or an Allan deviation that quantifies the relative frequency difference. We discuss both here. In addition, we can compare the coherence of the microwave signal to that of the optical pulse train.

Figure 18:
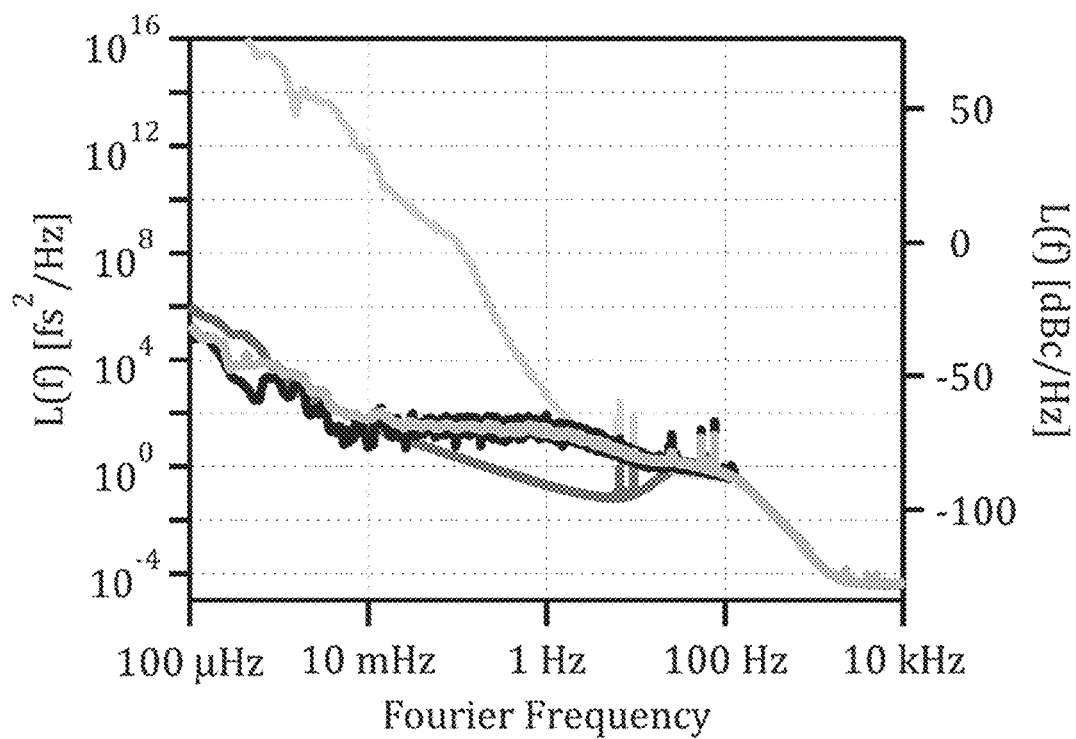
FIG. 18 shows a single-sideband PSD for differential phase noise of the 10 GHz outputs from the optical and microwave clocks without synchronization (purple curve), while synchronized over the 4-km link (red curve), and while synchronized over a shorted link (gray curve). The integrated phase noise is 375 prad (6 fs) for the red curve from 100 pHz out to the synchronization bandwidth of 100 Hz. In addition, the PSD calculated from the optical time outputs is shown (in blue)

FIG. 18 shows the single-side-band PSD between the two sites for the case of a free-running microwave clock (purple line) and synchronized microwave clock across the turbulent 4 km link (red line). At low offset frequencies, the suppression of the free-running oscillator noise is significant, reaching 110 dB at a 1-mHz offset frequency. Below a 1-Hz offset frequency, the synchronized 10-GHz phase-noise is also below that of a free-running optical cavity. Suppression of phase noise at low offset frequencies leads to a corresponding reduction in the integrated timing jitter. The timing jitter for the synchronized system is 6 fs integrated from the 100 Hz synchronization bandwidth to 100 µHz, compared to greater than 2 ns for the free running case.

FIG. 18 also shows the differential phase noise for a synchronized system over a shorted link (grey line), rather than over 4 km. There is an increase in phase noise for the 4-km synchronization at offset frequencies from 10 Hz to 10 mHz, which is attributed to dropouts and not to a lack of reciprocity across the link. Dropouts occur only briefly and appear as wideband noise on the PSD, extending up to the synchronization bandwidth.

FIG. 18 additionally shows the scaled phase noise from the optically measured time offset signals (blue line). The direct 10-GHz measurement exhibits a slightly higher phase noise than the optical measurement at low Fourier frequencies due to $f^{-1}$ noise associated with the microwave test setup.

Figure 19:
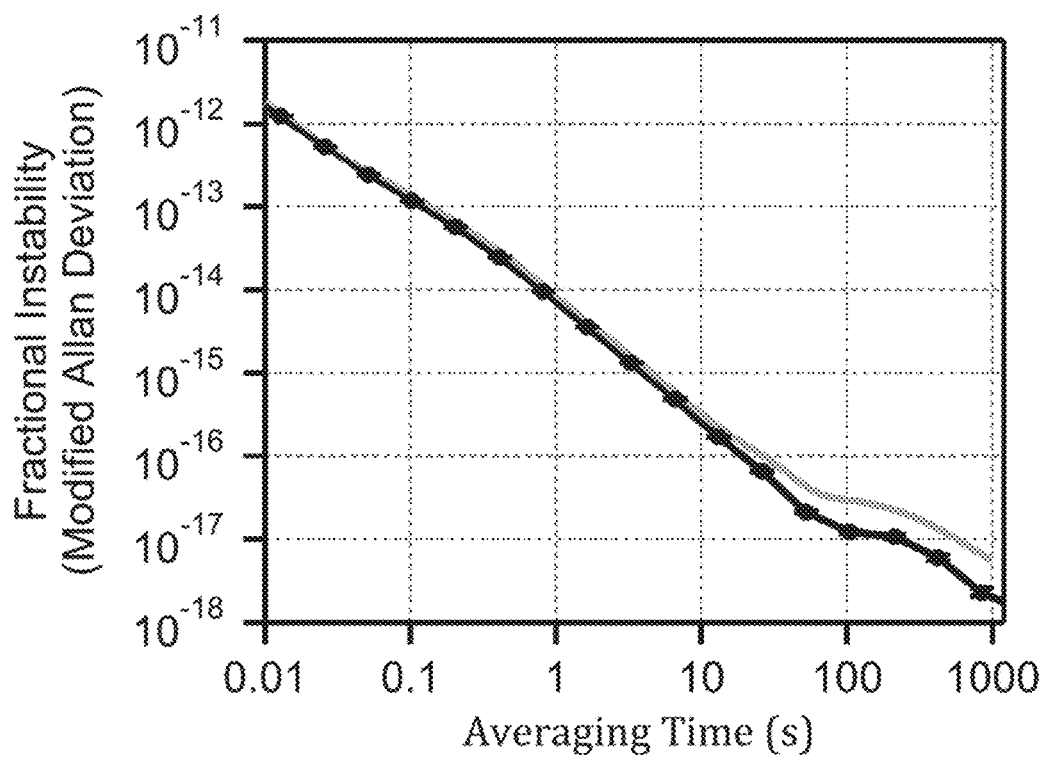
FIG. 19 shows a fractional instability (modified Allan deviation) of the frequency difference between the remote site and master site clocks during continuous operation for the synchronized 10 GHz microwave outputs (red trace) and for the optical time offsets (blue trace)

FIG. 19 shows relative fractional frequency difference between the microwave and optical clocks in terms of the modified Allan deviation. The 10-GHz microwave signals agree to below $1\times10^{-14}$ at a 1-s averaging time and below $1\times10^{-17}$ at a 1000-s averaging time. Note that the master 10-GHz signal is not tied to an atomic reference but rather drifts slowly with the underlying optical cavity. For better long-term frequency stability, an atomic clock could be used at the master site. At long averaging times there is a slight degradation compared to the values based on the optical time output (blue line). This degradation again reflects the additional excess $f^{-1}$ noise as in the PSD of FIG. 18.

The residual time deviation is below 10 fs with a long-time variation that remains below ±13 fs over 8 hours. We find similar phase coherence between the synchronized 10-GHz frequency outputs with a residual frequency difference of $10^{-17}$ at 1000-s averaging. For greater phase-coherence at Fourier frequencies beyond the effective synchronization bandwidth of 100 Hz, the quartz-DRO pair could be replaced by an optical-frequency-division-generated signal or a cryogenic sapphire oscillator. The high coherence and full-time synchronization demonstrated here can be included in time distribution in long-baseline radio astronomy. In moving platforms with compensation for Doppler shifts, the method provides precise synchronization of time and frequency for phased satellite-arrays.

Figure 20:
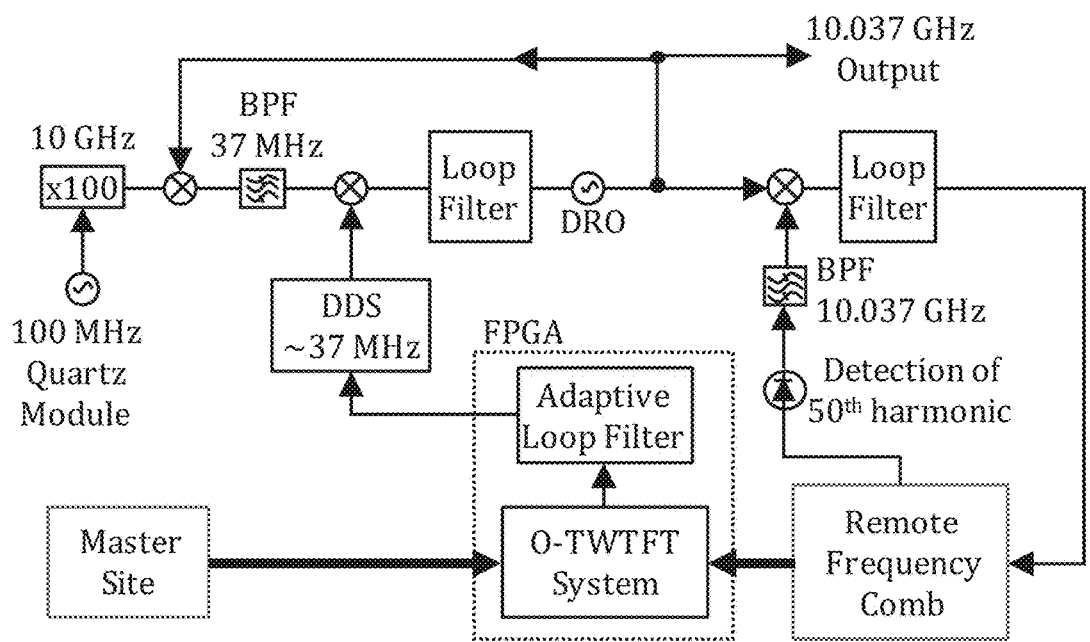
FIG. 20 shows a stabilization architecture for a microwave clock, wherein BPF: bandpass filter, DRO: dielectric resonator oscillator.

Tight phase coherence occurred between the microwave oscillator and the local frequency comb in the microwave clock. The setup is shown in FIG. 20. The microwave oscillator is a combination of a quartz oscillator and a dielectric resonator oscillator (DRO). A quiet 100-MHz quartz oscillator is frequency multiplied by a factor of 100. The DRO is phase-locked to this 10-GHz signal with about 100-kHz bandwidth to reduce the phase noise level at high Fourier frequencies and for greater frequency flexibility. A self-referenced frequency comb is then phase-locked to this signal by mixing the 10.037-GHz output of the Quartz/DRO pair with the detected 50th harmonic of the comb's repetition frequency in a low-noise mixer to create a baseband phase error signal. The digital loop filter (implemented on a field-programmable gate array (FPGA)) that controls these actuators uses a 16-bit ADC to measure the phase error signal and its gains are adjusted to reach a 10-kHz lock bandwidth. Piezoelectric actuators close the feedback loop by changing the repetition frequency of the comb by adjusting the cavity length of the comb. With the feedback loop closed, there are three coherent outputs, one optical and two rf: the optical 200-MHz pulse train, the 10.037-GHz signal generated from direct photodetection of the frequency comb pulses, and the 10.037-GHz signal from the DRO.

With the system described above, the frequency comb is tightly locked to the microwave oscillator. To achieve synchronization, the system then adjusts the phase of the microwave oscillator as described next. First, the time offset is computed from the O-TWTFT master synchronization equation by an FPGA-based controller co-located with the microwave clock. This time offset acts as an in-loop error signal that is filtered and then used to adjust the frequency of the microwave oscillator. The frequency adjustment is implemented through an offset lock of the DRO to the 10-GHz quartz signal, as shown in FIG. 20. The offset is provided by an adjustable low-noise direct digital synthesizer (DDS) module. A 37 MHz nominal DDS frequency was used, leading to a 10.037-GHz DRO output.

Example 3

Comparing Optical Oscillators Across the Air to Milliradians in Phase and $10^{-17}$ in Frequency.

In this example, numbering of equations begins again with Equation 1.

Applications of future optical clock networks include time dissemination, chronometric geodesy, coherent sensing, tests of relativity, and searches for dark matter among others. This promise has motivated continued advances in optical clocks and oscillators and in the optical transfer techniques to network them. In particular, time-frequency transfer over fiber-optic networks has seen tremendous progress. However, many applications require clock networks connected via free-space links. Direct adoption of fiber-based approaches to free-space is possible but hampered by atmospheric turbulence. Satellite-laser-ranging approaches such as T2L2 are being actively explored. Here, we consider optical two-way time-frequency transfer (O-TWTFT) based on the two-way exchange of frequency comb pulses. This approach exploits the reciprocity (equality) in the time-of-flight for light to travel each direction across a single-mode link, just as in rf-based two-way satellite time-frequency transfer and analogous fiber-optic demonstrations. In previous work, this O-TWTFT approach used the arrival time of the frequency comb pulses to support frequency comparisons at residual instabilities of $\sim4\times10^{-16}$ at 1-second averaging times, and ultimately to enable sub-femtosecond time synchronization of distant optical and microwave-based clocks.

Here, we demonstrate O-TWTFT can exploit the carrier phase of the frequency comb pulses for much higher performance. While carrier-phase measurements are relatively straightforward across optical fiber because of the uninterrupted stable signal, the same is not true of a free-space link where atmospheric turbulence leads to strong phase noise and signal intermittency, in turn presenting a severe challenge to "unwrapping" the measured phase without catastrophic ±πphase errors. We show such phase unwrapping is possible over hour durations, despite atmospheric turbulence, and despite strong phase drift between the distant sites. We achieve frequency comparison with a residual instability (modified Allan deviation) of $1.2\times10^{-17}$ at 1 second: 10-20 times lower than achieved with the pulse timing alone. This instability drops to $6\times10^{-20}$ at 850 s. We show the short-term residual instability is near the limit given by atmospheric-turbulence-driven reciprocity breakdown. Most importantly, it is well below the absolute instability of even the best optical clocks and oscillators.

Carrier-phase O-TWTFT essentially tracks the evolution of the relative optical phase between the two distant optical oscillators. Specifically, here we track the ~300 million-radian residual phase evolution between our two 1535-nm cavity-stabilized lasers without ambiguity to within a 0.2-rad standard deviation at 400-ms time resolution. The corresponding time deviation reaches 7 attoseconds (9 mrad) at 1-s averaging time. The relative phase noise power spectral density drops below $10^{-4}$ rad$^2$/Hz (~60 as$^2$/Hz) at 1 Hz offset, or >25 dB below that achievable with pulse timing alone. In this sense, we establish tight mutual optical phase coherence between sites that could be exploited in future applications requiring spatially distributed phase coherence.

In particular, several groups have compared optical atomic clocks to ultra-high precision by cancelling out common-mode optical phase noise of the clocks' local oscillators. Carrier-phase OTWTFT provides distant optically coherent measurements with portable cavity-stabilized lasers over turbulent links.

To successfully track the optical phase, the interval between phase measurements must be shorter than the mutual phase coherence time between the distant optical oscillators. (For the same reason, an optical clock's Ramsey interrogation time is limited by the local oscillator coherence time.) Otherwise, the resulting $\pm\pi$ phase ambiguities lead to complete loss of frequency/phase information. This presents two problems for carrier-phase O-TWTFT over a turbulent atmosphere. First, atmospheric turbulence scrambles the received light's optical phase, degrading the mutual optical coherence time. This problem is circumvented by exploiting the time-of-flight reciprocity. Second, atmospheric turbulence causes fades (signal loss) at random times, with random durations and random separations, so the measurement interval often exceeds the mutual coherence time (of 50 ms here). This problem is circumvented by combining the timing information from both the pulse's carrier-phase and envelope to extend the coherence across the fades.

We use a folded 4-km link (FIG. 21) to compare optical oscillators at site A and B. At each site, a cavity-stabilized laser serves as the optical oscillator. We let the oscillator at site A define the timescale with known frequency $V_A$ and phase $\varphi_A(t)=2\pi V_A t$. The optical phase of site B's oscillator is $\varphi_B(t)=2\pi V_B t+\delta\varphi(t)$, where the first term is the phase evolution from the a priori estimated frequency $V_B \neq V_A$ and the second captures the unknown phase wander or equivalently timing wander $\delta\tau=(2\pi V_B)^{-1}\delta\varphi$. The unknown frequency variation is $\delta V(t)=(2\pi)^{-1}d\delta\varphi(t)/dt$. Our objective is to measure $\delta\varphi(t)$ or equivalently $\delta V(t)$. We drop any constant phase offset by setting $\delta\varphi(0)=0$ (and so $\delta\tau(0)=0$) since its knowledge requires full time synchronization. The folded link permits truth data acquisition via a direct optical heterodyne measurement, which also necessitates both oscillators operate at nearly the same frequency, here at $V_A$=194.584000 THz and $V_B$=194.584197 THz. In general, however, the optical oscillators would be at widely different frequencies and locations.

At each site, the optical oscillator signal is transferred via a Doppler-cancelled fiber link to a self-referenced frequency comb where its phase is mapped onto the comb. Specifically, at site B the relative phase noise $\delta\varphi(t)$ maps to noise in both the optical phase and the timing of comb B's pulse train. This noise is not white but includes strong random frequency walk. We compare the phase and timing of comb B with comb A via linear optical sampling in a two-way configuration. To do this, combs A and B are phase locked using our a priori information of $V_A$ and $V_B$ such that their repetition frequencies $f_{r,A}$ and $f_{r,B}$ differ by $\Delta f_r=f_{r,B}-f_{r,A}$. Here, $f_{r,A}$=200 MHz with $\Delta f_r \approx 2.46$ kHz. At each site, we filter the comb to a ~1-THz bandwidth around 1560 nm and transmit it to the opposite site where it is heterodyned against the local comb to generate a series of cross-correlations, which are analyzed to extract $\delta\varphi(t)$. Note the transmitted comb optical spectrum need not—and does not—encompass the optical oscillator frequencies.

The extraction of $\delta\varphi(t)$ proceeds as follows. For convenience, we lock the self-referenced combs such that $f_{r,A}=V_A/n_A$ and $f_{r,B}=V_B/n_B$ where $n_A$ and $n_B$ are the indices of the comb tooth nearest to the local oscillator at sites A and B. We then identify the pair of comb tooth frequencies, $\tilde{V}_A$ and $\tilde{V}_B$, nearest to the center of the transmitted optical spectrum having a frequency separation $\Delta\tilde{V}\equiv\tilde{V}_B-\tilde{V}_A<\pm\Delta f_r/2$. This pair, rather than $V_A$ and $V_B$ directly, will serve as the carrier frequencies for the carrier-phase O-TWTFT, as shown below. At site A, we write the transmitted and received comb electric fields with respect to this pair as $$E_A(t)=e^{i2\pi\tilde{V}_A t}\Sigma_m E_{A,m}e^{i2\pi m f_{r,A} t}$$

$$E_B(t)=e^{i2\pi\tilde{V}_B(t-T_{link})}e^{i\tilde{V}_B\delta\varphi/V_B}\Sigma_m E_{B,m}e^{i2\pi m f_{r,B}(t+\delta\tau-T_{link})} \quad (8)$$

where $E_{X,m}$ is the electric field, m is the comb index from the tooth at $\tilde{V}_X$, $T_{link}$ is the slowly varying time-of-flight, and $\delta\tau=(2\pi V_B)^{-1}\delta\varphi$ is the timing jitter of comb B. The equations for site B are analogous, except that $T_{link}$ appears in $E_A(t)$. Note the unknown phase wander of oscillator B appears both in the timing noise, $\delta\tau$, and in the carrier optical phase of comb B. At each site, the combs are heterodyned to give a series of cross-correlations with complex envelopes $I_X(t)$, labelled by the integer p $$V_X(t) \propto e^{i\Theta_p X}\Sigma_p I_X(t-t_{p,X}), \quad (9)$$

assuming $T_{link}$ and $\delta\tau$ vary slowly on the timescales of $1/\Delta f_r$. (See Supplemental material for derivation.) The cross-correlation envelope peaks at times $$t_{p,A}=\Delta f_r^{-1}\{p+f_{r,B}T_{link}-f_{r,B}\delta\tau\}$$

$$t_{p,B}=\Delta f_r^{-1}\{p-f_{r,A}T_{link}-f_{r,B}\delta\tau\} \quad (10)$$

with phase, $$\Theta_{p,A} 2\pi\Delta\tilde{V}t_{p,A}-2\pi\tilde{V}_B T_{link}+\tilde{V}_B V_B^{-1}\delta\varphi$$

$$\Theta_{p,B} 2\pi\Delta\tilde{V}t_{p,B}+2\pi\tilde{V}_A T_{link}+\tilde{V}_B V_B^{-1}\delta\varphi. \quad (11)$$

As expected for a two-way measurement, the time-of-flight enters with an opposite sign at the two sites in (10) and (11) can thus be eliminated. Note the cross-correlations do not occur simultaneously at the two sites, rather asynchronously with offset $|t_{p,A}-t_{p,B}|<2/\Delta f_r$. For each site, we evaluate $t_{p,X}$ and $\Theta_{p,X}$ at $1/\Delta f_r$~400 ms intervals via matched filter processing against the p=0 cross-correlation thereby dropping any overall constant time/phase offsets.

We effectively solved (10) for $\delta\tau(t_p)$ evaluated at $t_p \equiv (t_{p,A}+t_{p,B})/2$, from which we extracted the fractional frequency uncertainty $\delta V/V_B=d\delta\tau/dt$. However, the precision of $\delta\tau(t_p)$ is typically SNR-limited to 3 to 8 fs (4 to 10 radians equivalent optical-phase uncertainty).

In carrier-phase O-TWTFT, we exploit the cross-correlation phase for higher precision by solving (11) to find $$\delta\varphi(t_p) \approx \frac{V_B}{2\tilde{V}_B}\{\Theta_{p,A}+\Theta_{p,B}-4\pi\Delta\tilde{V}t_p+2\pi\Delta\tilde{V}T_{link}-2\pi k_p\}, \quad (12)$$

dropping the next term $\pi V_B(t_{p,A}-t_{p,B})dT_{link}/dt$. After determining $T_{link}$ from (10), all the terms are known except for $k_p$, which is a time-dependent integer accounting for the $\pi$-ambiguity (~2.5 fs equivalent timing uncertainty) in this phase measurement. The precision is now limited by the ~0.1 radian noise typical of the comb phase locks and Doppler-cancelled links for a total uncertainty of ~0.2 radians, corresponding to 160 attoseconds in timing precision at the 400-ms update rate.

Higher precision is lost in n-ambiguities unless $k_p$ is known. If $\delta\varphi$ varies slowly with successive measurements, standard unwrapping algorithms can track $k_p$. However, $\delta\varphi$ varies significantly from mutual phase noise between the oscillators, characterized by the measured power spectral density (PSD) of $S_{\delta\varphi}$=22 f$^{-4}$ rad$^2$/Hz, where f is the Fourier frequency. More importantly, random fades from turbulence-induced scintillation, physical obstructions, or loss of terminal pointing cause measurement gaps well beyond $1/\Delta f_r \sim 400$ ms. Therefore, a layered Kalman-filter-based unwrapping algorithm is used. The inputs are the first four terms of (12), $S_{\delta\varphi}$, $\delta\tau(t_p)$ from (10), the received power, and the power-dependent uncertainty in $t_{p,X}$ and $\Theta_{p,X}$. The output is a prediction of the phase, which is compared with the observed phase to find $k_p$. The Kalman filter also predicts the uncertainty $\sigma_{\varphi,p}$ in the predicted phase which grows with time over long fades, eventually leading to ambiguity in $k_p$ and requiring use of the envelope timing to re-acquire $k_p$. Indeed, a functional, rigorous definition of mutual coherence time is exactly the time interval until the predicted phase's uncertainty exceeds a value $\sigma_\varphi$, denoted $t_{coh}^{\sigma_\varphi}$. (This coherence time differs from frequency-domain definitions based on linewidth or PSDs which are poorly defined for $S_{\delta\varphi} \propto f^{-4}$, and is in fact closely related to the relevant coherence for Ramsey interrogation). For our system, $t_{coh}^{1\ rad} \sim 50$ ms. However, the algorithm uses a stricter limit of $t_{coh}^{0.12\ rad} \sim 7$ ms before reverting to the envelope timing to "re-acquire" $k_p$. Real-time processing can be performed.

Figure 22:
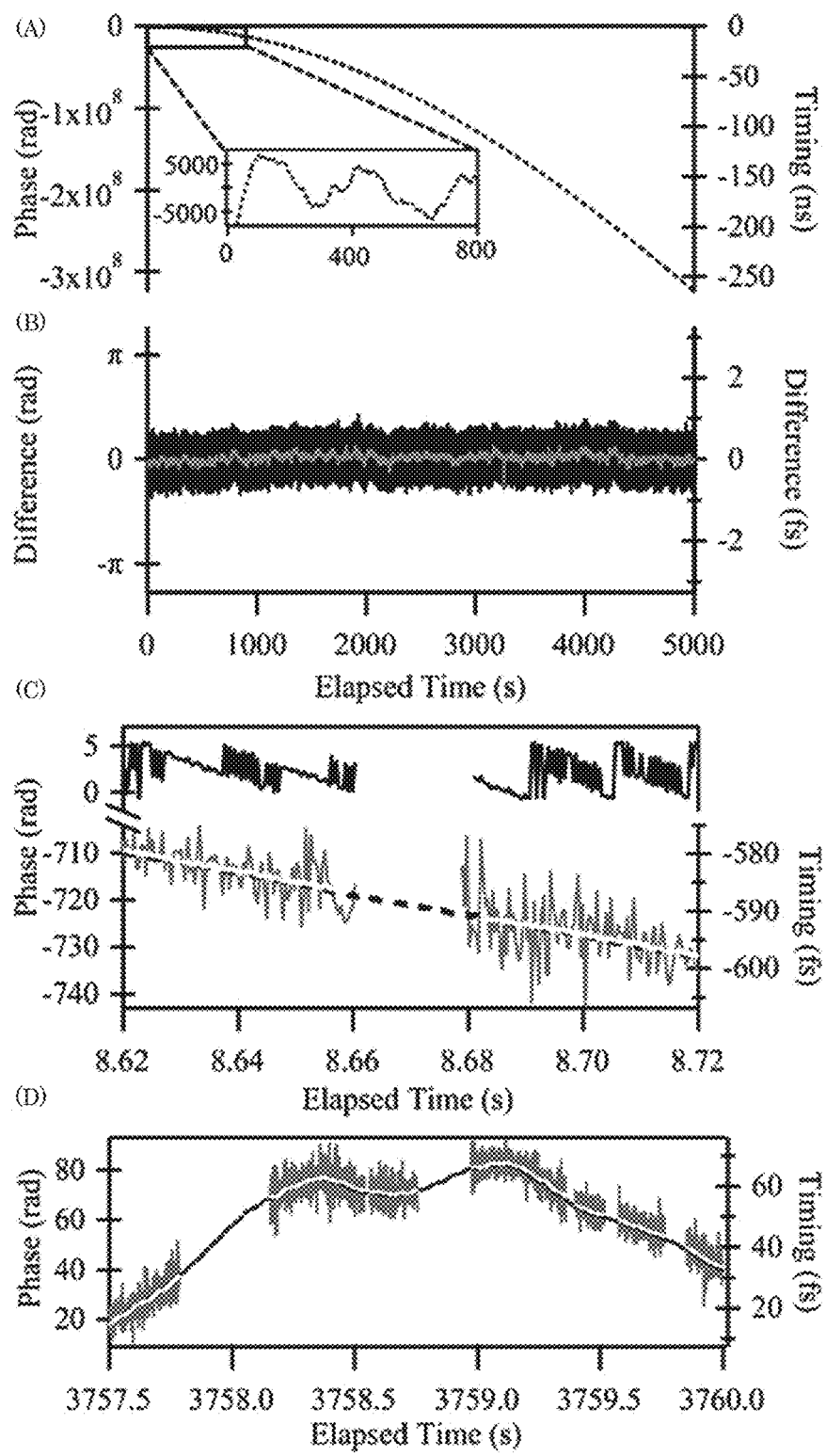
FIG. 22 shows results for ~1.4-hours across the turbulent 4-km link.

FIG. 22a shows the resulting unwrapped phase $\delta\varphi(t)$ over a ~1.4-hour measurement across the 4-km turbulent link. It is dominated by a roughly linear frequency drift, leading to over 300 million radians of total phase drift (beyond the expected phase drift of $2\pi(V_B A - V_A)t$) with random phase wander reflecting the $f^{-4}$ PSD, as shown in the inset. Therefore, phase continuity of the measured $\delta\varphi(t)$ can only be evaluated by comparison with truth data, $\delta\varphi_{truth}(t)$, acquired from the direct shorted heterodyne beat between oscillators. As shown in FIG. 22b, $\delta\varphi(t) - \delta\varphi_{truth}(t)$ shows no phase slips. The standard deviation is 0.2 rad (or 160 attoseconds in time units) at the full 400-ms sample rate and 30 mrad (24 attoseconds) at a 1-s time resolution. Finally, a linear fit to $\delta\varphi(t) - \delta\varphi_{truth}(t)$ yields the overall accuracy in the determination of oscillator B's frequency offset $\delta V$ across the measurement, which is 2±20 mHz. In the FIG. 22, panel (a) shows oscillator B's residual phase from carrier-phase OTWTFT, $\delta\varphi(t)$, (red line) and from direct oscillator-to-oscillator truth data, $\delta\varphi_{truth}(t)$, (dashed blue line) in radians (left axis) and scaled to time units by $(2\pi V_B)^{-1}$ (right axis). For both, we set the value at t=0 to zero; consequently, we use "timing" on the right axis, emphasizing that the overall time offset between sites is unknown. The dominant quadratic behaviour arises from the ~4 Hz/s frequency drift between the optical oscillators. Inset: phase wander after removing a quadratic fit illustrating the phase fluctuations at all time scales expected from the $1/f^4$ relative phase noise. (b) Difference between the carrier-phase OTWTFT and truth data, $\delta\varphi(t) - \delta\varphi_{truth}(t)$, at 400 msec sampling (black) with 0.2 rad (160 as) standard deviation and at 1-second averaging (gray) with 30 mrad (24 as) standard deviation. There are no phase discontinuities over the entire period. The average slope yields an overall frequency difference between truth data and the O-TWTFT data of 2±20 mHz, despite the accumulated 18 kHz offset between the oscillators. (c) A 10-second segment showing the phase before unwrapping (top panel, purple) and after (red line), which follows the truth data. The predicted phase (dashed blue line) resolves the integer, $k_p$, to accomplish the unwrapping. Also shown is the envelope timing (gray line), used to unwrap the phase across fades. (d) Similar to (c) but illustrating phase continuity over a complicated fade sequence. (An overall slope of 40 rad/sec was removed for display purposes.)

Fades occur during 1% of the total 1.4 hours. Because of turbulence, for ~3 mW transmitted power, the received power varied from 0 to 5 mW with a detection threshold of 10 nW, below which a fade (signal loss) occurs. Fades with durations beyond $t_{coh}^{0.12\ rad} \sim 7$ ms involve re-acquisition of the phase via the envelope. FIG. 22c-d show examples of phase-continuous measurement across a single fade and across multiple juxtaposed fades. For the data of FIG. 22b, there are ~1400 fades randomly distributed in time with durations beyond $t_{coh}^{0.12\ rad} \sim 7$ ms, while a later run had 26% fades with ~28,500 fades beyond $t_{coh}^{0.12\ rad}$. (See FIG. 25.)

Figure 23:
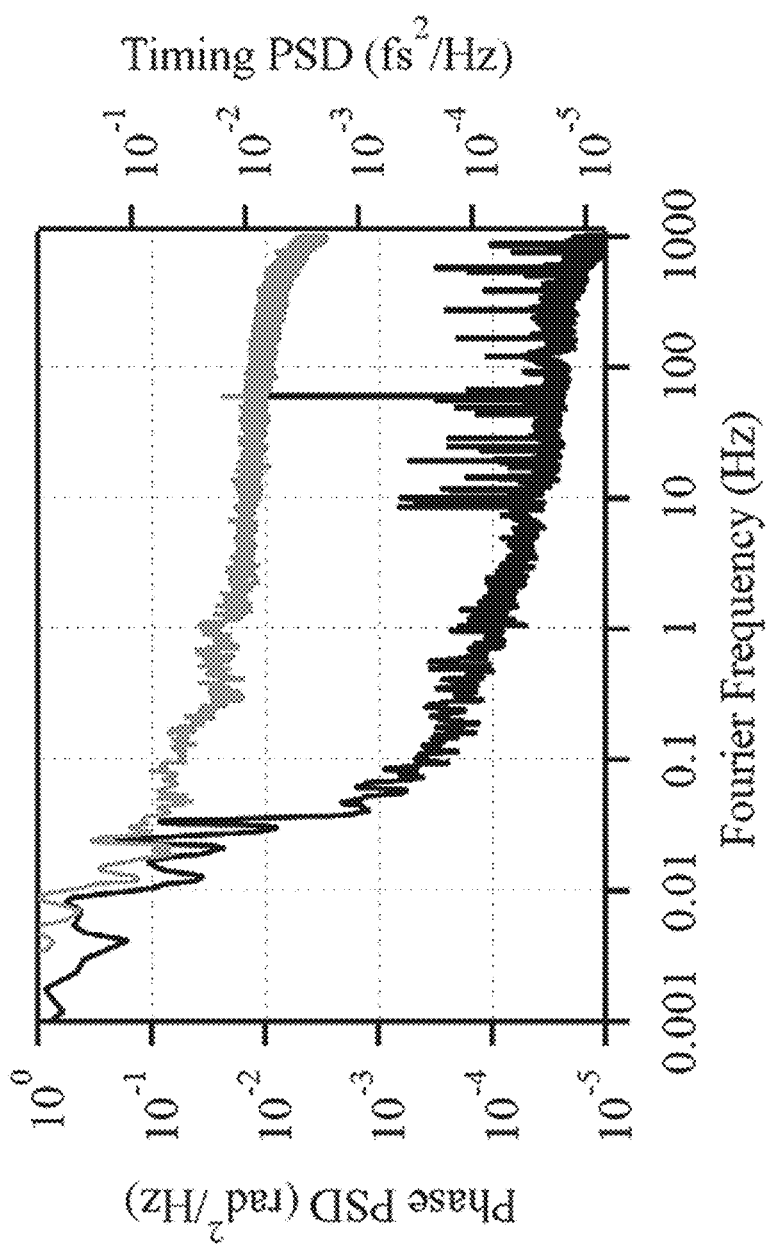
FIG. 23 shows a phase noise power spectral density of $\delta\varphi(t)-\delta\varphi_{truth}(t)$ (dark blue) in $rad^2/Hz$ (left axis) and converted to $fs^2/Hz$ (right axis). For comparison, the corresponding power spectral density extracted from the envelope pulse timing alone is also shown (light blue)

FIG. 23 shows the phase noise PSD for $\delta\varphi(t) - \delta\varphi_{truth}(t)$ of FIG. 22b, and compares this PSD to previous O-TWTFT using the envelope only (i.e. finding $\delta\tau$ from (10) only). Above 1 Hz, the carrier-phase data is >25 dB lower, with a floor of $\sim 3 \times 10^{-5}$ rad$^2$/Hz (~20 as$^2$/Hz). Below 40 mHz, the two PSDs converge as the noise is limited by flicker ($1/f$) noise from variations in the delays within the transceivers.

Figure 24:
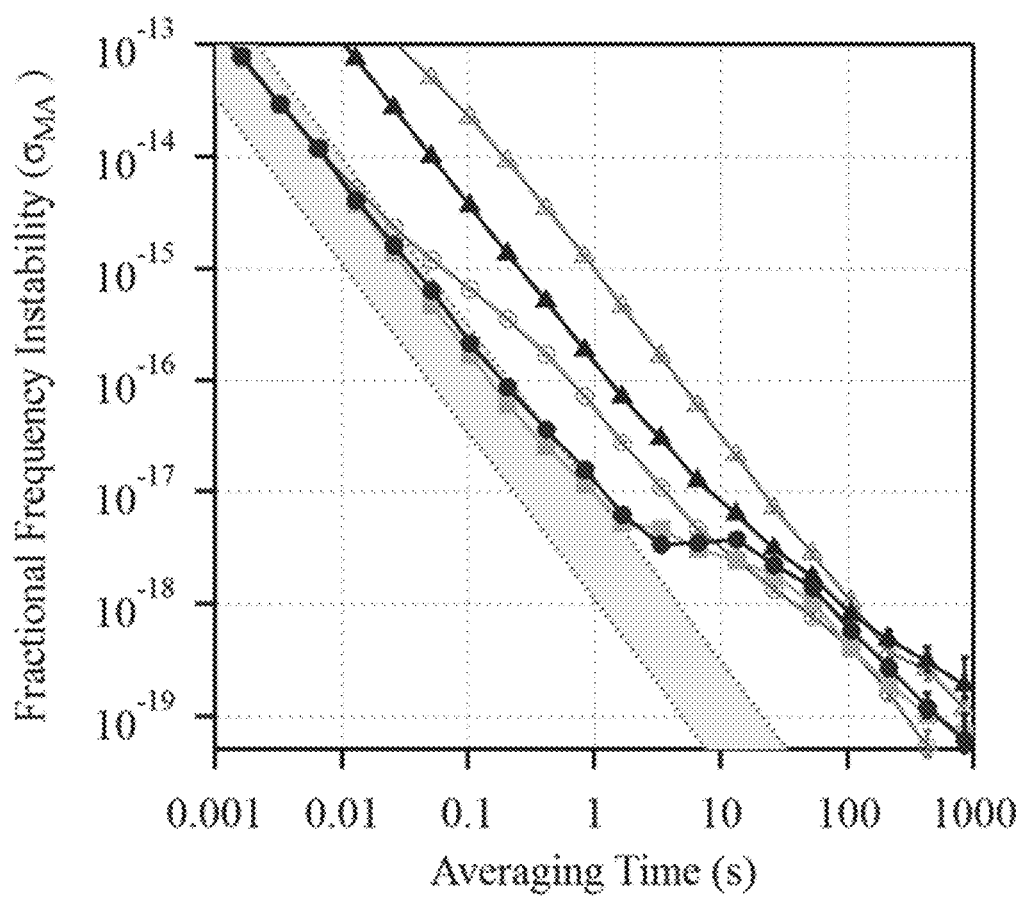
FIG. 24 shows the residual fractional frequency instability, $\sigma_{MA}$, for carrier-phase O-TWTFT over a 4-km link with 1% fades (blue circles) and 26% fades (open red circles) compared to the corresponding envelope-only O-TWTFT for 1% fades (blue triangles) and 26% fades (open red triangle). The carrier-phase O-TWTFT instability over a shorted (0 km) link is also shown (green squares). Finally, the fundamental limit set by the time-dependence of the atmospheric turbulence is indicated shaded orange box (at 10-90% likelihood)

FIG. 24 shows the modified Allan deviation, $\sigma_{MA}$, from $\delta\varphi(t) - \delta\varphi_{truth}(t)$ at both 1% fades (e.g. FIG. 22b) and 26% fades. At 1% fades, the carrier-phase O-TWTFT instability is $1.2 \times 10^{-17}/t_{avg}^{3/2}$ from 0.01 s to a few seconds. It then flattens from a few seconds to 10 s likely due to fluctuations in the transceiver delays from air-conditioning cycling, before dropping to $6 \times 10^{-20}$ at 850 s. At short times, the carrier-phase O-TWTFT is 10 times lower than for the envelope-only approach of previous O-TWTFT. At the higher fade rate of 26%, the carrier-phase O-TWTFT rises to $5.6 \times 10^{-17}$ at 1 s and the envelope-only O-TWTFT is 20 times higher still.

The measured instability of $\sim 10^{-17}$ at 1 second translates to a time deviation of 7 attoseconds, or equivalently 9 mrad, at one second, indicating reciprocity for a single-mode link holds to a remarkable degree even across a turbulent atmosphere. Nevertheless, there is a slight discrepancy between the open-path instability of $1.2 \times 10^{-17}$ and shorted (no open-path) instability of $0.95 \times 10^{-17}$. (See FIG. 24.) We attribute this discrepancy to a slight breakdown in reciprocity from asynchronous sampling and time-dependent turbulence, i.e. exactly the additional term $\propto 0.5(t_{p,A} - t_{p,B})dT_{link}/dt$ discussed after Eq. (12). (Other effects that limit reciprocity are unobserved in this configuration.) The time-dependent atmospheric piston phase noise, i.e. $T_{link}(t)$, is characterized by a spectral noise density of $af^{-7/3}$ where f is the Fourier frequency and a~$10^{-28}$ s$^2$ Hz$^{4/3}$. Approximating this PSD as ~$f^{-2}$ gives a contribution to $\sigma_{MA}$ of $$\sigma_{atm}(t_{avg}) = \pi\sqrt{3a/2}|t_{p,A} - t_{p,B}|t_{avg}^{-3/2}. \quad (13)$$

The asynchronous sampling, $|t_{p,A} - t_{p,B}|$, ranges from 0 to $(2\Delta f_r)^{-1} \sim 200$ μs; the shaded region in FIG. 24 shows $\sigma_{atm}(t_{avg})$ for a 10-90% range (20 ms<$|t_{p,A} - t_{p,B}|$<180 ms). The quadrature sum of the shorted o- and $\sigma_{atm}(t_{avg})$ at $|t_{p,A} - t_{p,B}|$=100 μs agrees with the measured open-path results of $1.2 \times 10^{-17}$ at 1 second.

The 4-km link distance demonstrated here is not the maximum range limit. Indeed, carrier-phase O-TWTFT poses no additional constraints on range, excepting that the power-aperture product must be increased along with the link distance to maintain sufficient received comb power, comparable to the power requirements for coherent communications. At link distances >60 km, the time-of-flight reaches $(2\Delta f_r)^{-1}$ and the timestamps must be properly aligned to avoid an increase in the asynchronous sampling noise floor given by Eqn. (13).

We have demonstrated phase comparisons between optical oscillators or clocks using the carrier phase of frequency comb pulses over turbulent free-space paths. Carrier-phase O-TWTFT reaches $1.2 \times 10^{-17}$ fractional stability at 1 second averaging time, corresponding to a time deviation of 7 attoseconds, despite the presence of turbulence-induced fades. In so doing, it connects the optical phases as distant sites and should enable correlated spectroscopy of distant optical clocks.

Figure 21:
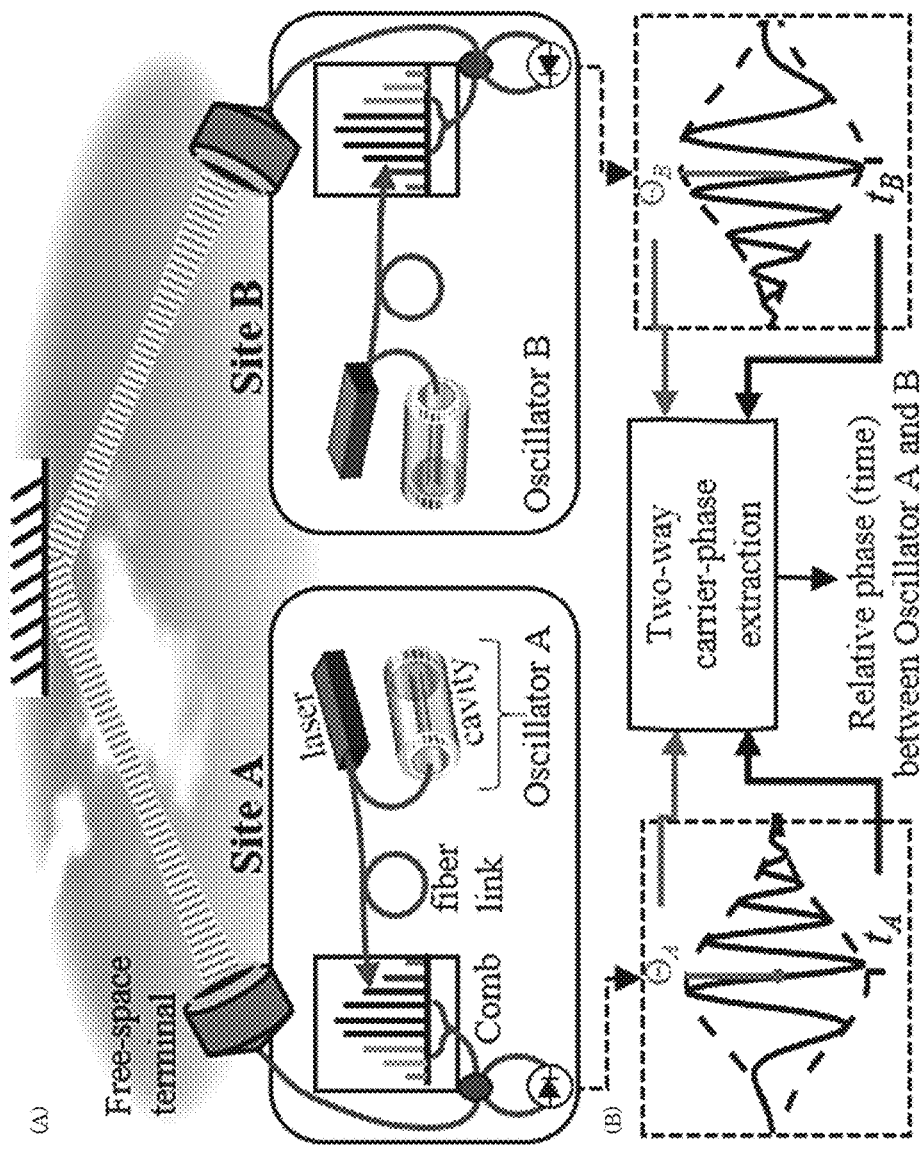
FIG. 21 shows (a) an experimental setup, wherein the phase of the local optical oscillator (cavity-stabilized laser) is transferred via a Doppler-cancelled fiber link to a frequency comb, a portion of whose output is transmitted to the opposite site, where it is heterodyned against the local comb. The link is folded, i.e. A and B are physically adjacent, to permit acquisition of truth data. (b) The resulting cross-correlation between pulse trains is analysed to extract the envelope peak time, $t_{p,X}$, and the phase, $\Theta_{p,X}$, which are input to a Kalman-filter based algorithm to calculate the relative phase/timing evolution between the two optical oscillators despite atmospheric phase noise and fading.

FIG. 21 shows an experimental setup in which the phase of the local optical oscillator (cavity-stabilized laser) is transferred via a Doppler-cancelled fiber link to a frequency comb, a portion of whose output is transmitted to the opposite site, where it is heterodyned against the local comb. The link is folded, i.e. A and B are physical adjacent, to permit acquisition of truth data. (b) The resulting cross-correlation between pulse trains is analysed to extract the envelope peak time, $t_{p,X}$, and the phase, $\Theta_{p,X}$, which are input to a Kalman-filter based algorithm to calculate the relative phase/timing evolution between the two optical oscillators despite atmospheric phase noise and fading.

FIG. 22 shows results for ~1.4-hours across the turbulent 4-km link. (a) Oscillator B's residual phase from carrier-phase OTWTFT, $\delta\varphi(t)$, (red line) and from direct oscillator-to-oscillator truth data, $\delta\varphi_{truth}(t)$, (dashed blue line) in radians (left axis) and scaled to time units by $(2\pi V_B)$ (right axis). For both, we set the value at $t=0$ to zero; consequently, we use "timing" on the right axis, emphasizing that the overall time offset between sites is unknown. The dominant quadratic behaviour arises from the ~4 Hz/s frequency drift between the optical oscillators. Inset: phase wander after removing a quadratic fit illustrating the phase fluctuations at all time scales expected from the $1/f^4$ relative phase noise. (b) Difference between the carrier-phase OTWTFT and truth data, $\delta\varphi(t)-\delta\varphi_{truth}(t)$, at 400 msec sampling (black) with 0.2 rad (160 as) standard deviation and at 1-second averaging (gray) with 30 mrad (24 as) standard deviation. There are no phase discontinuities over the entire period. The average slope yields an overall frequency difference between truth data and the OTWTFT data of 2±20 mHz, despite the accumulated 18 kHz offset between the oscillators. (c) A 10-second segment showing the phase before unwrapping (top panel, purple) and after (red line), which follows the truth data. The predicted phase (dashed blue line) resolves the integer, $k_p$, to accomplish the unwrapping. Also shown is the envelope timing (gray line), used to unwrap the phase across fades. (d) Similar to (c) but illustrating phase continuity over a complicated fade sequence. (An overall slope of 40 rad/sec was removed for display purposes.)

FIG. 23 shows phase noise power spectral density of $\delta\varphi(t)-\delta\varphi_{truth}(t)$ (dark blue) in rad$^2$/Hz (left axis) and converted to fs$^2$/Hz (right axis). For comparison, the corresponding power spectral density extracted from the envelope pulse timing alone is also shown (light blue).

FIG. 24 shows residual fractional frequency instability, $\sigma_{MA}$, for carrier-phase O-TWTFT over a 4-km link with 1% fades (blue circles) and 26% fades (open red circles) compared to the corresponding envelope-only O-TWTFT for 1% fades (blue triangles) and 26% fades (open red triangle). The carrier-phase O-TWTFT instability over a shorted (0 km) link is also shown (green squares). Finally, the fundamental limit set by the time-dependence of the atmospheric turbulence is indicated shaded orange box (at 10-90% likelihood).

With regard to derivation of Eqs. (2)-(5) that follows, equations are numbered from Equation 1. Frequency combs can include carrier-envelope offset frequency, $f_{ceo}$, and repetition rate, $f_r$, so that the comb tooth frequencies are given by $V_n=f_{ceo}+nf_r$, where n is an integer. We can alternatively write the comb tooth frequencies as $V_m=\tilde{V}+mf_r$, where $\tilde{V}=f_{ceo}+\tilde{n}f_r$ is a specific comb tooth frequency at $n=\tilde{n}$ and m represents an integer offset from this tooth. Thus, combs A and B at their respective sites located at $z=z_A$ and $z=z_B$ become $$E_A(t,z_A)=e^{i2\pi \tilde{V}_A t}\Sigma_m E_{A,m}e^{i2\pi m f_{r,A} t} \quad (14)$$

$$E_B(t,z_B)=e^{i2\pi \tilde{V}_B t+i\tilde{V}_B \delta\varphi/V_B}\Sigma_m E_{B,m}e^{i2\pi m f_{r,B}(t+\delta\tau)} \quad (15)$$

where $\delta\tau\equiv(2\pi V_B)^{-1}\delta\varphi$, dropping any overall phase or time offsets and without yet selecting $\tilde{n}_A$ or $\tilde{n}_B$. Here, as in the main text, we assign all the phase noise to Site B which then appears with appropriate scaling on Comb B in Eq. (15). At the opposite site, each comb will have travelled across distance $|z_A-z_B|$ with phase velocity $V_{phase}$ and group velocity $V_{group}$. Ignoring higher order dispersion, the comb fields at the opposite site are then $$E_A(t,z_B)=e^{i2\pi \tilde{V}_A(t-T_{link})}\Sigma_m E_{A,m}e^{i2\pi m f_{r,A}(t-T_{link}^{group})} \quad (16)$$

$$E_B(t,z_A)=e^{i2\pi \tilde{V}_B(t-T_{link})+i\tilde{V}_B \delta\varphi/V_B}\Sigma_m E_{B,m}e^{i2\pi m f_{r,B}(t+\delta\tau-T_{link}^{group})} \quad (17)$$

where $T_{link}=|z_A-z_B|/V_{phase}$ is the time-of-flight associated with the phase and $T_{link}^{group}=|z_A-z_B|/V_{group}$ is the slightly different time-of-flight associated with pulse envelope. As the extracted timings will be subtracted off between the two directions before further processing (and conversely for the carrier phase), any change in either $T_{link}$ or $T_{link}^{group}$ that is reciprocal will cancel. Any non-reciprocal path through dispersive media (fiber in the transceivers for example) will, however, change these group and phase delays differently and thus there exists a potential offset. To deal with this offset, the phase tracking algorithm applies an offset when re-acquiring $\delta\varphi$ by use of the scaled $\delta\tau$ from the pulse envelope timing, thereby absorbing any additional fixed or slowly-varying offset, even from non-reciprocal propagation. We will thus assume $T_{link}^{group}\approx T_{link}$ for the rest of the derivation.

With $T_{link}^{group}=T_{link}$, we recognize Eqs. (14) and (17) as exactly Eq. (1) in the main text, and Eqs. (15) and (16) as the analogous equations at the other site. At site A, the comb fields are overlapped on a detector to yield $$E_B(t,z_A)E_A^*(t,z_A) = e^{i2\pi\Delta\tilde{V}t}e^{-i2\pi\Delta\tilde{V}_B T_{link}+i\tilde{V}_B \delta\varphi/V_B} \quad (18)$$

$$\sum_{m,m'} E_{B,m}E_{A,m'}^* e^{-i2\pi m' f_{r,A} t} e^{i2\pi m f_{r,B}(t+\delta\tau-T_{link})}$$

where $\Delta\tilde{V}\equiv\tilde{V}_B-\tilde{V}_A$ and with a similar overlap at site B. This heterodyne field will be detected and sampled at $f_{r,A}$. We now impose the following three conditions, which are satisfied in the experiment. First, the optical bandwidth (i.e. non-zero amplitude comb teeth) spans less than $f_{r,A}f_{r,B}/(2\Delta f_r)$. Second, the heterodyne spectrum does not cross zero (e.g. for all non-zero amplitude comb teeth the frequency of comb A is above comb B, or vice versa). Third, we low-pass filter the detected signal to below $f_r/2$. Then, if we define the carrier frequencies (i.e. values of $\tilde{n}_A$ or $\tilde{n}_B$) such that $|\Delta\tilde{V}|<\Delta f_r/2$ it must be that $m=m'$ in the double sum and the detected signal at Site A and B is $$V_A(t)=e^{i\Theta_A(t)}\Sigma_m I_{A,m}e^{i2\pi m\Delta f_r\{t-(f_{r,B}/\Delta f_r)T_{link}+(f_{r,B}/\Delta f_r)\delta\tau\}} \quad (19)$$

$$V_B(t)=e^{i\Theta_B(t)}\Sigma_m I_{B,m}e^{i2\pi m\Delta f_r\{t+(f_{r,A}/\Delta f_r)T_{link}+(f_{r,B}/\Delta f_r)\delta\tau\}}, \quad (19)$$

where the phases are $\Theta_A(t)=2\pi\Delta\tilde{V}t-2\pi\tilde{V}_B T_{link}+\tilde{V}_B V_B^{-1}\delta\varphi$ and $\Theta_B(t)=2\pi\Delta\tilde{V}t+2\pi\tilde{V}_A T_{link}+\tilde{V}_B V_B^{-1}\delta\varphi$, the complex amplitudes are $I_{A,m}\equiv E_{B,m}E_{A,m}^* R_{A,m}$ and $I_{B,m}\equiv E_{A,m}E_{B,m}^* R_{B,m}$, and $R_{X,m}$ accounts for the low-pass detector response at X=A or B. The voltage at site A is sampled at discrete times $t_k = k f_{r,A}^{-1}$ and at site B at discrete times $t_k = k(f_{r,B} + \delta f_r)^{-1}$ where k is an integer. (The system digitizes the real part of the cross-correlation, but a Hilbert transform is used to generate the analytical cross-correlation written here.)

The sums are over rf tones at frequencies $m\Delta f_r$. The sum of these tones is just a series of repeated cross-correlations or interferograms as the comb pulse trains walk across each other in time. The envelope of the successive cross-correlations is a maximum whenever the exponent in the sums of Eq. (19) or (20) is an integer, p. This integer then acts as a label for successive cross-correlations. For example, in Eq. (19), the $p^{th}$ cross-correlation is centered at the time $t_{p,A}$ that satisfies $\Delta f_r t_{p,A} - f_{r,B} T_{link} + f_{r,B} \delta\tau = p$ or $t_{p,A} = \Delta f_r^{-1} \{p + f_{r,B} T_{link} - f_{r,B} \delta\tau\}$. The envelope of each cross-correlation is identical, given by the Fourier Transform of the $I_{A,m}$ and written here as $I_A(t)$, with a similar notation at Site B (assuming fixed dispersion across the link) Following this, we rewrite (19) and its counterpart (20) in a more useful form as the series of cross-correlations, $$V_A(t) = e^{i\Theta_A(t)} \Sigma_p I_A(t - t_{p,A}) \quad (21)$$

$$V_B(t) = e^{i\Theta_B(t)} \Sigma_p I_B(t - t_{p,B}) \quad (22)$$

where $t_{p,B} = \Delta f_r^{-1} \{p - f_{r,A} T_{link} - f_{r,A} \delta\tau\}$. If we re-define $I_A(t) \to e^{i 2\pi \Delta \tilde{v} t} I_A(t)$ then the measured voltages are $$V_A(t) = e^{i\Theta_{p,A}} \Sigma_p I_A(t - t_{p,A}) \quad (21)$$

$$V_B(t) = e^{i\Theta_{p,B}} \Sigma_p I_B(t - t_{p,B}) \quad (22)$$

with $\Theta_{p,A}(t) = 2\pi\Delta\tilde{v} t_{p,A} - 2\pi\tilde{V}_B T_{link} + \tilde{V}_B V_B^{-1} \delta\varphi$ and $\Theta_{p,B}(t) = 2\pi\Delta\tilde{v} t_{p,B} + 2\pi\tilde{V}_A T_{link} + \tilde{V}_B V_B^{-1} \delta\varphi$.

The matched filter processing at the two sites extracts $$[\Theta_{p,A}]_{MF} = \Theta_{p,A} + 2\pi k_{p,A} \quad (25)$$

$$[\Theta_{p,B}]_{MF} = \Theta_{p,B} + 2\pi k_{p,B} \quad (26)$$

whose sum is $$[\Theta_{p,A}]_{MF} + [\Theta_{p,B}]_{MF} = 2\pi\Delta\tilde{v}(t_{p,A} + t_{p,B}) + \tilde{V}_B V_B^{-1} [\delta\varphi(t_{p,A}) + \delta\tau(t_{p,B})] + 2\pi[\tilde{V}_A T_{link}(t_{p,B}) - \tilde{V}_B T_{link}(t_{p,A})] + 2\pi k_p \quad (27)$$

where $k_p \equiv k_{p,A} + k_{p,B}$ is an integer and we now explicitly include the time-dependence of the phase noise as $\delta\varphi(t)$ and of the time-of-flight as $T_{link}(t)$ Assuming both vary slowly with respect to $\Delta t_p \equiv (t_{p,B} - t_{p,A})/2$, a Taylor series expansion about $t_p \equiv (t_{p,A} + t_{p,B})/2$ yields $$[\Theta_{p,A}]_{MF} + [\Theta_{p,B}]_{MF} = 4\pi\Delta\tilde{v} t_p + 2\tilde{V}_B V_B^{-1} \delta\varphi(t_p) - 2\pi\Delta\tilde{v} T_{link}(t_p) + 2\pi k_p + 4\pi\tilde{V}_B \Delta t_p \dot{T}_{link}(t_p) - 2\pi\Delta\tilde{v}\Delta t_p \dot{T}_{link}(t_p) + \tilde{V}_B V_B^{-1} \Delta t_p^2 \delta\ddot{\varphi}(t_p). \quad (28)$$

The first line contains the dominant term. It is inverted to solve for $\delta\varphi(t_p)$ as $$\delta\varphi(t_p) \approx \frac{v_B}{2\tilde{v}_B} \{\Theta_{p,A} + \Theta_{p,B} - 4\pi\Delta\tilde{v} t_p + 2\pi\Delta\tilde{v} T_{link} - 2\pi k_p\} \quad (29)$$

after dropping the MF subscripts, which is exactly Eq. (5) of the main text. The second line of Eq. (28) lists the lowest-order errors due to the varying time-of-flight (first two terms) or strong phase drift between cavities. This last term will be insignificant for optical clocks and is even negligible here for the cavity-stabilized lasers. As noted in the text, the first term, $4\pi\tilde{V}_B \Delta t_p \dot{T}_{link}$ dominates the uncertainty for a turbulent link. It contributes a phase error to $\delta\varphi$ of $2\pi V_B \Delta t_p \dot{T}_{link}(t_p)$. If we scale this to units of time, this is an error in the relative timing between the sites of $\Delta t_p \dot{T}_{link}(t_p)$ To convert to a statistical description, the variations in $\dot{T}_{link}(t)$ are characterized by the power spectral density (PSD) $S_{\dot{T}_{link}}(f) = (2\pi f)^2 S_{T_{link}}(f)$, where $S_{T_{link}}(f)$ is the PSD for the atmospheric piston noise in units of time, i.e. of $T_{link}(t)$. As noted in the main text, we approximate this PSD as $S_{T link}(f) \approx a f^2$. Combining these terms and following the conventional definitions related to Allan deviations, we find an extra phase/timing noise in our clock comparison with a PSD of $S_x = \Delta t_p^2 (2\pi f)^2 a f^{-2}$ or a corresponding additional fractional frequency fluctuation of $S_y = (2\pi f)^2 S_x = \Delta t_p^2 (2\pi f)^4 a f^{-2} = (t_{p,B} - t_{p,A})^2 4\pi^4 a f^2$ The corresponding modified Allan variance is $$\sigma_{MA}^2(t_{avg}) = \frac{3\pi^2 a}{2} (t_{p,B} - t_{p,A})^2 t_{avg}^{-3} \quad (30)$$

as a function of averaging time $t_{avg}$ or Eq. (6) of the main text. We note that with careful time synchronization and simultaneous measurements of $T_{link}(t)$ through the pulse envelope timing, it might be possible, in principle, to include this effect in the analysis and operate at even lower instabilities. However, any experimental demonstration that this is possible can wait until optical clocks have reached even lower levels of instability than their current values.

Figure 25:
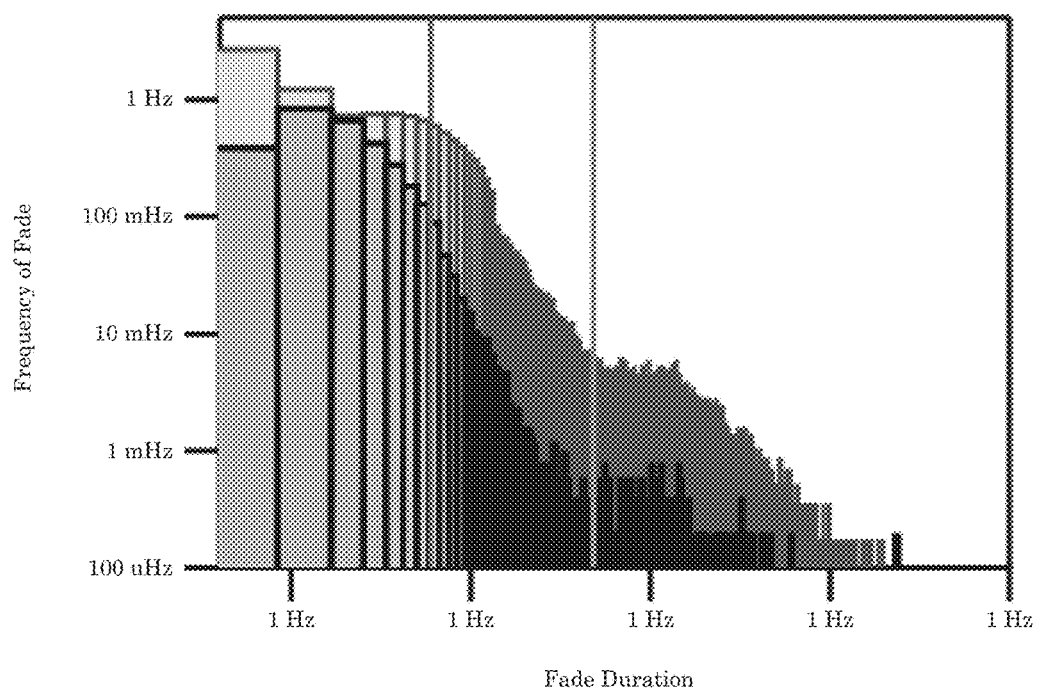
FIG. 25 shows fade statistics for 1% fading of FIG. 22 (blue) and a second run with 26% fading (gray) compared to the mutual coherence times $t_{coh}^{0.12\ rad}$~7 ms (red line) and $t_{coh}^{1\ rad}$~50 ms (orange line). The number of fades of duration greater than $t_{coh}^{0.12\ rad}$ ms are 1,357 and 28,508 for 1% and 26%-fade runs, respectively.

FIG. 25 shows fade statistics for 1% fading of FIG. 2 (blue) and a second run with 26% fading (gray) compared to the mutual coherence times $t_{coh}^{0.12\ rad} \sim 7$ ms (red line) and $t_{coh}^{1\ rad} \sim 50$ ms (orange line). The number of fades of duration greater than $t_{coh}^{0.12\ rad}$ are 1,357 and 28,508 for 1% and 26%-fade runs, respectively.

With regard to Kalman-filter phase extraction, we will describe the Kalman-filter-based extraction of the carrier phase. The notation here follows the main text except we replace $t_p \to p$ since the digital processing essentially relies on sample number. This extraction takes advantage of all of the measured data, i.e. the time series of the observed unscaled wrapped phase, $$\delta\varphi_{obs} = \frac{\tilde{v}_B}{v_B} \delta\varphi(p) + \pi k_p,$$

the time series of the envelope arrival times, $\delta\tau(p)$, the time series of the received power, $I_{rec}(p)$, the dependence of the measured quantities on the received power, $\sigma_{\varphi,obs}(I_{rec})$ and $\sigma_{\tau,obs}(I_{rec})$, and the expected random-walk frequency noise between the lasers from $S_\varphi(f)$. The complicated Kalman-filter-based phase extraction is necessary due to the random distribution and random duration of fades as well as the varying level of measurement noise on the data.

Figure 27:
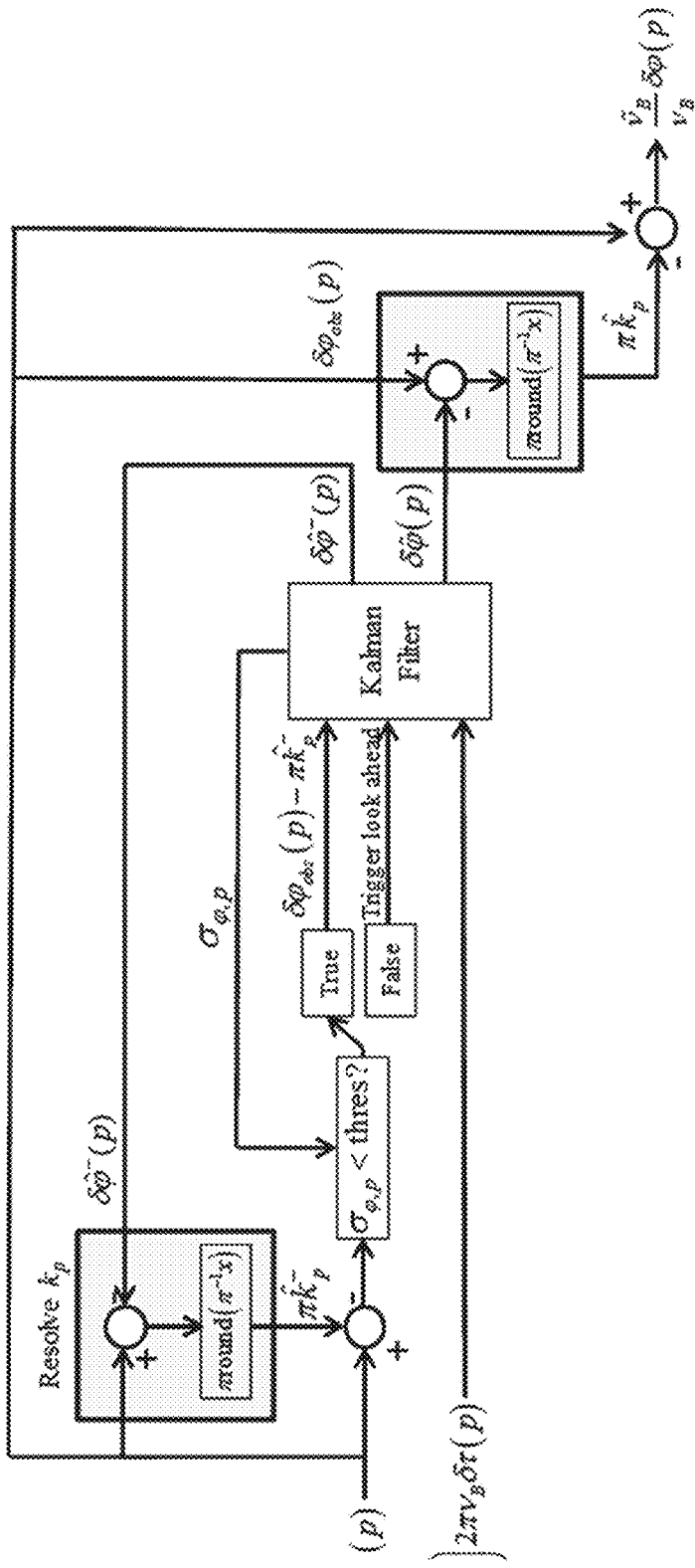
FIG. 27 shows the normal operation of Kalman-filter-based phase extraction.

The process of extracting the phase has two modes, "normal operation" and "look-ahead operation", depending on the uncertainty of the phase estimate from the Kalman filter. Normal operation is a sequential unwrap of the phase using the main Kalman filter's prediction and is shown in FIG. 27. (The basic Kalman equations are given below.) FIG. 27 shows that measurement inputs include the wrapped phase data $$\delta\varphi_{obs}(p) = \frac{\tilde{v}_B}{v_B} \delta\varphi(p) + \pi k_p$$

and the envelope timing data scaled appropriately, $$\left(\frac{\tilde{v}_B}{v_B}\right) 2\pi v_B \delta\tau(p).$$

The a priori estimate of the phase, $\delta\hat{\varphi}^-(p)$ is used to generate an initial estimate of the integer offset, $k_p^-$. If the uncertainty in the estimate, $\sigma_{\varphi,p}$ is below the threshold, the Kalman filter generates a final estimate of the phase, $\delta\overline{\varphi}(p)$, which is then used to generate a final estimate of $k_p$ and thus the unwrapped phase, $$\frac{\tilde{v}_B}{v_B}\delta\varphi(p).$$

(Note that the phase is evaluated at $\tilde{V}_B$, hence the scaling.) Kalman filter inputs not shown: $\sigma_{\varphi,obs}(I_{rec})$, $\sigma_{\tau,obs}(I_{rec})$, $I_{rec}(p)$ and $S_\varphi(f)$. thres: threshold value for $\sigma_{\varphi,p}$ We first generate a prediction for the unwrapped phase. We compare this predicted value to the observed wrapped phase $\delta\varphi_{obs}(p)$ to resolve the integer, $k_p$. In addition to the prediction, the Kalman filter generates the uncertainty associated with the prediction, $\sigma_{\varphi,p}$. Only if this uncertainty is below a threshold do we consider this $k_p$ to be valid. We use a conservative threshold of 0.12 radians, in order to avoid any integer errors (i.e. phase slips) in $k_p$ since there are ~8 million measurements per hour, and to allow for modelling uncertainties. Based on this threshold, we update the main Kalman filter using one of three possibilities: (1) the predicted uncertainty is below threshold, so $k_p$ is valid, and we can proceed to calculate $\delta\varphi(p)$, (2) $\delta\varphi_{obs}(p)$ was unavailable due to a fade, (3) the predicted uncertainty is above threshold, $k_p$ is not necessarily valid, and we switch to the "look-ahead mode".

Figure 28:
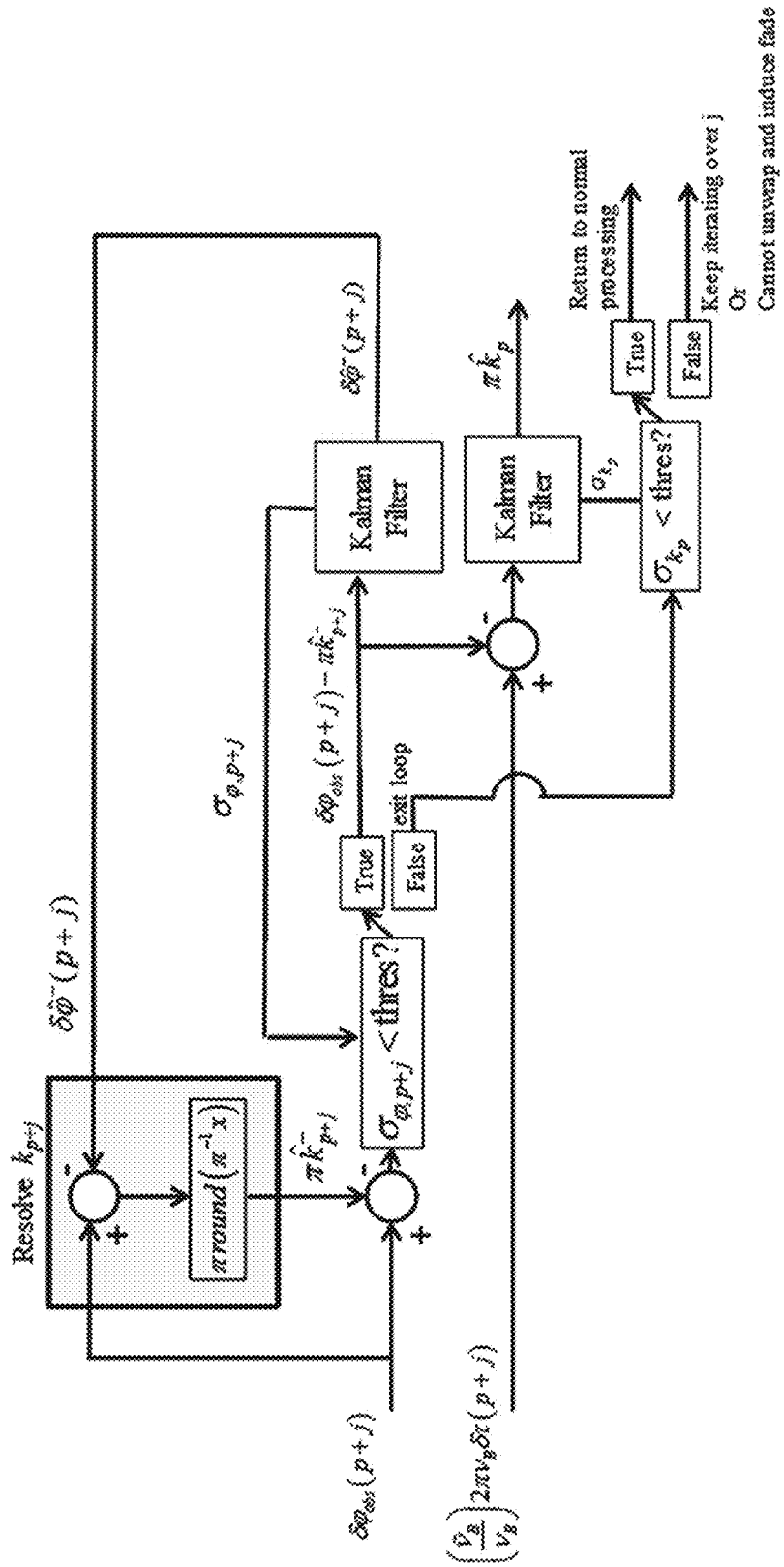
FIG. 28 shows a look-ahead operation. Look-ahead operation iterates over index j to determine the correct integer offset to unwrap the $p^{th}$ measurement. thres: threshold value for $\sigma_{\varphi,p}$.

The second mode, "look-ahead operation", is illustrated in FIG. 28. It is a more complex operation, as we must find $k_p$ based on the phase data and the envelope timing. It cannot rely on a single measurement as the uncertainty in a single envelope-timing measurement is at best +/−3 fs. However, simple averaging of the envelope timing is not robust because of the very real possibility of additional fades over the averaging window and because the actual clock noise prevents satisfactory averaging. Instead, two Kalman filters are used. One performs a sequential unwrap of the phase as in normal operation starting at the initial data point p after the fade and letting $k_p$=0 The difference between this unwrapped phase with $k_p$=0 and the scaled envelope timing data should be exactly $\pi k_p$ except for noise and any offset between the envelope timing data and the phase data. This offset is transceiver dependent, calibrated in an initial measurement, and applied to the envelope timing data after scaling. The difference between the unwrapped phase and the envelope data is then input to a second Kalman filter along with the measurement uncertainties. After ~250-ms (600 data points) if the uncertainty is sufficiently small, then the estimated $k_p$ is considered valid. It is applied to the already partially unwrapped phase data and the algorithm returns to "normal operation". If there is a fade within the 250-ms but the uncertainty is already sufficiently low, then again $k_p$ is applied to the partially unwrapped phase data and the algorithm returns to "normal operation". If the uncertainty is too high, this measurement is recorded as a fade and the look-ahead operation jumps ahead to unwrap the next set of data again using the look-ahead operation.

Data were processed post data acquisition. However, the method outlined here could be implemented in real time with a short processing delay for the look ahead operation to provide a real-time measure of the clock difference (250 ms delayed) or even to synchronize the phase of the two oscillators by feeding back at low bandwidth.

Figure 26:
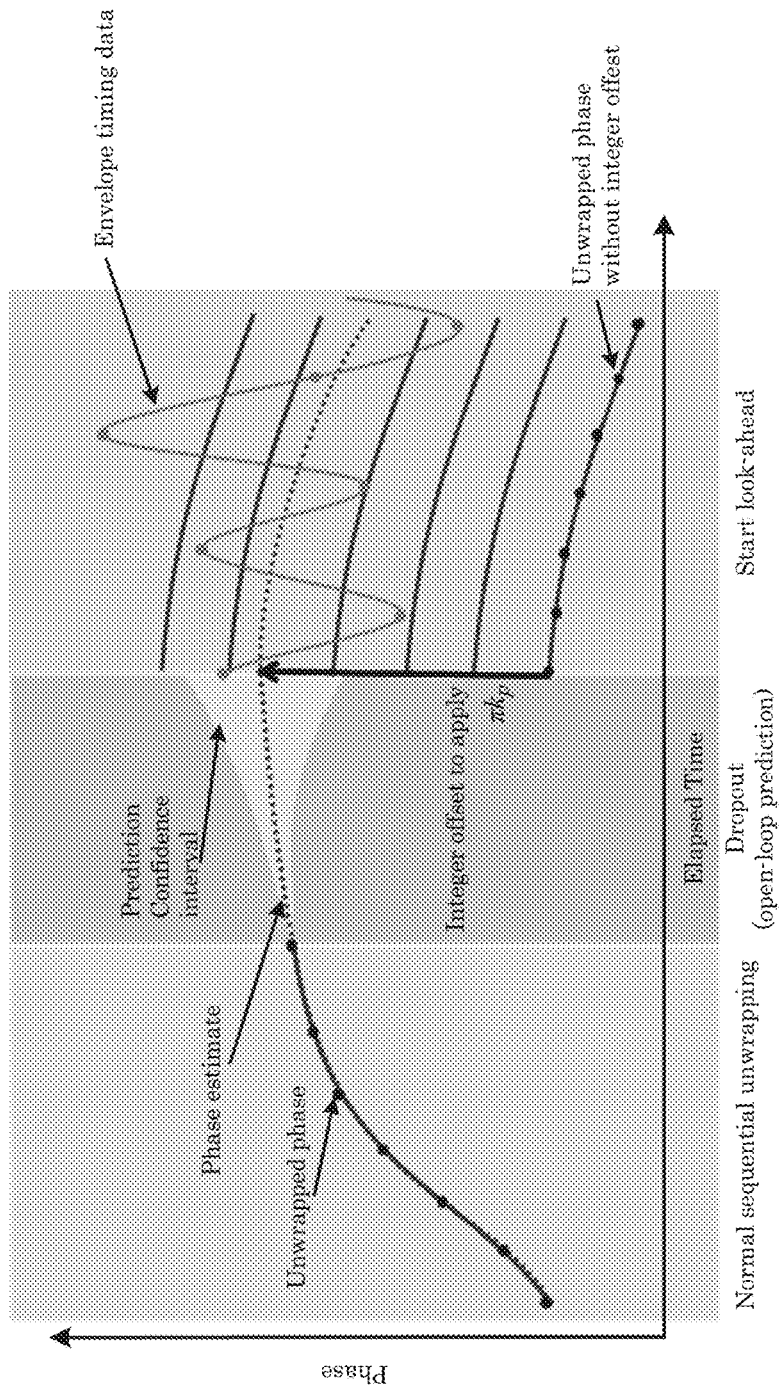
FIG. 26 shows two modes of extracting the phase, referred to as a normal operation and a look ahead operation. Under normal operation, the phase is sequentially unwrapped using the main Kalman filter. When the prediction confidence interval exceeds a threshold, the system transitions to look-ahead operation to use up to ~250 ms of data (established empirically) to determine the correct integer offset to unwrap by before returning to normal operation for the next measurement.

FIG. 26 shows two modes of extracting the phase, "normal operation" and "look ahead operation". Under normal operation, the phase is sequentially unwrapped using the main Kalman filter. When the prediction confidence interval exceeds a threshold, the system transitions to look-ahead operation to use up to ~250 ms of data (established empirically) to determine the correct integer offset to unwrap by before returning to normal operation for the next measurement.

FIG. 27 shows normal operation of Kalman-filter-based phase extraction. The measurement inputs include the wrapped phase data $$\delta\varphi_{obs}(p) = \frac{\tilde{v}_B}{v_B}\delta\varphi(p) + \pi k_p$$

and the envelope timing data scaled appropriately, $$\left(\frac{\tilde{v}_B}{v_B}\right) 2\pi v_B \delta\tau(p).$$

The a priori estimate of the phase, $\delta\hat{\varphi}^-(p)$ is used to generate an initial estimate of the integer offset, $k_p^-$. If the uncertainty in the estimate, $\sigma_{\varphi,p}$ is below the threshold, the Kalman filter generates a final estimate of the phase, $\delta\overline{\varphi}(p)$, which is then used to generate a final estimate of $k_p$ and thus the unwrapped phase, $$\frac{\tilde{v}_B}{v_B}\delta\varphi(p).$$

(Note that the phase is evaluated at $\tilde{V}_B$, hence the scaling.) Kalman filter inputs not shown: $\sigma_{\varphi,obs}(I_{rec})$, $\sigma_{\tau,obs}(I_{rec})$, $I_{rec}(p)$ and $S_\varphi(f)$. thres: threshold value for $\sigma_{\varphi,p}$ FIG. 28 shows steps for look-ahead operation. Look-ahead operation iterates over index j to determine the correct integer offset to unwrap the $p^{th}$ measurement. thres: threshold value for $\sigma_{\varphi,p}$ With regard to: Kalman filter implementation, our state model for the pth measurement is $\Phi_p = A\Phi_{p-1} + Q_p$ where $$\Phi_p = \begin{pmatrix} \delta\varphi_p \\ \delta\dot{\varphi}_p \end{pmatrix},$$

$\delta\varphi_p$ is the phase, $$A = \begin{pmatrix} 1 & 2\pi\Delta \\ 0 & 1 \end{pmatrix},$$

$1/\Delta=\Delta f_r$ is the sampling rate of the system, and the process noise $$Q_p = \begin{pmatrix} 0 & 0 \\ 0 & q_0 2\pi^2 \Delta \end{pmatrix}$$

captures the $f^{-4}$ relative oscillator phase noise with $q_0=22$ Hz$^2$/Hz to match the measured PSD. Here, we assume that the process noise is constant over the entire measurement duration, i.e. $Q_p=Q_0$. For each measurement point, we generate an a priori estimate of the state and of the associated co-variance matrix, $P_p$, via $$\hat{\Phi}_p^- = A\hat{\Phi}_{p-1}$$

$$P_p^- = AP_{p-1}A^T + Q_0 \quad (31)$$

where the $\hat{}$ symbol represents an estimate of the state and the $-$ symbol indicates an a priori value. We can generate an initial estimate of $k_p$ from $\hat{\Phi}_p^-$. The filter gains, $K_p$, are then computed using the amplitude dependent measurement noise co-variance matrix, $$R_p = \begin{pmatrix} \sigma_{\varphi,obs}^2(I_{rec}) & 0 \\ 0 & \sigma_{\tau,obs}^2(I_{rec}) \end{pmatrix},$$

as is the posterior estimate of the state, $\hat{\Phi}_p$, and the posterior associated co-variance matrix, $P_p$ $$K_p = P_p^- H(HP_p^- H^T + R_p)^{-1}$$

$$\hat{\Phi}_p = \hat{\Phi}_p^- + K_p(Z_p - H\hat{\Phi}_p^-) \quad (32)$$

$$P_p = (I - K_p H)P_p^-$$

where I is the identity matrix, $Z_p$ is a set of measurements, and H is the matrix which relates the underlying state to the measurements, i.e., $H\Phi_p = Z_p$. The posterior estimate of the state, $\hat{\Phi}_p$, is then used to generate the final estimate of $k_p$.

Note that in the presence of a fade, the posterior equations of (0.8) reduce to $\hat{\Phi}_p = \hat{\Phi}p^-$ and $P_p = P_p^-$. From this, we can immediately see how the co-variance matrix for the uncertainty of the state estimate evolves as the fade duration increases. We can write the recursive expression for fades of increasing length to find $$P_{p+n} = A^{n+1} P_{p-1} A^{Tn+1} + \sum_0^n (A^n Q_0 A^{Tn})$$

where n is the number of samples for the fade. This yields $$\sigma_{\varphi,p+n}^2 \approx \sigma_{\varphi,p-1}^2 + 2\pi\Delta(n+1)(\sigma_{\varphi\dot{\varphi},p-1}^2 + \sigma_{\dot{\varphi}\varphi,p-1}^2) + [2\pi\Delta(n+1)]^2 \sigma_{\dot{\varphi},p-1}^2 + \tfrac{4}{3}\pi^4 q_0 \Delta^3 n(n+1)(1+2n) \quad (33)$$

where the co-variance matrix $P_{p-1}$ is defined as $$P_{p-1} = \begin{pmatrix} \sigma_{\varphi,p-1}^2 & \sigma_{\varphi\dot{\varphi},p-1}^2 \\ \sigma_{\dot{\varphi}\varphi,p-1}^2 & \sigma_{\dot{\varphi},p-1}^2 \end{pmatrix}.$$

For $\sigma_{\varphi,p-1} \approx 0.05$ rad, $\sigma_{\varphi\dot{\varphi},p-1} = \sigma_{\dot{\varphi}\varphi,p-1} \approx 0.2$ Hz$^{1/2}$, $\sigma_{\dot{\varphi},p-1} = 2$ Hz, $\Delta \approx 0.4$ ms and $q_0 = 22$ Hz$^2$/Hz, this results in coherence times of $t_{coh}^{0.12\ rad} \sim 6$ ms and $t_{coh}^{1\ rad} \sim 50$ ms which agree with the values extracted from the measurements.

Example 4

Sub-femtosecond synchronization of optical clocks in the presence of significant motion In this Example, equations are numbered starting from equation 1.

The extreme stability of optical clocks has motivated the development of new time and frequency transfer techniques. Those include frequency transfer over thousands of kilometers of fiber reaching 10-18 fractional stability and femtosecond-level clock synchronization cross several kilometers of turbulent air. In many cases, clock networks involve moving platforms such as aircraft and satellites. Motion poses many challenges to time and frequency transfer, due in part to the finite speed of light. We present a method of frequency comb-based two-way time transfer based on earlier quasi-static work which allows sub-femtosecond synchronization despite 24 m/s motion. No stability degradation was observed and indeed the new Doppler-tolerant system supports a higher level of performance than earlier quasi-static efforts.

Figure 29:
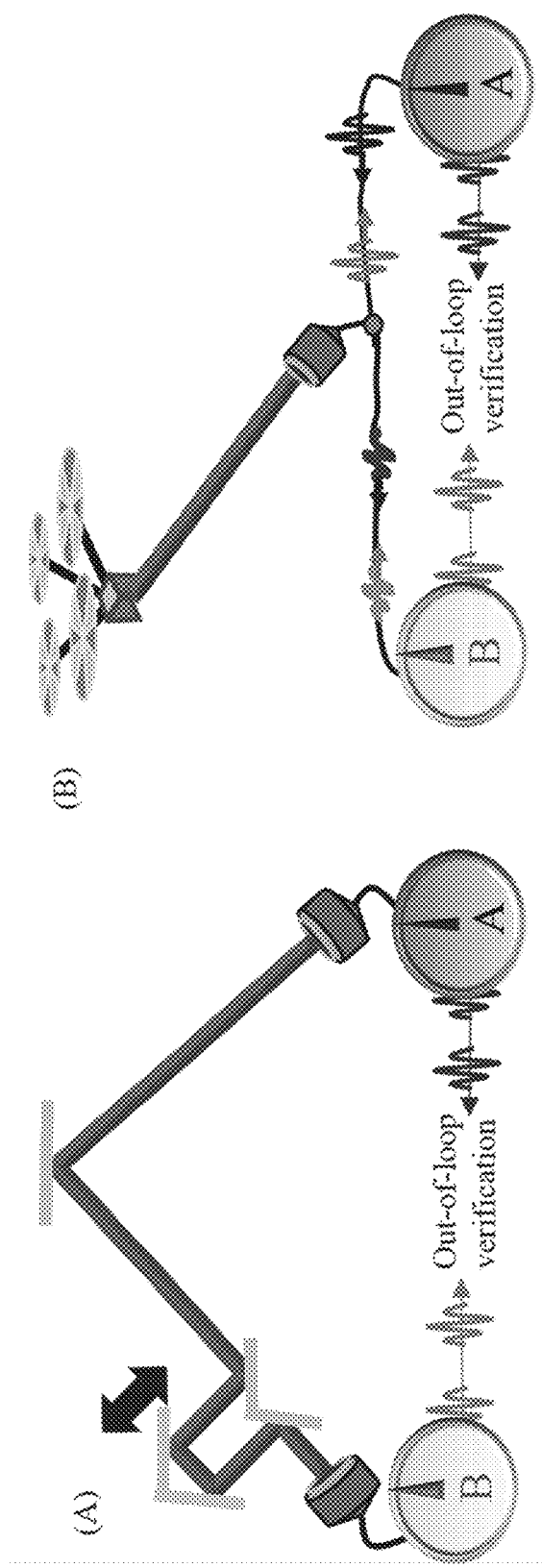
FIG. 29 shows (a) a Doppler simulator mode of operation and a (b) cartoon of UAS mode of operation. In UAS mode, the light is polarization multiplexed between site A and site B due to the use of single tracking terminal and retro reflector. In both cases, the system is folded to allow for out-of-loop verification.
Figure 30:
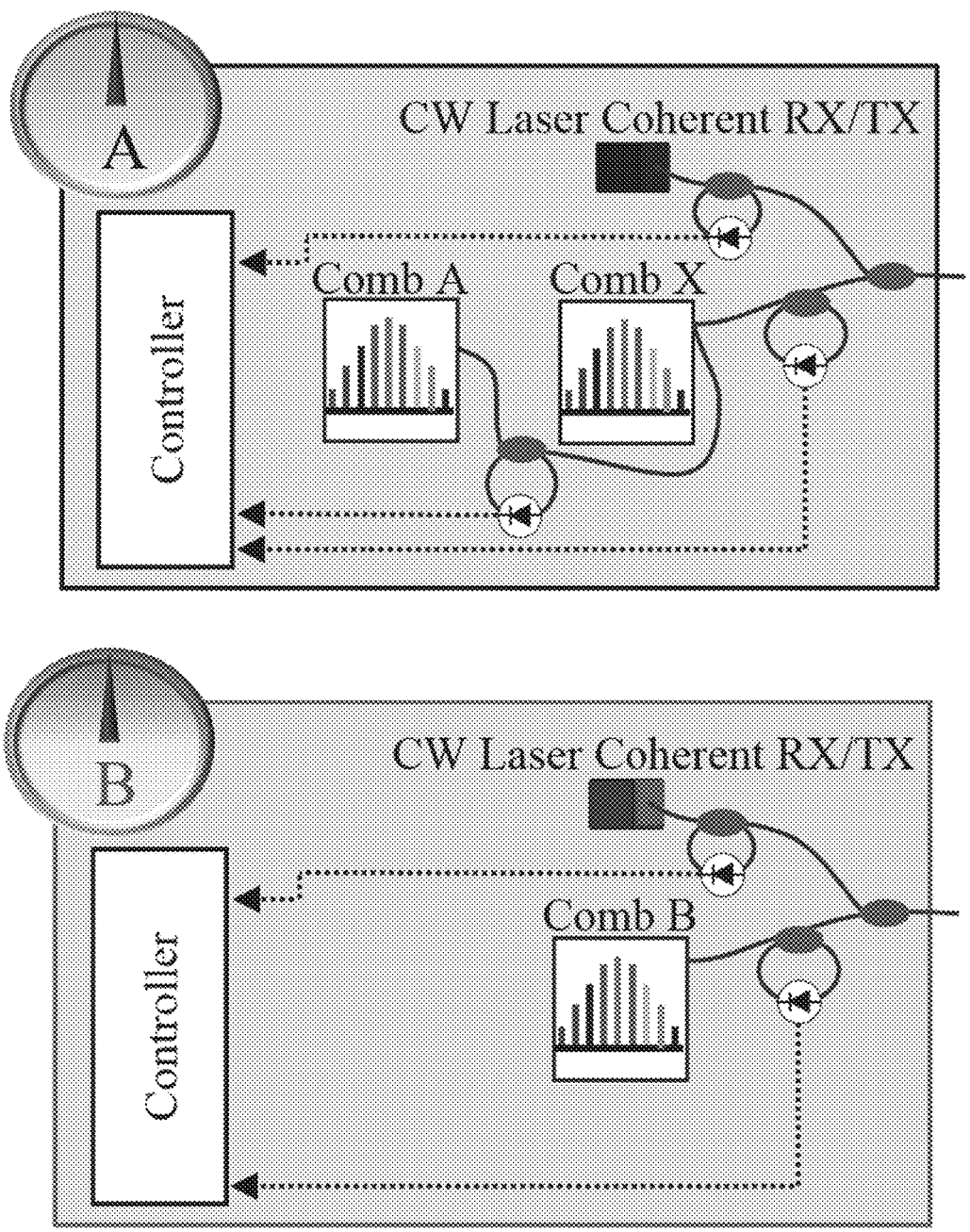
FIG. 30 shows (a) an optical clock design for site A including of two frequency combs, A (master) and X (transfer), a modulated cw laser for the communications link and coarse timing, and a hybrid FPGA-DSP-based controller. Both comb A and comb X are phase-locked to the same optical oscillator (not shown). Comb A serves as the clock output while comb X serves as the local oscillator to read the pulse arrival times from site B. (b) The architecture at site B is similar except there is only one comb, B (remote), which both serves as the clock output and the local oscillator to read the pulse arrival times.

The physical system has been modified from that presented earlier to include a moving retroreflector to induce Doppler effects. FIGS. 29 and 30 show the two sites that are part of the experiment: the master site (A) and the remote site (B). The setup includes master and remote optical clocks based on self-referenced frequency combs locked to C-band cavity-stabilized lasers. The frequency combs have a repetition rate of 200 MHz. A transfer comb with a 2-kHz repetition rate offset is added on site A to perform linear optical sampling (LOS) at both sites. Pulses are transmitted over a 4-km folded free-space link. The folded path enables an out-of-loop comparison of the two clocks. To remove the 5-ns time ambiguity of the LOS signals, a two-way coarse timing system based on modulated CW carriers is multiplexed into the same free-space link. The clock offset, as computed on the remote site, is used to apply feedback to the remote clock. The servo loop has a 10-Hz bandwidth and features a Kalman filter that allows the system to operate when the free-space link fades.

The setup was modified to simulate clock motion. Since the clocks used in this work are not yet fully portable, a "Doppler simulator" was built on one end of the free-space link. Additionally, a retroreflector was mounted on an unmanned aerial system (UAS). These two configurations are shown in FIG. 29. The simulator is based on a retroreflector mounted on a cart. (See FIG. 35.) The cart is moved along a 2-meter rail using a computer-controlled motor. Mirrors and other free-space optics were used to create effective displacements of 24 meters and velocities of up to 25 m/s.

The synchronization equations were rewritten to account for motion. Interpolation of the timing signals was used to account for the necessarily non-simultaneous LOS measurements. A velocity-dependent term was also added to address the fundamental non-reciprocity arising from to the finite speed of light. The final equation, ignoring calibration terms, is $$\Delta TAB = (T_A - T_{A \to B} - T_B + T_{B \to A})/2 + (Vc/4)(T_A + T_{A \to B} - T_B - T_{B \to A}) \quad (1)$$

where $\Delta TAB$ is the retrieved clock time offset. $T_A$ is the departure time of a comb pulse from site A while $T_{A \to B}$ is the arrival time at site B of that same pulse. $T_B$ and $T_{B \to A}$ have the same meaning but refer to a remote comb pulse departing from site B. These pulse departure and arrival times are derived from a combination of LOS and coarse timing signals. The first term in equation (1) is the classic two-way time transfer equation for static platforms. The velocity (V) relative to the speed of light (c) can be calculated from the Doppler-shifted repetition rates of the combs at the outputs of the free-space link.

Figure 31:
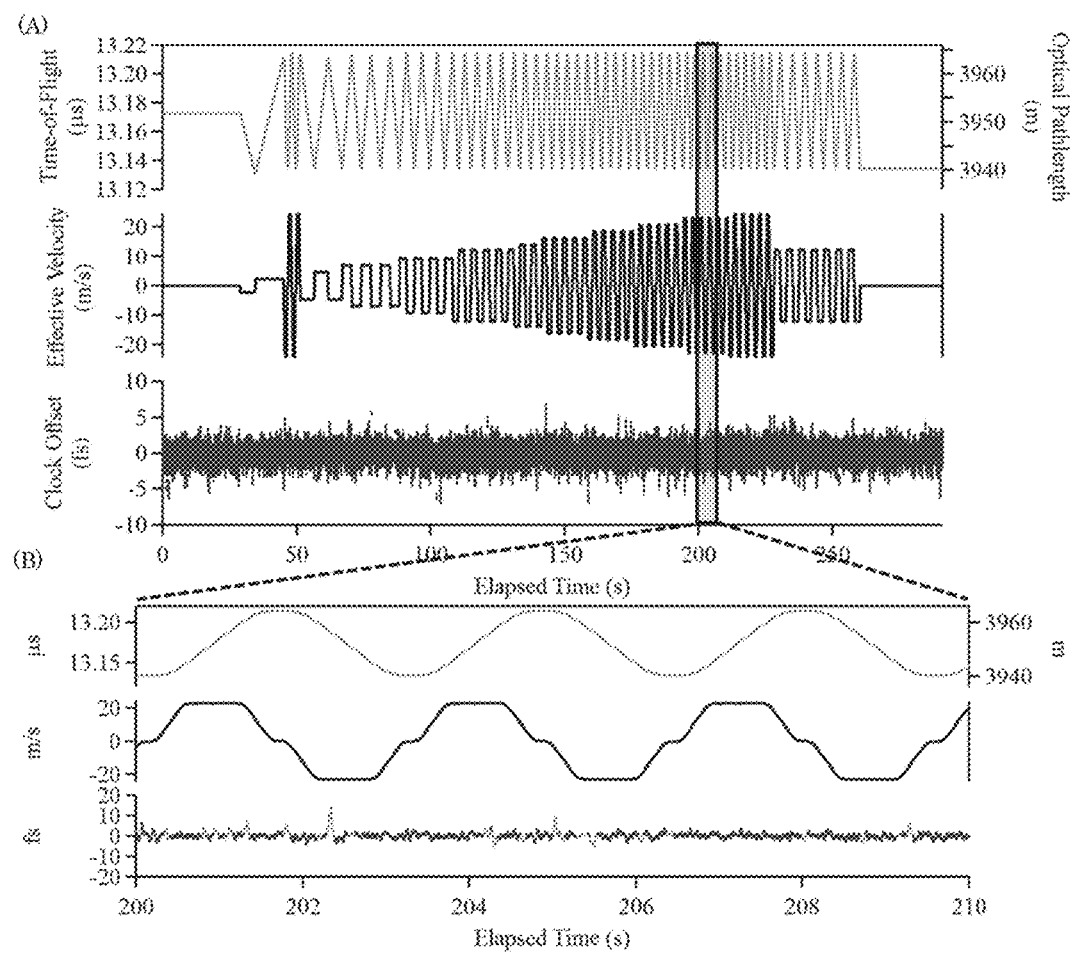
FIG. 31 shows results from Doppler simulator operated at velocities ranging from 0 m/s to 25 m/s. The time-of-flight (top panel, left axis) and effective velocity (middle panel) were retrieved from the in-loop measurements of the comb pulses and coarse-timing. The clock offset (bottom panel) is the out-of-loop verification of the clock offset during periods of active synchronization. All data are plotted at the full ~2 kHz detection rate. (b) Inset showing same results in addition to continuous recording of the clock offset (cyan line) plotted underneath the clock offset for periods of active synchronization (black dots)
Figure 33:
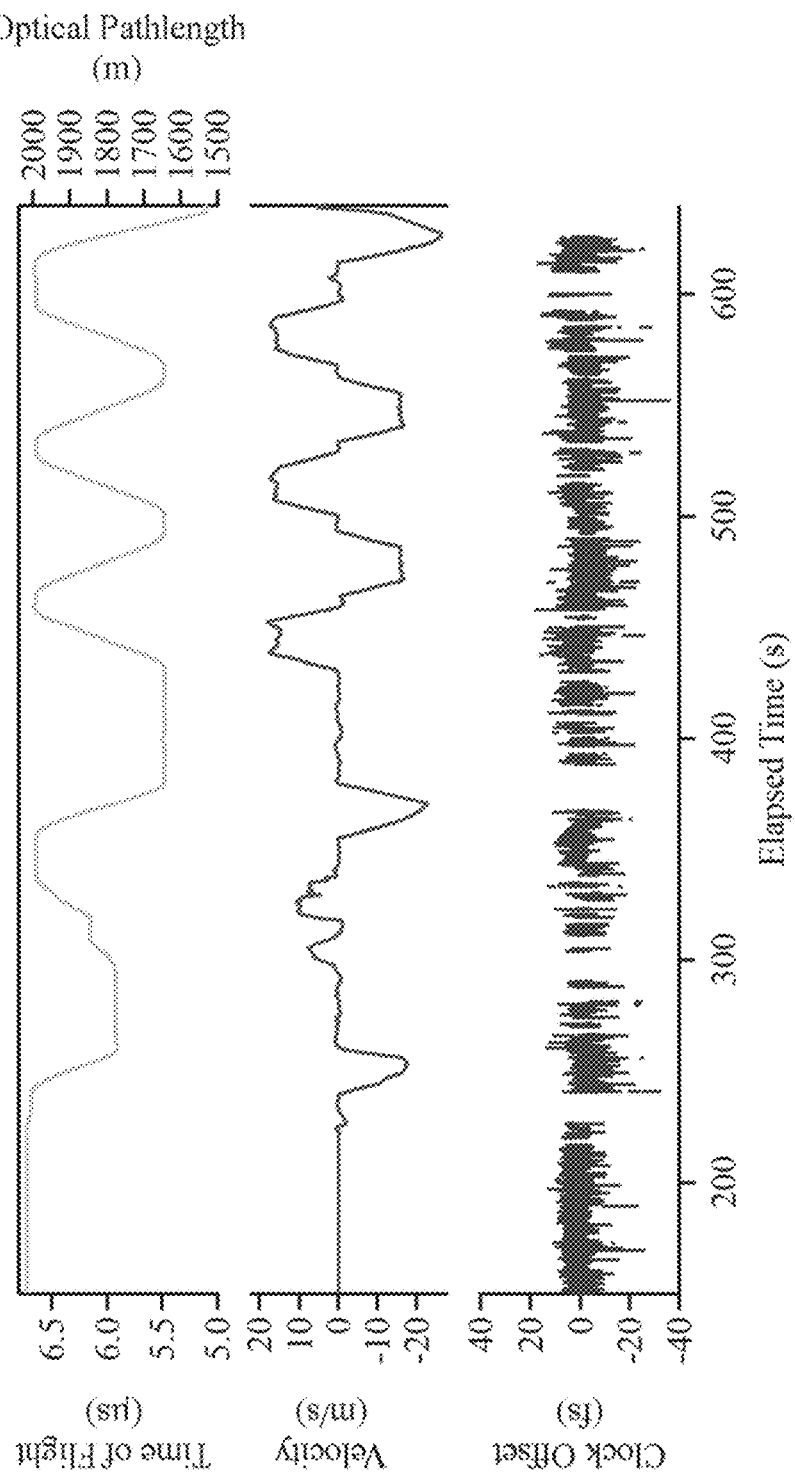
FIG. 33 shows results from UAS mode of operation. The time-of-flight (top panel, left axis) and effective velocity (middle panel) were retrieved from the in-loop measurements of the comb pulses and coarse-timing. The clock offset (bottom panel) is the out-of-loop verification of the clock offset during periods of active synchronization. All data are plotted at the full ~2 kHz detection rate.

Using the setup and equation described above, we demonstrated successful synchronization across the 4-km link even during retroreflector motion. FIG. 31 shows a typical subset of the data under operation of the Doppler simulator for the time-of-flight, the velocity and out-of-loop time difference between the clocks during motion. FIG. 33 shows a similar time series for operation with a retroreflector mounted to a UAS. The systematic time offset due to velocity is well below the loop residuals and is not visible on this scale. It is worth noting that using a non-Doppler-tolerant equation would lead picosecond-level clock time offsets. Long free-space dropouts were masked to make any underlying structure in the out-of-loop data more evident.

Figure 32:
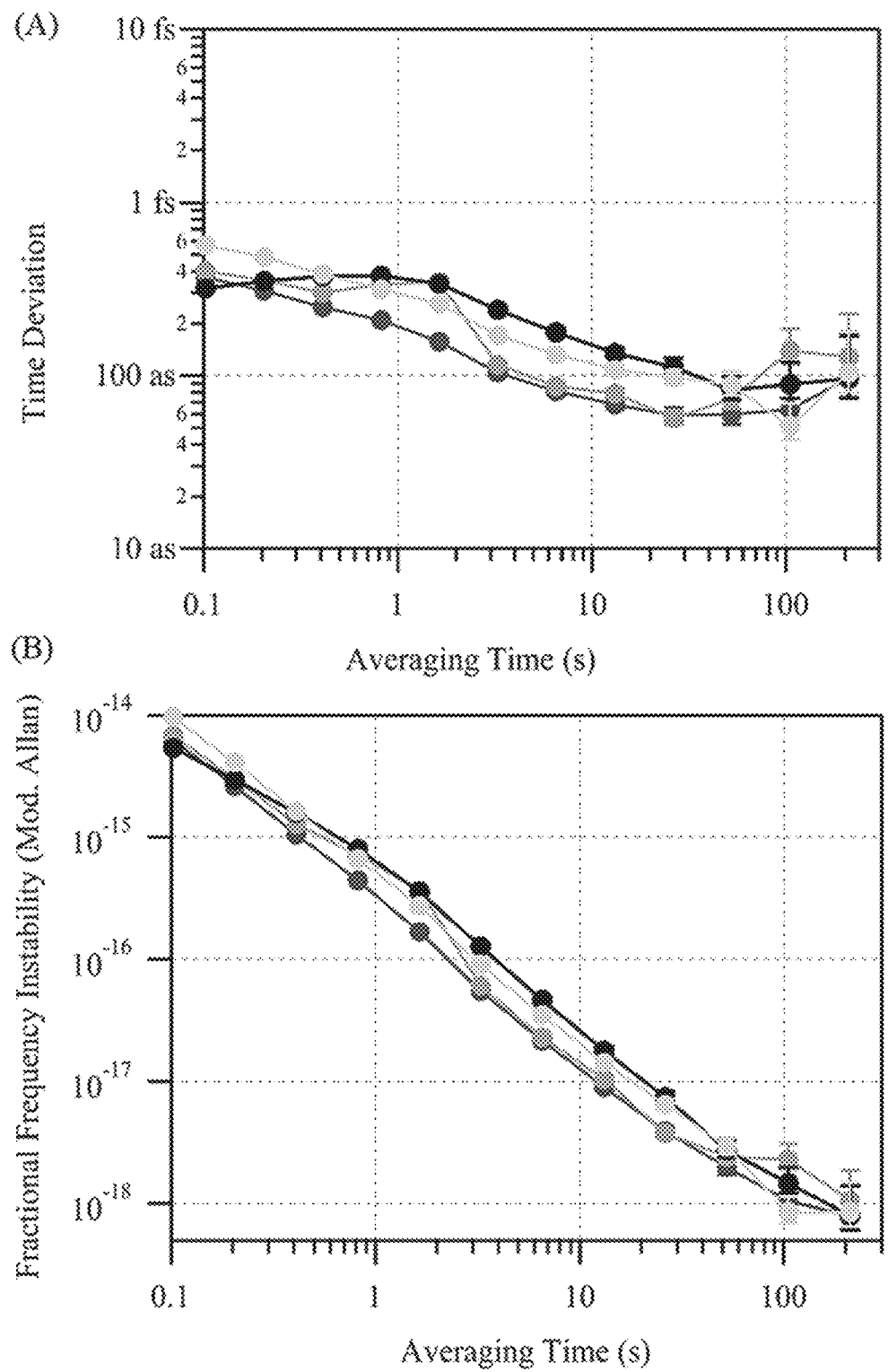
FIG. 32 shows (a) sub-femtosecond time deviation for motion at +/−24 m/s using the Doppler simulator and a free-space path with a path length of 0 m (red circles), 2 km (blue circles), and 4 km (cyan circles). Additionally, the time deviation for 0 m/s of motion and a 0 m free-space path is shown (gray circles) indicating that there is no significant degradation of the synchronization due to the presence of motion. The synchronization bandwidth was 10 Hz for all data. (b) Modified Allan deviation for the same data.

FIG. 32 shows the time deviation and fractional instability computed for operation of the Doppler simulator a +/−24 m/s velocity for air paths of 0, 2 and 4 km. A measurement of a shorted (0 m) free-space path with no motion shows that there was no significant degradation of the synchronization due to the presence of motion.

Figure 37:
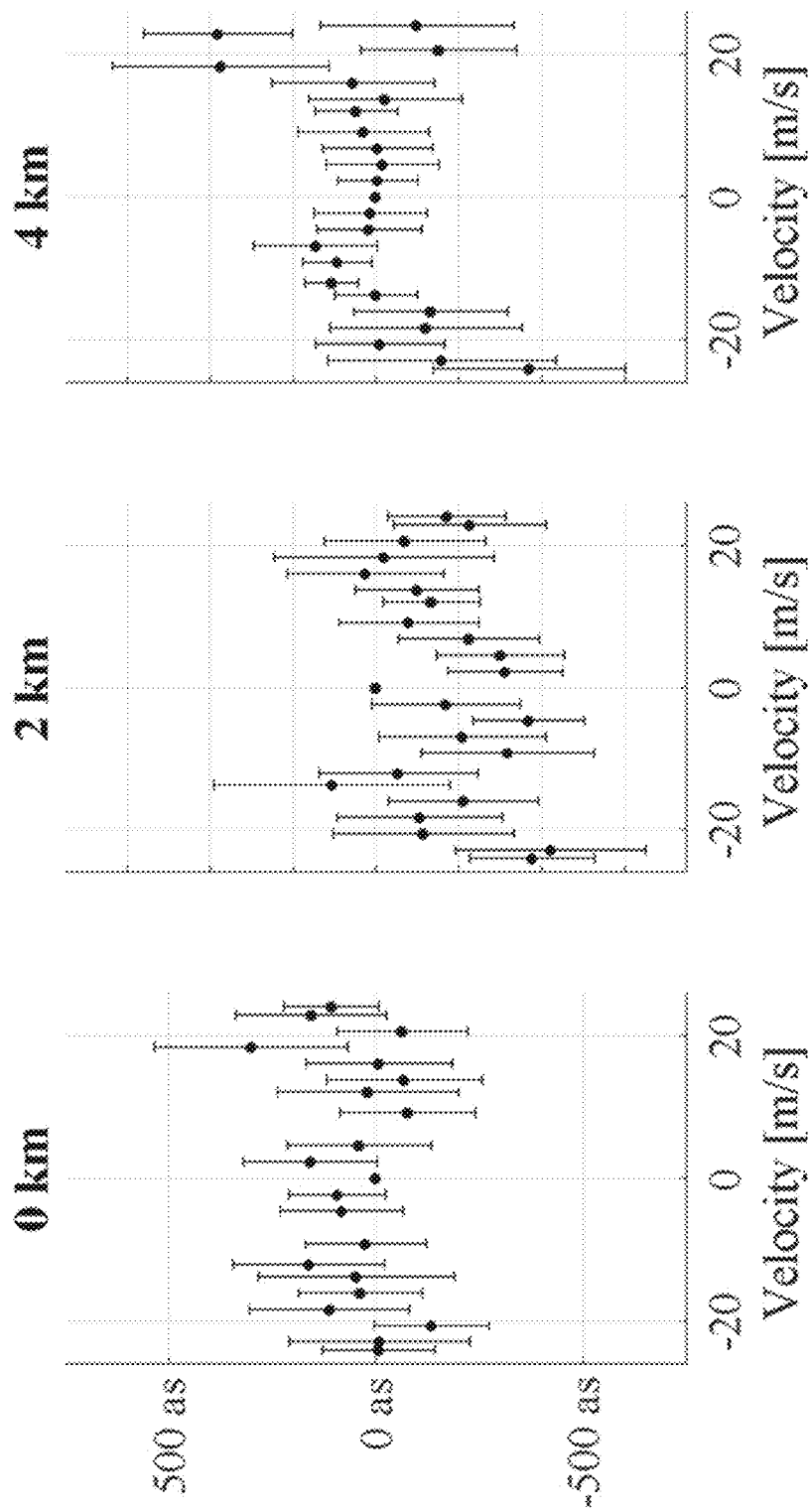
FIG. 37 shows a lack of residual bias due to motion for free-space paths of 0, 2, and 4 km lengths.
Figure 38:
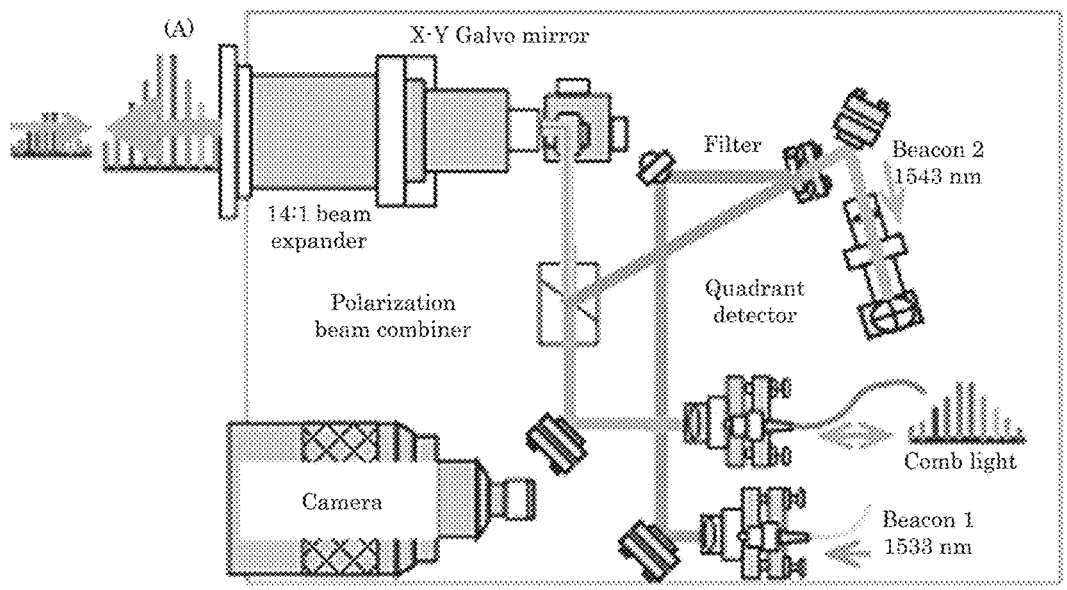
FIG. 38 shows an FSO terminal (a) design and (b) prototype. The signal (comb light) path is fully bi-directional; the transmitted and received comb signals pass through the same fiber entering the terminal. The beacons are bi-directional (and co-collimated with the signal) up to the filter, where the received beacon is separated and directed onto a quadrant detector. The quadrant detector signal acts on the galvo mirror to center the received beacon onto the detector. The received comb signal is then efficiently passively coupled into its fiber.
Figure 38:
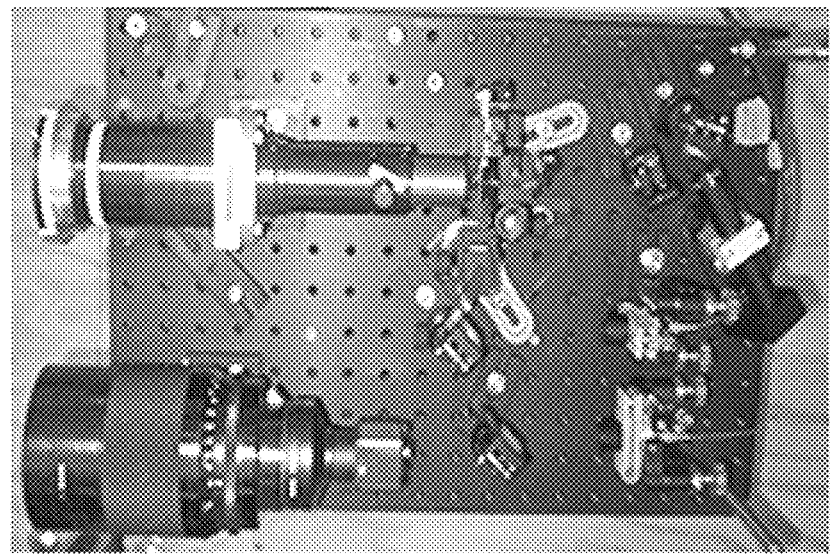

A small residual velocity dependence is found when performing a statistical analysis. For this analysis, the clock time offsets during constant-velocity segments were averaged and plotted against velocity. The results are shown in FIG. 37. The residual bias remains below 500 as for velocities up to ±24 m/s with a slight statistically significant bias present at the highest velocities. For velocities beyond ±24 m/s, additional technical challenges will arise; however, equation (1) will remain valid to the first order.

We demonstrate real-time synchronization of two optical clocks at the femtosecond level across a free-space link with a varying path length. We show that the velocity-dependent residuals are below 500 as for motion up to ±24 m/s. No stability degradation is observed for ±24 m/s compared to a static link. The master synchronization equation presented here is valid for all velocities to first order although the implementation would need modifications to support even larger Doppler shifts. We believe that Doppler-tolerant optical two-way time and frequency transfer will be a crucial part of future clock networks.

FIG. 29 shows (a) a Doppler simulator mode of operation and a (b) cartoon of UAS mode of operation. In UAS mode, the light is polarization multiplexed between site A and site B due to the use of single tracking terminal and retro reflector. In both cases, the system is folded to allow for out-of-loop verification.

FIG. 30 shows (a) an optical clock design for site A including of two frequency combs, A (master) and X (transfer), a modulated cw laser for the communications link and coarse timing, and a hybrid FPGA-DSP-based controller. Both comb A and comb X are phase-locked to the same optical oscillator (not shown). Comb A serves as the clock output while comb X serves as the local oscillator to read the pulse arrival times from site B. (b) The architecture at site B is similar except there is only one comb, B (remote), which both serves as the clock output and the local oscillator to read the pulse arrival times.

FIG. 31 shows results from Doppler simulator operated at velocities ranging from 0 m/s to 25 m/s. The time-of-flight (top panel, left axis) and effective velocity (middle panel) were retrieved from the in-loop measurements of the comb pulses and coarse-timing. The clock offset (bottom panel) is the out-of-loop verification of the clock offset during periods of active synchronization. All data are plotted at the full ~2 kHz detection rate. (b) Inset showing same results in addition to continuous recording of the clock offset (cyan line) plotted underneath the clock offset for periods of active synchronization (black dots).

FIG. 32 shows (a) Sub-femtosecond time deviation for motion at +/−24 m/s using the Doppler simulator and a free-space path with a path length of 0 m (red circles), 2 km (blue circles), and 4 km (cyan circles). Additionally, the time deviation for 0 m/s of motion and a 0 m free-space path is shown (gray circles) indicating that there is no significant degradation of the synchronization due to the presence of motion. The synchronization bandwidth was 10 Hz for all data. (b) Modified Allan deviation for the same data.

FIG. 33 shows results from UAS mode of operation. The time-of-flight (top panel, left axis) and effective velocity (middle panel) were retrieved from the in-loop measurements of the comb pulses and coarse-timing. The clock offset (bottom panel) is the out-of-loop verification of the clock offset during periods of active synchronization. All data are plotted at the full ~2 kHz detection rate.

Figure 34:
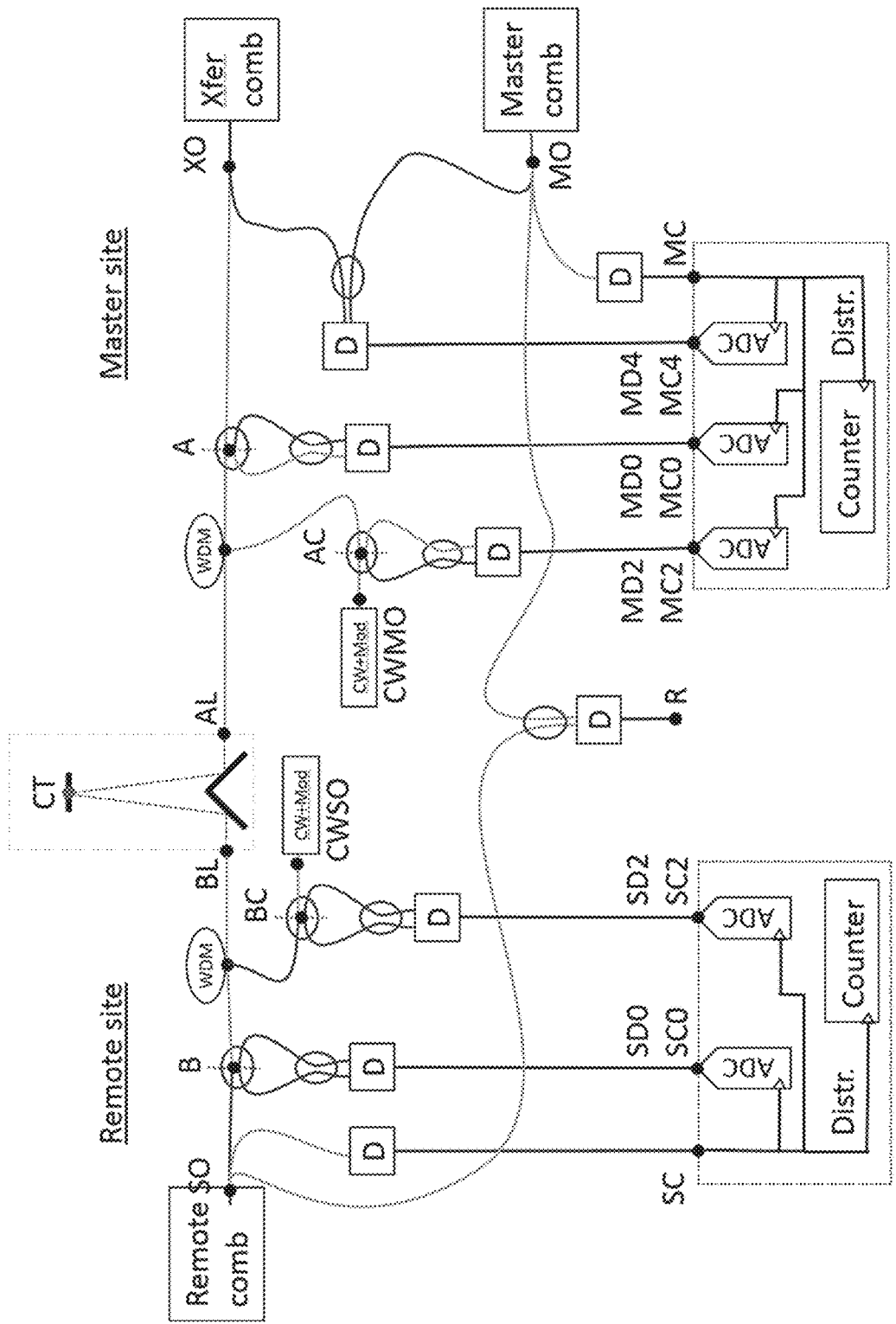
FIG. 34 shows a system to compute the calibration terms.

FIG. 34 shows a schematic of the system at the level of detail necessary to compute the calibration terms.

Figure 35:
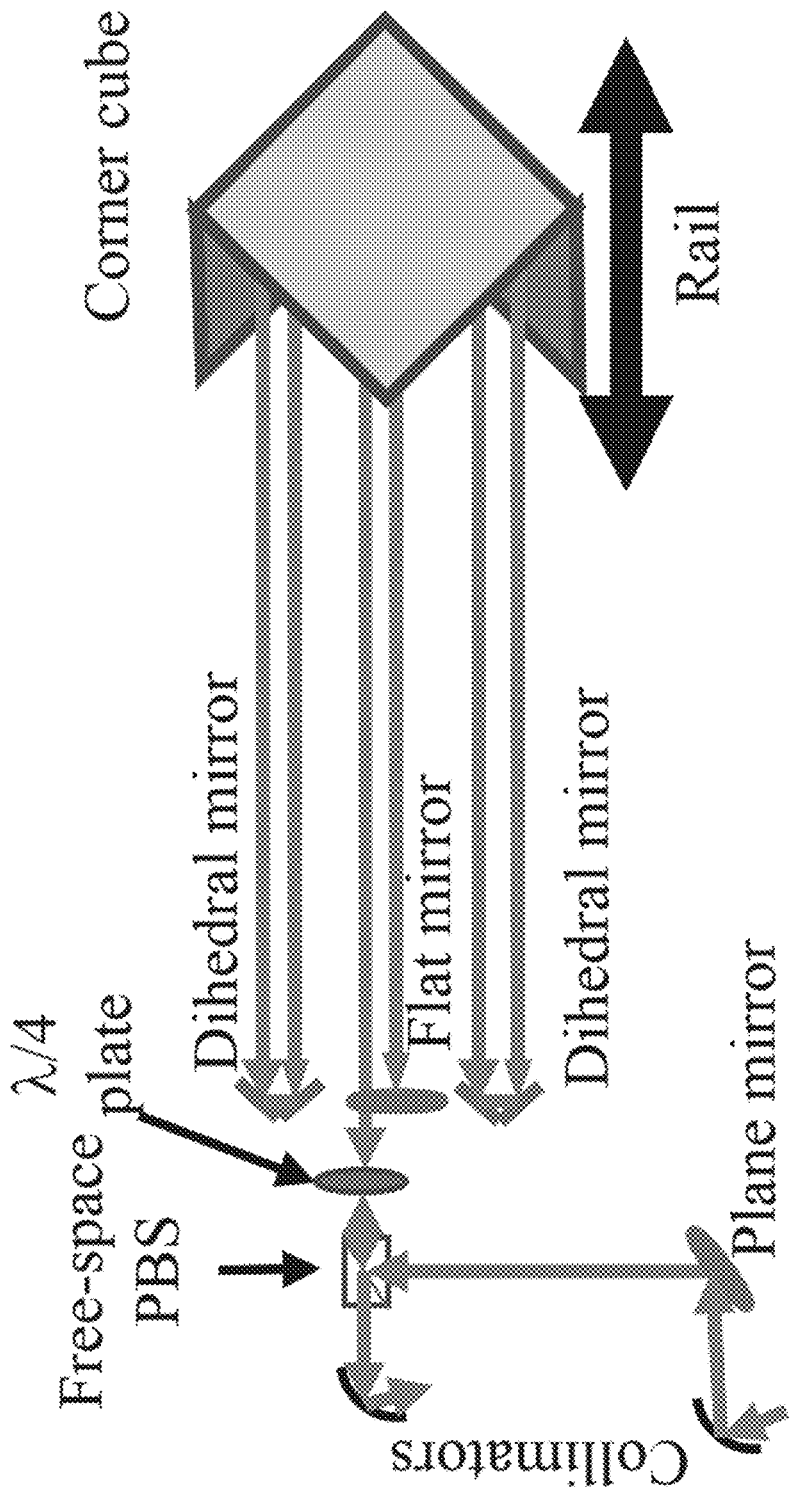
FIG. 35 shows a Doppler simulator including 12-pass geometry with a maximum effective velocity of 24 m/s for 2 m/s rail motion. The light is polarization multiplexed for bi-directional operation of the simulator that preserves reciprocity of the full optical link.

FIG. 35 shows a design of Doppler simulator showing 12-pass geometry which has a maximum effective velocity of 24 m/s for 2 m/s rail motion. The light is polarization multiplexed in order to allow for bi-directional operation of the simulator, preserving the necessary reciprocity of the full optical link.

Figure 36:
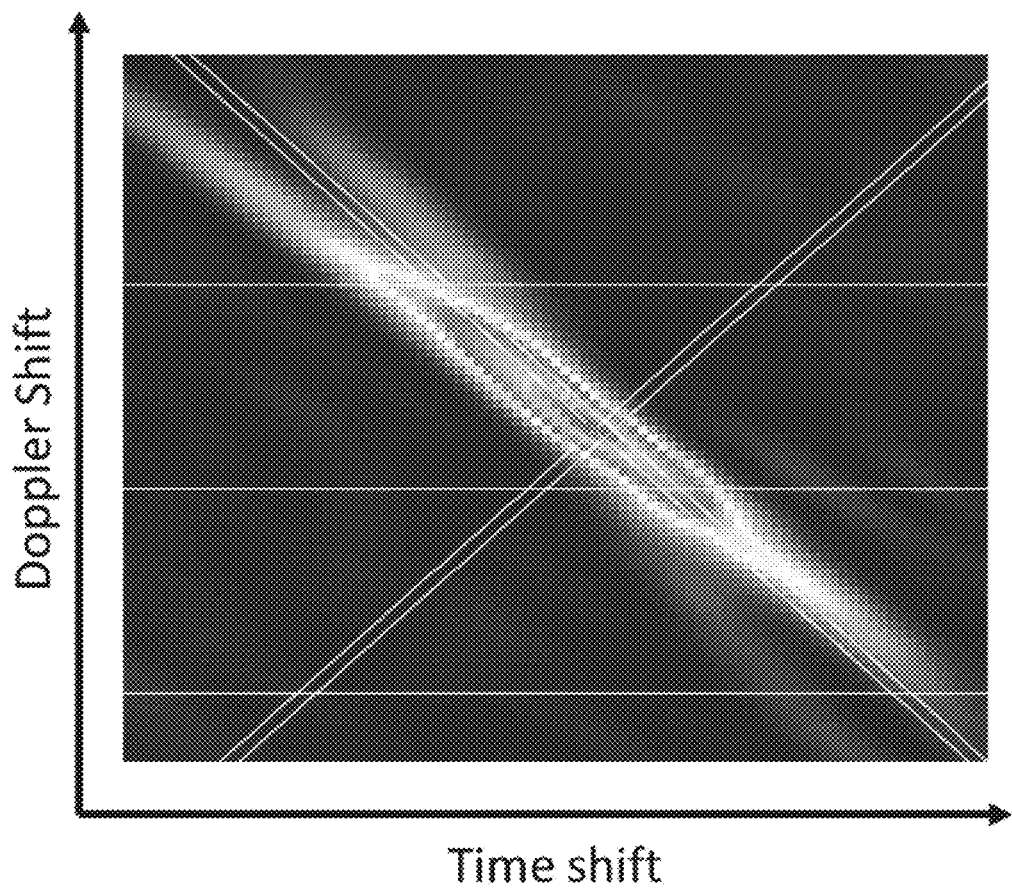
FIG. 36 shows a cross-ambiguity function to compute the true pulse arrival times.

FIG. 36 shows an example of the cross-ambiguity function used to compute the true pulse arrival times.

FIG. 37 shows a lack of residual bias due to motion for free-space paths of 0, 2, and 4 km lengths.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one It is contemplated that from another. The modifier "about" used in connection with a quantity is inclusive of the stated value and has the meaning dictated by the context (e.g., it includes the degree of error associated with measurement of the particular quantity).

What is claimed is:

1. An optical time distributor for optical two-way time-frequency transfer, the optical time distributor comprising:
    a master clock comprising:
        a master comb that produces a master clock coherent optical pulse train output;
        a transfer comb that produces a transfer coherent optical pulse train; and
        a free-space optical terminal in optical communication with the transfer comb and a free space link and that:
            receives the transfer coherent optical pulse train from the transfer comb;
            produces a master optical signal in response to receipt of the transfer coherent optical pulse train;
            communicates the master optical signal from the master clock to a remote clock via a free space link; and
            receives a remote optical signal from the remote clock, the master clock producing a pulse label; and
    the remote clock in optical communication with the master clock via the free space link and comprising:
        a remote comb that produces:
            a remote clock coherent optical pulse train output;
            a remote coherent optical pulse train;
        a free-space optical terminal in optical communication:
            with the remote comb; and
            with the free-space optical terminal of the master clock via the free space link, and that:
                receives the remote coherent optical pulse train from the remote comb;
                receives the master optical signal from the free-space optical terminal of the master clock;
                produces a modulated cw laser signal in response to receipt of the remote coherent optical pulse train; and
                communicates the modulated cw laser signal to the free-space optical terminal of the master clock, the remote clock producing a pulse label;
    wherein the master clock further comprises:
        a digital signal controller in electrical communication with the master comb, a master-transfer optical transceiver, a remote-transfer optical transceiver, and a coarse timing and communications module.

2. The optical time distributor of claim 1,
wherein the master clock further comprises:
    a master-transfer optical transceiver in optical communication
    with the master comb and the transfer comb.

3. The optical time distributor of claim 1,
wherein the master clock further comprises:
    a remote-transfer optical transceiver in optical communication with the free-space optical terminal and the transfer comb.

4. The optical time distributor of claim 1,
wherein the master clock further comprises:
    a coarse timing and communications module in electrical communication with a digital signal controller and in communication with the free-space optical terminal.

5. The optical time distributor of claim 1,
wherein the remote clock further comprises:
    a transfer-remote optical transceiver in communication with the remote comb.

6. The optical time distributor of claim 1,
wherein the remote clock further comprises:
    a coarse timing and communications module in electrical communication with a digital signal controller and optical communication with the free-space optical terminal.

7. The optical time distributor of claim 1,
wherein the remote clock further comprises:
    a digital signal controller in electrical communication with the remote comb, a transfer-remote optical transceiver, and a coarse timing and communications module.

8. The optical time distributor of claim 1,
wherein the remote clock further comprises:
    a transfer-remote optical transceiver in electrical communication with a digital signal controller.

9. The optical time distributor of claim 1, further comprising:
    an optical synchronization verification in optical communication with the master clock and the remote clock and that:
        receives the master clock coherent optical pulse train output from the master clock;
        receives the remote clock coherent optical pulse train output from the remote clock; and
        produces an out-of-loop verification in response to receipt of the master clock coherent optical pulse train output and the remote clock coherent optical pulse train output.

10. The optical time distributor of claim 1, further comprising:
    a pulse-per-second verification in optical communication with the master clock and the remote clock and that:
        receives a master pulse-per-second output from the master clock;
        receives a remote pulse-per-second output from the remote clock; and
        produces an optical interference in response to receipt of the master pulse-per-second output and the remote pulse-per-second output.

11. The optical time distributor of claim 1, further comprising:
    a frequency verification in electrical communication with the master clock and the remote clock and that:

receives a master frequency output from the master clock;
receives a remote frequency output from the remote clock; and
produces a relative phase difference in response to receipt of the master frequency output and the remote frequency output.

12. The optical time distributor of claim 1, further comprising:
a first oscillator.

13. The optical time distributor of claim 1, further comprising:
a second oscillator.

14. An optical time distributor for optical two-way time-frequency transfer, the optical time distributor comprising:
a master clock comprising:
a master comb that receives a reference oscillator signal from a first oscillator and produces:
a local master clock signal;
a master clock coherent optical pulse train output;
a master frequency output;
a master pulse-per-second output; and
a master coherent optical pulse train in response to receipt of the reference oscillator signal;
a transfer comb that receives a reference oscillator signal from the first oscillator and produces, in response to receipt of the reference oscillator signal, a transfer coherent optical pulse train;
a master-transfer optical transceiver that:
receives the master coherent optical pulse train from the master comb;
receives the transfer coherent optical pulse train from the transfer comb; and
produces a RF master-transfer interferogram in response to receipt of the master coherent optical pulse train and the transfer coherent optical pulse train;
a remote-transfer optical transceiver that:
receives the transfer coherent optical pulse train from the transfer comb;
receives a remote coherent optical pulse train from a remote comb; and
produces a RF remote-transfer interferogram in response to receipt of a remote optical signal and the transfer coherent optical pulse train;
a digital signal controller in electrical communication with the master comb, the master-transfer optical transceiver, the remote-transfer optical transceiver, and a coarse timing and communications module and that:
receives the local master clock signal the RF master-transfer interferogram, and the RF remote-transfer interferogram;
receives a cw laser heterodyne signal;
produces a cw laser modulation and a pulse label in response to receipt of the local master clock signal the RF master-transfer interferogram, the RF remote-transfer interferogram, and the cw laser heterodyne signal;
produces the master pulse-per-second output via a pulse selector; and
produces the pulse label;
the coarse timing and communications module in electrical communication with the digital signal controller and that:
generates the cw laser heterodyne signal in response to receipt of a modulated cw laser signal; and
receives the cw laser modulation from the digital signal controller; and
produces an outgoing modulated cw laser signal in response to receipt of the cw laser modulation;
a free-space optical terminal in optical communication with the coarse timing and communications module, the transfer comb, and a free space link and that:
transfers the modulated cw laser signal and the transfer coherent optical pulse train from the master clock to the free space link;
transfers the remote optical signal from the free space link to the master clock; and
produces a master optical signal in response to receipt of the modulated cw laser signal and the transfer coherent optical pulse train, the master optical signal comprising:
a transfer coherent optical pulse train; and
a modulated cw laser signal;
a remote clock in optical communication with the master clock via the free space link and comprising:
the remote comb that receives a reference oscillator signal from a second oscillator and produces:
a local remote clock signal;
a remote clock coherent optical pulse train output;
a remote frequency output;
a remote pulse-per-second output; and
the remote coherent optical pulse train in response to receipt of the reference oscillator signal;
a free-space optical terminal in optical communication:
with the remote comb; and
with the master clock via the free space link, and that receives:
the remote coherent optical pulse train from the remote comb; and
the master optical signal from the free-space optical terminal of the master clock, and that communicates:
the remote optical signal to the free-space optical terminal of the master clock, the modulated cw laser signal comprising:
the remote coherent optical pulse train; and
a modulated cw laser signal;
a transfer-remote optical transceiver that:
receives the remote coherent optical pulse train from the remote comb;
receives the transfer coherent optical pulse train; and
produces a RF transfer-remote interferogram in response to receipt of the remote coherent optical pulse train and the transfer coherent optical pulse train;
a coarse timing and communications module in electrical communication with a digital signal controller and in optical communication with the free-space optical terminal;
the digital signal controller in electrical communication with the remote comb, the transfer-remote optical transceiver, and the coarse timing and communications module and that:
receives the local remote clock signal, and the RF transfer-remote interferogram from the transfer-remote optical transceiver;
receives a cw laser heterodyne signal;
produces a cw laser modulation and a pulse label;
produces the remote pulse-per-second output via a pulse selector;

produces the pulse label; and
produces a clock feedback signal in response to receipt of the RF transfer-remote interferogram;
the coarse timing and communications module in electrical communication with the digital signal controller and that:
generates the cw laser heterodyne signal in response to receipt of an incoming modulated cw laser signal;
receives the cw laser modulation from the digital signal controller; and
produces an outgoing modulated cw laser signal in response to receipt of the cw laser modulation.

15. The optical time distributor of claim 14, further comprising:
an optical synchronization verification in optical communication with the master clock and the remote clock and that:
receives the master clock coherent optical pulse train output from the master clock;
receives the remote clock coherent optical pulse train output from the remote clock; and
produces an out-of-loop verification in response to receipt of the master clock coherent optical pulse train output and the remote clock coherent optical pulse train output.

16. The optical time distributor of claim 14, further comprising:
a pulse-per-second verification in optical communication with the master clock and the remote clock and that:
receives the master pulse-per-second output from the master clock;
receives the remote pulse-per-second output from the remote clock; and
produces an optical interference in response to receipt of the master pulse-per-second output and the remote pulse-per-second output.

17. The optical time distributor of claim 14, further comprising:
a frequency verification in electrical communication with the master clock and the remote clock and that:
receives the master frequency output from the master clock;
receives the remote frequency output from the remote clock; and
produces a relative phase difference in response to receipt of the master frequency output and the remote frequency output.

18. The optical time distributor of claim 14, further comprising:
the first oscillator.

19. The optical time distributor of claim 14, further comprising:
the second oscillator.

* * * * *